US007144614B2

(12) United States Patent
Nakajima et al.

(10) Patent No.: US 7,144,614 B2
(45) Date of Patent: Dec. 5, 2006

(54) POLYESTER POLYMERIZATION CATALYST, POLYESTER PRODUCED BY USING THE SAME, AND PROCESS FOR PRODUCING POLYESTER

(75) Inventors: Takahiro Nakajima, Ohtsu (JP); Ken-ichi Tsukamoto, Ohtsu (JP); Shoichi Gyobu, Ohtsu (JP); Nobuo Moriyama, Ohtsu (JP); Mitsuyoshi Kuwata, Ohtsu (JP); Yoshinao Matsui, Ohtsu (JP); Seisyu Hayashi, Osaka (JP); Katsuya Ito, Ohtsu (JP); Masaou Matsuda, Tsuruga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 518 days.

(21) Appl. No.: 10/186,634

(22) Filed: Jul. 2, 2002

(65) Prior Publication Data

US 2003/0083191 A1 May 1, 2003

(51) Int. Cl.
*B29D 22/00* (2006.01)
*C08G 63/78* (2006.01)
*B01J 21/00* (2006.01)

(52) U.S. Cl. .................... 428/35.7; 528/275; 528/277; 528/280; 528/282; 528/286; 528/298; 528/302; 528/307; 528/308; 528/308.6; 524/706; 524/710; 524/711; 524/713; 502/102; 502/103; 502/104; 502/155; 502/157; 502/162; 428/34.9; 428/221; 428/364

(58) Field of Classification Search ................ 528/275, 528/277, 280, 281, 282, 286, 298, 302, 307, 528/308, 308.6; 524/706, 710, 711, 713; 502/102, 103, 104, 155, 157, 162; 428/35.7, 428/221, 364

See application file for complete search history.

(56) References Cited

U.S. PATENT DOCUMENTS

| | | | | |
|---|---|---|---|---|
| 3,329,651 | A | 7/1967 | Dobinson | |
| 3,528,945 | A | 9/1970 | Price et al. | |
| 3,528,946 | A | 9/1970 | Price et al. | |
| 3,533,973 | A | 10/1970 | Price et al. | |
| 3,574,174 | A | 4/1971 | Bayer et al. | |
| 3,594,347 | A | 7/1971 | Lazarus et al. | |
| 3,847,873 | A | 11/1974 | Jackson et al. | |
| 4,565,845 | A * | 1/1986 | Inoue et al. | 525/25 |
| 4,829,113 | A | 5/1989 | Rosenfeld | |
| H000766 | H | 4/1990 | Yu | |
| 5,237,042 | A | 8/1993 | Kim et al. | |
| 5,260,246 | A | 11/1993 | Yuo et al. | |
| 5,326,831 | A | 7/1994 | Yezrielev et al. | |
| 5,334,671 | A | 8/1994 | Yezrielev et al. | |
| 5,391,700 | A | 2/1995 | Itoh et al. | |
| 5,399,607 | A | 3/1995 | Nanbu et al. | |
| 5,512,340 | A | 4/1996 | Goodley | |
| 5,554,720 | A | 9/1996 | Weaver et al. | |
| 5,561,183 | A | 10/1996 | Kwon et al. | |
| 5,596,069 | A | 1/1997 | Goodley | |
| 5,639,825 | A | 6/1997 | Nanbu et al. | |
| 5,652,033 | A | 7/1997 | Goodley | |
| 5,674,801 | A | 10/1997 | George | |
| 5,693,786 | A | 12/1997 | Tanaka et al. | |
| 5,719,214 | A | 2/1998 | Tanaka et al. | |
| 5,733,969 | A | 3/1998 | Thiele | 524/791 |
| 5,744,572 | A | 4/1998 | Schumann et al. | |
| 5,770,682 | A | 6/1998 | Ohara et al. | |
| 5,782,935 | A | 7/1998 | Hirt et al. | |
| 5,847,011 | A | 12/1998 | Terado et al. | |
| 5,869,582 | A | 2/1999 | Tang et al. | |
| 6,156,867 | A | 12/2000 | Aoyama et al. | 528/282 |
| 6,239,200 | B1 | 5/2001 | Kao et al. | |
| 6,392,005 | B1 | 5/2002 | Jen | |
| 6,489,434 | B1 | 12/2002 | Jen | |
| 6,589,324 | B1 | 7/2003 | Kamo et al. | |

FOREIGN PATENT DOCUMENTS

| | | | |
|---|---|---|---|
| CA | 2253515 | | 10/1998 |
| CH | 495 395 | A | 8/1970 |
| CN | 1153185 | A | 7/1997 |
| EP | 0 419 669 | A1 | 4/1991 |
| EP | 0 626 402 | A2 | 11/1994 |
| EP | 0 626 402 | A3 | 11/1994 |
| EP | 0 768 319 | A1 | 4/1997 |
| EP | 0909775 | A1 | 4/1999 |
| GB | 1 348146 | | 3/1974 |
| GB | 1348146 | | 3/1974 |
| GB | 1 466 154 | | 3/1977 |
| JP | 46-5395 | | 4/1970 |
| JP | 46 5395 | | 11/1971 |
| JP | 46-40711 | | 12/1971 |
| JP | S46-41031 | | 12/1971 |
| JP | S49-32676 | | 9/1974 |

(Continued)

OTHER PUBLICATIONS

Adding Value to Polymers, Ciba Specialty Chemicals K.K. , Publ. No. J-99-001.

(Continued)

*Primary Examiner*—Samuel A. Acquah
(74) *Attorney, Agent, or Firm*—Kenyon & Kenyon LLP

(57) ABSTRACT

This invention provides a novel polymerization catalyst other than antimony compounds, polyester produced by using the same and a process for producing polyester. The polycondensation catalyst of this invention is a polyester polymerization catalyst comprising an aluminum compound and a phosphorus compound having a specific structure. Further, this invention relates to polyester produced by using this polyester polymerization catalyst and a process for producing polyester. Further, this invention relates to fibers, films and hollow molded articles comprising the polyester.

120 Claims, No Drawings

FOREIGN PATENT DOCUMENTS

| | | |
|---|---|---|
| JP | 55 116722 | 9/1980 |
| JP | 60-35023 | 2/1985 |
| JP | 60 053532 | 3/1985 |
| JP | 60 035023 | 7/1985 |
| JP | 61-101527 | 5/1986 |
| JP | 61 101527 | 5/1986 |
| JP | 63-265951 | 11/1988 |
| JP | 03 215522 | 9/1991 |
| JP | 03 231918 | 10/1991 |
| JP | 4-3409 | 1/1992 |
| JP | 4-49846 | 8/1992 |
| JP | 4-49847 | 8/1992 |
| JP | 5-287064 | 11/1993 |
| JP | 06 279579 | 10/1994 |
| JP | 7-53691 | 2/1995 |
| JP | 08 073581 | 3/1996 |
| JP | 8-193127 | 7/1996 |
| JP | 8 193127 | 7/1996 |
| JP | 8-301994 | 11/1996 |
| JP | 9-31308 | 2/1997 |
| JP | 9-151242 | 6/1997 |
| JP | 9-151243 | 6/1997 |
| JP | 9-151244 | 6/1997 |
| JP | 09 291141 | 11/1997 |
| JP | 10 036495 | 2/1998 |
| JP | 10 251394 | 9/1998 |
| JP | 10-259296 | 9/1998 |
| JP | 10-324741 | 12/1998 |
| JP | 11-49852 | 2/1999 |
| JP | 11-228681 | 8/1999 |
| JP | 11-228682 | 8/1999 |
| JP | 2000 63504 | 2/2000 |
| JP | 2000-302854 | 10/2000 |
| JP | 2001-26639 | 1/2001 |
| JP | 2001-131274 | 5/2001 |
| JP | 2001 131276 | 5/2001 |
| JP | 2001 163964 | 6/2001 |
| JP | 2001 278970 | 10/2001 |
| JP | 2002-220452 | 8/2002 |
| JP | 2002-220453 | 8/2002 |
| JP | 2002-226568 | 8/2002 |
| WO | WO 96/11978 | 4/1996 |
| WO | WO 96/41828 | 12/1996 |
| WO | WO 00/24804 | 10/1998 |
| WO | WO 98/42769 | 10/1998 |
| WO | WO 99/28033 | 6/1999 |
| WO | 2000-302854 | 10/2000 |
| WO | WO 00/71252 A1 | 11/2000 |
| WO | WO 01/42335 A1 | 6/2001 |
| WO | WO 02/068500 A1 | 9/2002 |
| WO | WO 03/004547 A2 | 1/2003 |

OTHER PUBLICATIONS

"Experimental Results: 1. PET Polymerization Experiment using Aluminum Acetylacetonate/Lithium Acetate (0.014 mol-%/0.025 mol-%) as catalyst; 2. PET Polymerization Experiment using Aluminum Acetylacetonate/Lithium Acetate (0.014mol-%/0.1 mol-%) as catalyst," conducted by (Exp. 1, polymerization) M. Kuwata (according to direction of T. Nakajima), Sep. 9, 1999; (Exp. 1, measurement of TD) T. Nakajima, Oct. 26, 1999; (Exp. 2, polymerization) M. Kuwata (according to direction of T. Nakajima), Jun. 14, 2000; (Exp. 2, measurement of TD) T, Nakajima, Aug. 11, 2000.

* cited by examiner

POLYESTER POLYMERIZATION CATALYST, POLYESTER PRODUCED BY USING THE SAME, AND PROCESS FOR PRODUCING POLYESTER

BACKGROUND OF THE INVENTION

1. Field of the Invention

This invention relates to a polyester polymerization catalyst, polyester produced by using the same and a process for producing polyester, and in particular to a novel polymerization catalyst not using a germanium or antimony compound as a major catalytic component, polyester produced by using the same and a process for producing polyester.

2. Description of the Related Art

Polyesters represented by polyethylene terephthalate (PET), polybutylene terephthalate (PBT), polyethylene naphthalate (PEN) etc. are excellent in mechanical and chemical characteristics, and are used in various fields for example in fibers for clothing and industrial materials, films for such as packaging or magnetic tapes, sheets, hollow molded articles such as bottles, casings for electrical or electronic parts, and other molded articles of engineering plastics, depending on the characteristics of each polyester.

As typical polyester, polyester comprising an aromatic dicarboxylic acid and an alkylene glycol as major constituent components, for example polyethylene terephthalate (PET), is industrially produced by esterification or transesterification of terephthalic acid or dimethyl terephthalate and ethylene glycol to produce bis(2-hydroxyethyl) terephthalate which is then subjected to polycondensation at high temperatures in vacuo in the presence of a catalyst.

As a conventional polyester polymerization catalyst used in polycondensation of polyester, antimony trioxide has been used widely. Antimony trioxide is an inexpensive and highly active catalyst, but when antimony trioxide is used as a major component, that is, when it is used in such an amount as to exhibit a practical rate of polymerization, an antimony metal is precipitated thus causing problems such as gray disdiscoloration or generation of insoluble particles in polyester. For this reason, polyester absolutely free of antimony or not containing antimony as a major catalytic component is desired.

The above-described insoluble particles in polyester causes the following problems:

In polyester for film, the antimony metal precipitated serves as insoluble particles in polyester, which causes not only deposits around die during melt extrusion but also deficiency in the surface of film. Further, when the polyester with insoluble particles is used as a starting material of hollow molded articles, it is difficult to obtain hollow molded articles excellent in transparency.

The insoluble particles in polyester for fibers serves as insoluble particles not only causing a reduction in the strength of fibers, but also deposits around spinnerets during spinning. In production of polyester fibers, a polyester polymerization catalyst not causing formation of insoluble particles is desired from the viewpoint of productivity.

As a method of solving the problem described above, an attempt had been made at preventing gray discoloration and formation of insoluble particles in PET while using antimony trioxide as a catalyst. In Japanese Patent No. 2666502, for example, formation of black insoluble particles in PET is prevented by using antimony trioxide, a bismuth compound and a selenium compound as a polycondensation catalyst. Further, JP-A 9-291141 describes that precipitation of an antimony metal is prevented when antimony trioxide containing sodium and iron oxides is used as a polymerization catalyst. However, these polycondensation catalysts cannot achieve the object of reducing the content of antimony in polyester.

As a method of solving the problem of the antimony catalyst in uses requiring transparency of PET bottles etc., for example JP-A 6-279579 discloses a method of improving transparency by prescribing the proportion of antimony and phosphorus compounds used. However, it cannot be said that hollow molded articles made of polyester obtained by this method are sufficiently transparent.

Further, JP-A 10-36495 discloses a process for producing polyester excellent in transparency, which comprises use of antimony trioxide, phosphoric acid and a sulfonic acid compound. However, polyester obtained by such a method has lower thermal stability, and there is the problem of a high content of acetaldehyde in the resultant hollow molded article.

Polycondensation catalysts substituted for antimony containing catalysts such as antimony trioxide have also been examined, and titanium compounds such as tetraalkoxy titanate or tin compounds have previously been proposed, but have a problem that polyester produced by using these compounds is easily thermally degraded during melt molding, and the polyester is significantly discolored.

In an attempt at solving the problem arising when such titanium compounds are used as the polycondensation catalyst, for example JP-A 55-116722 proposes a method of simultaneously using tetraalkoxy titanate in combination with a cobalt salt and a calcium salt. Further, JP-A 8-73581 proposes a method of using tetraalkoxy titanate in combination with a cobalt compound as the polycondensation catalyst and simultaneously using a optical brightener. By these techniques, PET discoloration occurring when tetraalkoxy titanate is used as the polycondensation catalyst can be reduced, but prevention of thermal degradation of PET cannot be efficiently achieved.

In another attempt at preventing thermal degradation during melt molding of polyester polymerized in the presence of a titanium compound as the catalyst, for example JP-A 10-259296 describes a method of adding a phosphorus compound after polymerization of polyester in the presence of the titanium compound as the catalyst. However, effective mixing of the additive with the polymer after polymerization is technically difficult and leads to higher costs, so this prior art method is not practically used under the present circumstances. It is known that aluminum compounds are generally inferior in catalytic activity. Among the aluminum compounds, aluminum chelate compounds are reported to have a higher catalytic activity as the polycondensation catalyst than other aluminum compounds, but the aluminum chelate compounds cannot be said to have a sufficient catalytic activity as compared with the antimony compound or titanium compound described above, and polyester polymerized for a long time using the aluminum compound as the catalyst has the problem of lower thermal stability.

A method of adding an alkali metal compound to an aluminum compound to form a polyester polymerization catalyst having a sufficient catalytic activity is also known. When such a known catalyst is used, polyester excellent in thermal stability can be obtained, but this catalyst using an alkali metal compound in combination should be added in a larger amount in order to attain a practical catalytic activity, and as a result, there arises at least one of the following problems attributable to the alkali metal compound in the resultant polyester polymer.

The amount of insoluble particles is increased so that when the polyester is used in fibers, the spinnability and the physical properties of fibers are getting worse, and when used in films, the physical properties of films are getting worse.

The hydrolytic stability of the resultant polyester polymer is lowered, and due to formation of insoluble particles, the transparency thereof is lowered.

There arises the phenomenon of deficiency in color tone of the resultant polyester polymer, that is, yellow discoloration of the polymer, and when the polyester is used in films or hollow bottles, there arises the problem of degradation in the color tone of the molded articles.

During production of molded articles by melt molding, filter pressure is increased due to clogging of a filter with insoluble particles, to lower productivity.

As an non-antimony catalyst for giving polyester free of the problem described above, a germanium compound has been practically used, but this catalyst has a problem that it is very expensive and easily distilled away from a reaction system during polymerization, thus changing the concentration of the catalyst in the reaction system and making control of polymerization difficult, so use of the germanium component as a major catalytic component is problematic.

For preventing thermal degradation of polyester during melt molding, there is also a method of removing a catalyst from polyester. JP-A 10-251394 discloses a method of removing a catalyst from polyester wherein a polyester resin is brought into contact with an extractant as supercritical fluid in the presence of an acidic substance. However, the method of using such supercritical fluid is technically difficult and leads to higher costs for products, and is thus not preferable.

For the reasons described above, there is demand for a polymerization catalyst which comprises as a major catalytic component a metal component other than antimony and germanium, is excellent in catalytic activity and gives polyester free of the problems described above.

This invention provides a novel polyester polymerization catalyst comprising, as a major catalytic metal component, a metal component other than antimony or germanium, polyester produced by using the same and a process for producing polyester by using the catalyst.

Further, this invention provides a novel polyester polymerization catalyst comprising not an antimony compound or a germanium compound as a major catalytic component but aluminum as a major metal component, polyester produced by using the same and a process for producing polyester by using the catalyst.

Another object of this invention is to provide a polyester polymerization catalyst which comprises not an antimony compound or a germanium compound as a major catalytic component but aluminum as a major metal component, is excellent in catalytic activity, and without deactivating or removing the catalyst, gives polyester not only excellent in thermal stability by effectively inhibiting thermal degradation during melt molding but also superior in color tone and transparency without formation of insoluble particles.

Further, this invention provides polyester which improves thermal stability, the problem of formation of insoluble particles and productivity by using the catalyst during melt molding thereof into films, hollow molded articles such as bottles, fibers and engineering plastics, and gives products superior in quality level by using virgin resin thereof or by reutilizing scraps thereof generated during molding, as well as a process for producing polyester by using the polyester polymerization catalyst.

Another object of this invention is to provide a polyester polymerization catalyst giving polyester excellent in thermal oxidation stability and hydrolytic stability, polyester excellent in thermal oxidation stability and hydrolytic stability, and a process for producing polyester by using the polyester polymerization catalyst.

Another object of this invention is to provide molded articles such as fibers, films and bottles comprising polyester produced by using the catalyst. As a result of extensive study for solving the problems described above, the present inventors found that an aluminum compound is originally inferior in catalytic activity, but the aluminum compound when used in the coexistence of a phosphorus compound having a specific structure can have a sufficient activity as the polymerization catalyst, thus arriving at the present invention. When the polycondensation catalyst of this invention is used, polyester excellent in qualities which does not use an antimony compound or a germanium compound can be obtained.

That is, this invention provides a polyester polymerization catalyst comprising an aluminum compound and a phosphorus compound having a specific structure, polyester produced by using the same and a process for producing polyester, in order to solve the problems described above.

DETAILED DESCRIPTION OF THE INVENTION

This invention provides a novel polycondensation catalyst other than antimony compounds, polyester produced by using the same, and a process for producing polyester. The polycondensation catalyst of this invention is a polyester polymerization catalyst comprising an aluminum compound and a phosphorous compound having a specific structure. Further, this invention relates to polyester produced by using this polyester polymerization catalyst and a process for producing polyester. Further, this invention relates to fibers, films and hollow molded articles comprising this polyester.

These inventions are as follows;

A polyester polymerization catalyst comprising at least one member selected from aluminum and compounds thereof as a metal-containing component and at least one of phosphorus metal salt compounds.

The polyester polymerization catalyst according to the invention 1, wherein the phosphorus metal salt compound is at least one member selected from the compounds represented by the general formula (1):

(1)

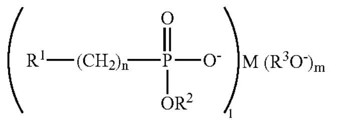

wherein $R^1$ represents hydrogen, a $C_{1-50}$ hydrocarbon group, or a $C_{1-50}$ hydrocarbon group containing a hydroxyl group, halogen group, alkoxyl group or amino group; $R^2$ represents hydrogen, a $C_{1-50}$ hydrocarbon group, or a $C_{1-50}$ hydrocarbon group containing a hydroxyl group or alkoxyl group; $R^3$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, and l+m is 4 or less; M represents a (l+m)-valent metal cation; n is an integer of 1 or more; and the hydrocarbon group may contain an alicyclic structure, a branched structure and an aromatic ring structure.

The polyester polymerization catalyst according to the invention 2, wherein the phosphorus compound represented by the general formula (1) is at least one member selected from the compounds represented by the general formula (2):

(2)

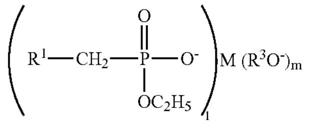

wherein $R^1$ represents hydrogen, a $C_{1-50}$ hydrocarbon group, or a $C_{1-50}$ hydrocarbon group containing a hydroxyl group, halogen group, alkoxyl group or amino group; $R^3$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, l+m is 4 or less; M represents a (l+m)-valent metal cation; and the hydrocarbon group may contain an alicyclic structure, a branched structure and an aromatic ring structure.

A polyester polymerization catalyst comprising at least one member selected from the group consisting of aluminum and compounds thereof as a metal-containing component and at least one member selected from compounds represented by the general formula (3):

(3)

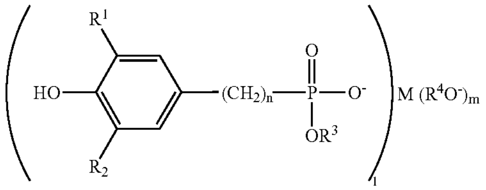

wherein $R^1$ and $R^2$ independently represent hydrogen or a $C_{1-30}$ hydrocarbon group; $R^3$ represents hydrogen, a $C_{1-50}$ hydrocarbon group, or a $C_{1-50}$ hydrocarbon group containing a hydroxyl group or alkoxyl group; $R^4$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, l+m is 4 or less, M represents a (l+m)-valent metal cation; n is an integer of 1 or more; and the hydrocarbon group may contain an alicyclic structure, a branched structure and an aromatic ring structure.

The polyester polymerization catalyst according to the invention 4, wherein the phosphorus compound represented by the general formula (3) is at least one member selected from the compounds represented by the general formula (4):

(4)

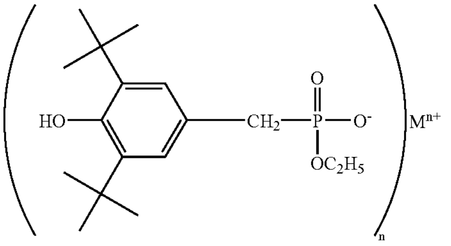

wherein $M^{n+}$ represents an n-valent metal cation, and n is 1, 2, 3 or 4.

The polyester polymerization catalyst according to any one of the above invention 1 to 5, wherein the metal moiety of the phosphorus metal salt compound is selected from Li, Na, K, Be, Mg, Sr, Ba, Mn, Ni, Cu and Zn.

A polyester polymerization catalyst comprising at least one member selected from aluminum salts of a phosphorus compound.

The polyester polymerization catalyst according to the invention 7, wherein the aluminum salt of a phosphorus compound is at least one member selected from the compounds represented by the general formula (5):

(5)

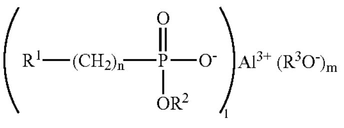

wherein $R^1$ represents hydrogen, a $C_{1-50}$ hydrocarbon group, or a $C_{1-50}$ hydrocarbon group containing a hydroxyl group, halogen atom, alkoxyl group or amino group; $R^2$ represents hydrogen, a $C_{1-50}$ hydrocarbon group, or a $C_{1-50}$ hydrocarbon group containing a hydroxyl group or alkoxyl group; $R^3$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, l+m is 3; n is an integer of 1 or more; and the hydrocarbon group may contain an alicyclic structure, a branched structure and an aromatic ring structure.

A polyester polymerization catalyst comprising at least one member selected from the compounds represented by the general formula (6):

(6)

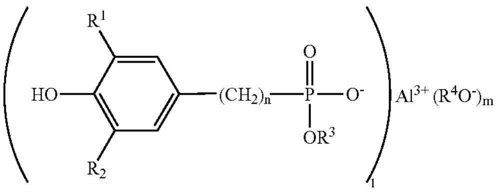

wherein $R^1$ and $R^2$ independently represent hydrogen or a $C_{1-30}$ hydrocarbon group; $R^3$ represents hydrogen, a $C_{1-50}$ hydrocarbon group, or a $C_{1-50}$ hydrocarbon group containing a hydroxyl group or alkoxyl group; $R^4$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, l+m is 3; n is an integer of 1 or more; and the hydrocarbon group may contain an alicyclic structure, a branched structure and an aromatic ring structure.

The polyester polymerization catalyst according to the invention 9, wherein the phosphorus compound represented by the general formula (6) is at least one member selected from the compounds represented by the general formula (7):

(7)

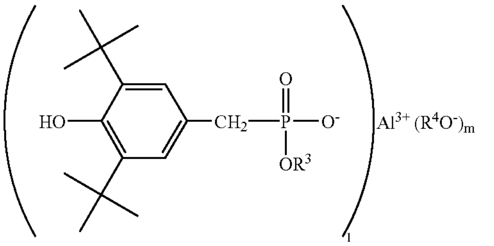

wherein $R^3$ represents hydrogen, a $C_{1-50}$ hydrocarbon group, or a $C_{1-50}$ hydrocarbon group containing a hydroxyl group or alkoxyl group; $R^4$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, and l+m is 3; and the hydrocarbon group may contain an alicyclic structure, a branched structure and an aromatic ring structure.

A polyester polymerization catalyst comprising at least one member selected from the group consisting of aluminum and compounds thereof as an metal-containing component and at least one member selected from phosphorus compounds having at least one P—OH bond.

The polyester polymerization catalyst according to the invention 11, wherein the phosphorus compound is at least one member selected from the compounds represented by the general formula (8):

(8)

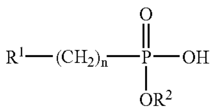

wherein $R^1$ represents hydrogen, a $C_{1-50}$ hydrocarbon group, or a $C_{1-50}$ hydrocarbon group containing a hydroxyl group, halogen group, alkoxyl group or amino group; $R^2$ represents hydrogen, a $C_{1-50}$ hydrocarbon group, or a $C_{1-50}$ hydrocarbon group containing a hydroxyl group or alkoxyl group; n is an integer of 1 or more; and the hydrocarbon group may contain an alicyclic structure, a branched structure and an aromatic ring structure.

A polyester polymerization catalyst comprising at least one member selected from the group consisting of aluminum and compounds thereof as a metal-containing component and at least one member selected from the phosphorus compounds represented by the general formula (9):

(9)

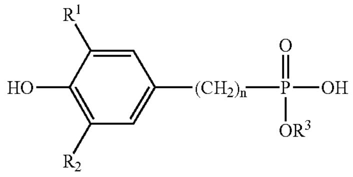

wherein $R^1$ and $R^2$ independently represent hydrogen or a $C_{1-30}$ hydrocarbon group; $R^3$ represents hydrogen, a $C_{1-50}$ hydrocarbon group, or a $C_{1-50}$ hydrocarbon group containing a hydroxyl group or alkoxyl group; n is an integer of 1 or more; and the hydrocarbon group may contain an alicyclic structure, a branched structure and an aromatic ring structure.

The polyester polymerization catalyst according to the invention 13, wherein the phosphorus compound represented by the general formula (9) is at least one member selected from the compounds represented by the general formula (10):

(10)

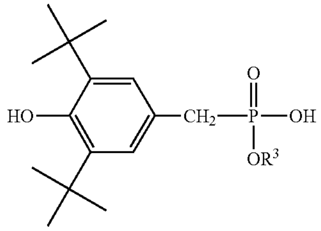

wherein $R^3$ represents hydrogen, a $C_{1-50}$ hydrocarbon group, or a $C_{1-50}$ hydrocarbon group containing a hydroxyl group or alkoxyl group, and the hydrocarbon group may contain an alicyclic structure, a branched structure and an aromatic ring structure.

The polyester polymerization catalyst according to any one of the above invention 1, 6, 7 and 11, wherein the phosphorus compound has the structure of a phosphonic acid derivative compound.

The polyester polymerization catalyst according to any one of the above invention 1, 2, 3, 6, 7, 8, 11, 12 and 15, wherein the phosphorus compound has an aromatic ring structure.

A polyester polymerization catalyst comprising at least one member selected from the group consisting of aluminum and compounds thereof as a metal-containing component and at least one member selected from the phosphorus compounds represented by the general formula (11):

$$R^1\text{-}P(=0)(OR^2)(OR^3) \quad (11)$$

wherein $R^1$ represents a $C_{1-50}$ hydrocarbon group or a $C_{1-50}$ hydrocarbon group containing a hydroxyl group, halogen group, alkoxyl group or amino group; $R^2$ and $R^3$ independently represent hydrogen, a $C_{1-50}$ hydrocarbon group, or a $C_{1-50}$ hydrocarbon group containing a hydroxyl group or alkoxyl group; and the hydrocarbon group may contain an alicyclic structure, a branched structure and an aromatic ring structure.

The polyester polymerization catalyst according to 17, wherein the phosphorus compound represented by the general formula (11) is at least one member selected from the phosphorus compounds represented by the general formula (12):

$$R^1—CH_2—P(=0)(OR^2)(OR^3) \quad (12)$$

wherein $R^1$ represents a $C_{1-49}$ hydrocarbon group or a $C_{1-49}$ hydrocarbon group containing a hydroxyl group, halogen group, alkoxyl group or amino group; $R^2$ and $R^3$ independently represent hydrogen, a $C_{1-50}$ hydrocarbon group, or a $C_{1-50}$ hydrocarbon group containing a hydroxyl group or alkoxyl group; and the hydrocarbon group may contain an alicyclic structure, a branched structure and an aromatic ring structure.

The polyester polymerization catalyst according to the above invention 17 or 18, wherein at least one of $R^1$, $R^2$ and $R^3$ contains an aromatic ring structure.

A polyester polymerization catalyst comprising at least one member selected from the group consisting of aluminum and compounds thereof as a metal-containing component and at least one member selected from the phosphorus compounds represented by the general formula (13):

(13)

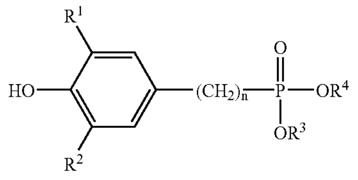

wherein $R^1$ and $R^2$ independently represent hydrogen or a $C_{1-30}$ hydrocarbon group; $R^3$ and $R^4$ independently represent hydrogen, a $C_{1-50}$ hydrocarbon group, or a $C_{1-50}$ hydrocarbon group containing a hydroxyl group or alkoxyl group; n is an integer of 1 or more; and the hydrocarbon group may contain an alicyclic structure, a branched structure and an aromatic ring structure.

The polyester polymerization catalyst according to the invention 20, wherein the phosphorus compound represented by the general formula (13) is at least one member selected from the compounds represented by the general formula (14):

(14)

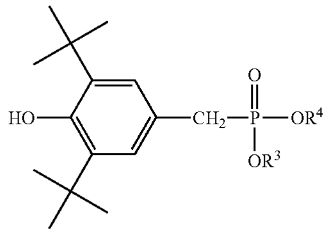

wherein $R^3$ and $R^4$ independently represent hydrogen, a $C_{1-50}$ hydrocarbon group, or a $C_{1-50}$ hydrocarbon group containing a hydroxyl group or alkoxyl group, and the hydrocarbon group may contain an alicyclic structure, a branched structure and an aromatic ring structure.

A polyester polymerization catalyst comprising at least one member selected from the group consisting of aluminum and compounds thereof as a metal-containing component and at least one member selected from the group consisting of phosphinic acid derivative compounds, phosphine oxide derivative compounds, phosphonous acid derivative compounds, phosphinous acid derivative compounds and phosphine derivative compounds.

The polyester polymerization catalyst according to any one of the above invention 1 to 22, characterized in that one or more metals and/or metal compounds selected from the group consisting of alkali metals and compounds thereof and alkaline earth metals and compounds thereof are co-exist therewith.

Polyester produced by using a catalyst described in any one of the above invention 1 to 23.

A process for producing polyester which comprises using a catalyst described in any one of the above invention 1 to 23 to produce polyester.

The process for producing polyester according to the invention 25 wherein an antimony compound is added in an amount of 50 ppm or less in terms of antimony atom relative to polyester.

The process for producing polyester according to the invention 25 wherein a germanium compound is added in an amount of 20 ppm or less in terms of germanium atom relative to polyester.

The polyester according to the invention 24, wherein the polyester is selected from polyethylene terephthalate, polybutylene terephthalate, polypropylene terephthalate, or polyethylene terephthalate copolymerized with cyclohexane dimethanol.

Fibers comprising the polyester described in the invention 24.

Films comprising the polyester described in the invention 24.

Hollow molded articles comprising the polyester described in the invention 24.

DESCRIPTION OF THE PREFERRED EMBODIMENTS

As aluminum or aluminum compounds constituting the polycondensation catalyst of this invention, not only metal aluminum but also known aluminum compounds can be used without limitation.

Specifically, the aluminum compounds include carboxylates such as aluminum formate, aluminum acetate, basic aluminum acetate, aluminum propionate, aluminum oxalate, aluminum acrylate, aluminum laurate, aluminum stearate, aluminum benzoate, aluminum trichloroacetate, aluminum lactate, aluminum citrate and aluminum salicylate, inorganic acid salts such as aluminum chloride, aluminum hydroxide, aluminum hydroxide chloride, aluminum carbonate, aluminum phosphate and aluminum phosphonate, aluminum alkoxides such as aluminum methoxide, aluminum ethoxide, aluminum n-propoxide, aluminum iso-propoxide, aluminum n-butoxide and aluminum t-butoxide, aluminum chelate compounds such as aluminum acetyl acetonate, aluminum acetyl acetate, aluminum ethyl acetoacetate, aluminum ethyl acetoacetate di-iso-propoxide, organoaluminum compounds such as trimethyl aluminum and triethyl aluminum, and partial hydrolyzates thereof and aluminum oxides. Among these, the carboxylates, inorganic acid salts and chelate compounds are preferable, among which aluminum acetate, basic aluminum acetate, aluminum chloride, aluminum hydroxide, aluminum hydroxide chloride and aluminum acetyl acetonate are particularly preferable.

The amount of aluminum or the aluminum compound used in this invention is preferably 0.001 to 0.05 mol-%, more preferably 0.005 to 0.02 mol-% relative to the number of moles of the whole constituent units of carboxylic acid components such as dicarboxylic acids and polyvalent carboxylic acids in the resultant polyester. When the amount thereof is less than 0.001 mol-%, the activity of the resultant catalyst may not be sufficient, while the amount thereof is greater than 0.05 mol-%, there may arise problems such as a reduction in thermal stability and thermal oxidation stability, formation of insoluble particles attributable to aluminum, and an increase in discoloration. A distinctive feature of the polymerization catalyst of this invention is that the catalyst exhibits a significant catalytic activity even in a small amount of the aluminum component added. As a result, the catalyst of this invention is superior in thermal stability and thermal oxidation stability with a reduction in insoluble particles and discoloration attributable to aluminum.

The phosphorus compound having a specific structure, which constitutes the polymerization catalyst of this invention, refers to at least one phosphorus compound selected from the group consisting of phosphorus metal salt compounds, at least one phosphorus compound selected from the group consisting of phosphorus compounds having at least one P—OH bond, at least one phosphorus compound selected from the group consisting of phosphinic acid derivative compounds, phosphine oxide derivative compounds, phosphonous acid derivative compounds, phosphinous acid derivative compounds and phosphine derivative compounds, at least one phosphorus compound selected from the group consisting of the compounds represented by the general formula (22) below, or at least one phosphorus compound selected from the group consisting of the compounds represented by the general formula (30) below. Among these, at least one phosphorus compound selected from the group consisting of phosphorus metal salt compounds, at least one phosphorus compound selected from phosphorus compounds having at least one P—OH bond, at least one phosphorus compound selected from the group consisting of the compounds represented by the general formula (22) below, or at least one phosphorus compound selected from the group consisting of the compounds represented by the general formula (30) below is used preferably for effectively improving the catalytic activity. The phosphorus metal salt compound constituting the polymerization catalyst of this invention is not particularly limited insofar as it is a metal salt of a phosphorus compound, but a metal salt of a phosphonic acid derivative compound is used preferably for a higher effect of improving the catalytic activity. The metal salt of a phosphorus compound includes mono-metal salts, di-metal salts and tri-metal salts.

In the phosphorus compound described above, the metal moiety used in the metal salt is preferably a member selected from Li, Na, K, Be, Mg, Sr, Ba, Mn, Ni, Cu and Zn in order to achieve a higher effect of improving the catalytic activity. Among these, Li, Na and Mg are particularly preferable.

As the phosphorus metal salt compound constituting the polymerization catalyst of this invention, at least one member selected from the compounds represented by the general formula (15) below is used preferably for a higher effect of improving the catalytic activity.

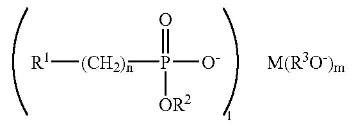

(15)

wherein $R^1$ represents hydrogen, a $C_{1-50}$ hydrocarbon group, or a $C_{1-50}$ hydrocarbon group containing a hydroxyl group, halogen group, alkoxyl group or amino group; $R^2$ represents hydrogen, a $C_{1-50}$ hydrocarbon group, or a $C_{1-50}$ hydrocarbon group containing a hydroxyl group or alkoxyl group; $R^3$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, and l+m is 4 or less; M represents a (l+m)-valent metal cation; n is an integer of 1 or more; and the hydrocarbon group may contain an alicyclic structure or branched structure such as cyclohexyl and an aromatic ring structure such as phenyl and naphthyl.

The above group $R^1$ includes e.g. phenyl, 1-naphthyl, 2-naphthyl, 9-anthryl, 4-biphenyl, 2-biphenyl etc. The above group $R^2$ includes e.g. hydrogen, a methyl group, ethyl group, propyl group, isopropyl group, n-butyl group, sec-butyl group, tert-butyl group, long aliphatic group, phenyl group, naphthyl group, substituted phenyl group and naphthyl group, and the group $—CH_2CH_2OH$. $R^3O^-$ includes e.g. a hydroxide ion, alcoholate ion, acetate ion and acetyl acetone ion.

Among the compounds represented by the general formula (15) above, at least one member selected from the compounds represented by the general formula (16) below is preferably used.

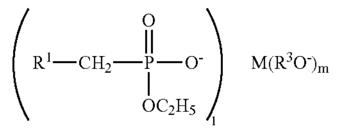

(16)

wherein $R^1$ represents hydrogen, a $C_{1-50}$ hydrocarbon group, or a $C_{1-50}$ hydrocarbon group containing a hydroxyl group, halogen group, alkoxyl group or amino group; $R^3$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, and l+m is 4 or less; M represents a (l+m)-valent metal cation; and the hydrocarbon group may contain an alicyclic structure or branched structure such as cyclohexyl and an aromatic ring structure such as phenyl and naphthyl.

The above group $R^1$ in the general formula (16) above includes e.g. phenyl, 1-naphthyl, 2-naphthyl, 9-anthryl, 4-biphenyl, 2-biphenyl etc. $R_3O^-$ includes e.g. a hydroxide ion, alcoholate ion, acetate ion and acetyl acetone ion.

Among the phosphorus compounds described above, the compounds having an aromatic ring structure are used preferably for a higher effect of improving the catalytic activity.

In the compounds of the general formula (16) above, M is preferably a member selected from Li, Na, K, Be, Mg, Sr, Ba, Mn, Ni, Cu and Zn in order to achieve a higher effect of improving the catalytic activity. Among these, Li, Na and Mg are particularly preferable.

The phosphorus metal salt compound of this invention includes lithium [ethyl (1-naphthyl) methylphosphonate], sodium [ethyl (1-naphthyl) methylphosphonate], magnesium bis[ethyl (1-naphthyl) methylphosphonate], potassium [ethyl (2-naphthyl) methylphosphonate], magnesium bis [ethyl (2-naphthyl) methylphosphonate], lithium [ethyl benzylphosphonate], sodium [ethyl benzylphosphonate], magnesium bis[ethyl benzylphosphonate], beryllium bis[ethyl benzylphosphonate], strontium bis[ethyl benzylphosphonate], manganese bis[ethyl benzylphosphonate], sodium benzylphosphonate, magnesium bis[benzylphosphonic acid], sodium [ethyl (9-anthryl) methylphosphonate], magnesium bis[ethyl (9-anthryl) methylphosphonate], sodium [ethyl 4-hydroxybenzylphosphonate], magnesium bis[ethyl 4-hydroxybenzylphosphonate], sodium [phenyl 4-chlorobenzylphosphonate], magnesium bis[ethyl 4-chlorobenzylphosphonate], sodium [methyl 4-aminobenzylphosphonate], magnesium bis[methyl 4-aminobenzylphosphonate], sodium phenylphosphonate, magnesium bis[ethyl phenylphosphonate], zinc bis[ethyl phenylphosphonate] etc. Among these, lithium [ethyl (1-naphthyl) methylphosphonate], sodium [ethyl (1-naphthyl) methylphosphonate], magnesium bis[ethyl (1-naphthyl) methylphosphonate], lithium [ethyl benzylphosphonate], sodium [ethyl benzylphosphonate], magnesium bis[ethyl benzylphosphonate], sodium benzylphosphonate and magnesium bis[benzylphosphonic acid] are particularly preferable.

Another phosphorus metal salt compound constituting the polymerization catalyst of this invention comprises at least one member selected from the compounds represented by the following general formula (17).

(17)

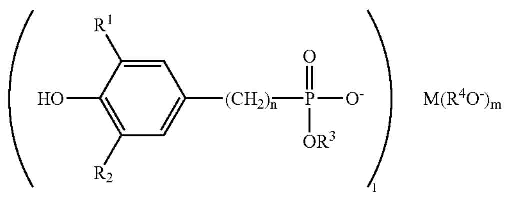

wherein $R^1$ and $R^2$ independently represent hydrogen or a $C_{1-30}$ hydrocarbon group; $R^3$ represents hydrogen, a $C_{1-50}$ hydrocarbon group, or a $C_{1-50}$ hydrocarbon group containing a hydroxyl group or alkoxyl group; $R^4$ represents hydrogen, a $C_{1-50}$ hydrocarbon group, or a $C_{1-50}$ hydrocarbon group containing a hydroxyl group, alkoxyl group or carbonyl; $R^4O^-$ includes e.g. a hydroxide ion, alcoholate ion, acetate ion and acetyl acetone ion; l is an integer of 1 or more, m is 0 or an integer of 1 or more, and l+m is 4 or less; M represents a (l+m)-valent metal cation; n is an integer of 1 or more; and the hydrocarbon group may contain an alicyclic structure or branched structure such as cyclohexyl and an aromatic ring structure such as phenyl and naphthyl.

Among these, at least one member selected from the compounds represented by the general formula (18) below is preferably used.

(18)

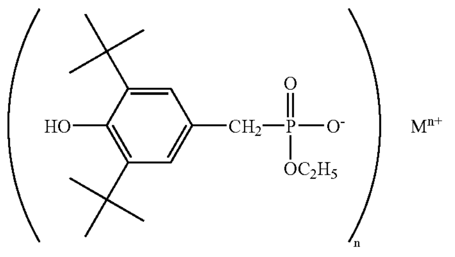

wherein $M^{n+}$ represents an n-valent metal cation, and n is 1, 2, 3 or 4.

In the compounds of the general formula (17) or (18) above, M is preferably a member selected from Li, Na, K, Be, Mg, Sr, Ba, Mn, Ni, Cu and Zn in order to achieve a higher effect of improving the catalytic activity. Among these, Li, Na and Mg are particularly preferable.

The specific phosphorus metal salt compound of this invention includes lithium [ethyl 3,5-di-tert-butyl-4-hydroxybenzylphosphonate], sodium [ethyl 3,5-di-tert-butyl-4-hydroxybenzylphosphonate], sodium [3,5-di-tert-butyl-4-hydroxybenzylphosphonic acid], potassium [ethyl 3,5-di-tert-butyl-4-hydroxybenzylphosphonate], magnesium bis [ethyl 3,5-di-tert-butyl-4-hydroxybenzylphosphonate], magnesium bis[3,5-di-tert-butyl-4-hydroxybenzylphosphonic acid], beryllium bis[methyl 3,5-di-tert-butyl-4-hydroxybenzylphosphonate], strontium bis[ethyl 3,5-di-tert-butyl-4-hydroxybenzylphosphonate], barium bis[phenyl 3,5-di-tert-butyl-4-hydroxybenzylphosphonate], manganese bis[ethyl 3,5-di-tert-butyl-4-hydroxybenzylphosphonate], nickel bis [ethyl 3,5-di-tert-butyl-4-hydroxybenzylphosphonate], copper bis[ethyl 3,5-di-tert-butyl-4-hydroxybenzylphosphonate], zinc bis[ethyl 3,5-di-tert-butyl-4-hydroxybenzylphosphonate] etc. Among these, lithium [ethyl 3,5-di-tert-butyl-4-hydroxybenzylphosphonate], sodium [ethyl 3,5-di-tert-butyl-4-hydroxybenzylphosphonate] and magnesium bis[ethyl 3,5-di-tert-butyl-4-hydroxybenzylphosphonate] are particularly preferable.

The phosphorus compound having at least one P—OH bond, which constitutes the polymerization catalyst of this invention, is not particularly limited insofar as it is a phosphorus compound having at least one P—OH in the molecule. Among these phosphorus compounds, the phosphonic acid derivative compounds having at least one P—OH bond are used preferably for a higher effect of improving the catalytic activity.

Among the phosphorus compounds described above, the compounds having an aromatic ring structure are used preferably for a higher effect of improving the catalytic activity.

The phosphorus compound having at least one P—OH bond, which constitutes the polymerization catalyst of this invention, is preferably at least one member selected from the compounds represented by the following general formula (19) in order to achieve a higher effect of improving the catalytic activity.

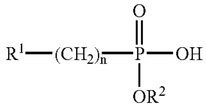

(19)

wherein $R^1$ represents hydrogen, a $C_{1-50}$ hydrocarbon group, or a $C_{1-50}$ hydrocarbon group containing a hydroxyl group, halogen group, alkoxyl group or amino group; $R^2$ represents hydrogen, a $C_{1-50}$ hydrocarbon group, or a $C_{1-50}$ hydrocarbon group containing a hydroxyl group or alkoxyl group; n is an integer of 1 or more; and the hydrocarbon group may contain an alicyclic structure or branched structure such as cyclohexyl and an aromatic ring structure such as phenyl and naphthyl.

In the general formula (19) above, $R^1$ includes e.g. phenyl, 1-naphthyl, 2-naphthyl, 9-anthryl, 4-biphenyl, 2-biphenyl etc. The above $R^2$ includes e.g. hydrogen, a methyl group, ethyl group, propyl group, isopropyl group, n-butyl group, sec-butyl group, tert-butyl group, long aliphatic group, phenyl group, naphthyl group, substituted phenyl group and naphthyl group, and the group $—CH_2CH_2OH$.

Among the phosphorus compounds described above, the compounds having an aromatic ring structure are used preferably for a higher effect of improving the catalytic activity.

In this invention, the phosphorus compounds having at least one P—OH bond include ethyl (1-naphthyl) methylphosphonate, (1-naphthyl) methylphosphonic acid, ethyl (2-naphthyl) methylphosphonate, ethyl benzylphosphonate, benzylphosphonic acid, ethyl (9-anthryl) methylphosphonate, ethyl 4-hydroxybenzylphosphonate, ethyl 2-methylbenzylphosphonate, phenyl 4-chlorobenzylphosphonate, methyl 4-aminobenzylphosphonate and ethyl 4-methoxybenzylphosphonate. Among these, ethyl (1-naphthyl) methylphosphonate and ethyl benzylphosphonate are particularly preferable.

Another phosphorus compound constituting the polymerization catalyst of this invention includes a specific phosphorus compound having at least one P—OH bond. The specific phosphorus compound having at least one P—OH bond refers to at least one compound selected from the compounds represented by the following general formula (20).

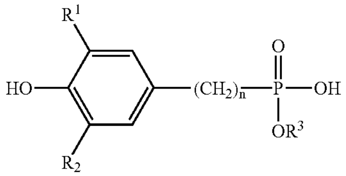

(20)

wherein $R^1$ and $R^2$ independently represent hydrogen or a $C_{1-30}$ hydrocarbon group; $R^3$ represents hydrogen, a $C_{1-50}$ hydrocarbon group, or a $C_{1-50}$ hydrocarbon group containing a hydroxyl group or alkoxyl group; n is an integer of 1 or more; and the hydrocarbon group may contain an alicyclic structure or branched structure such as cyclohexyl and an aromatic ring structure such as phenyl and naphthyl.

Among these, at least one member selected from the compounds represented by the following general formula (21) is used preferably for a higher effect of improving the catalytic activity.

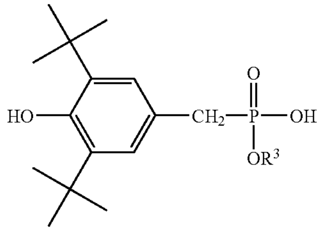

(21)

wherein $R^3$ represents hydrogen, a $C_{1-50}$ hydrocarbon group, or a $C_{1-50}$ hydrocarbon group containing a hydroxyl group or alkoxyl group, and the hydrocarbon group may contain an alicyclic structure or branched structure such as cyclohexyl and an aromatic ring structure such as phenyl and naphthyl.

In the general formula (21) above, $R^3$ includes e.g. hydrogen, a methyl group, ethyl group, propyl group, isopropyl group, n-butyl group, sec-butyl group, tert-butyl group, long aliphatic group, phenyl group, naphthyl group, substituted phenyl group and naphthyl group, and the group $—CH_2CH_2OH$.

In this invention, the specific phosphorus compound having at least one P—OH bond includes ethyl 3,5-di-tert-butyl-4-hydroxybenzylphosphonate, methyl 3,5-di-tert-butyl-4-hydroxybenzylphosphonate, isopropyl 3,5-di-tert-butyl-4-hydroxybenzylphosphonate, phenyl 3,5-di-tert-butyl-4-hydroxybenzylphosphonate, octadecyl 3,5-di-tert-butyl-4-hydroxybenzylphosphonate, and 3,5-di-tert-butyl-4-hydroxybenzylphosphonic acid. Among these, ethyl 3,5-di-tert-butyl-4-hydroxybenzylphosphonate and methyl 3,5-di-tert-butyl-4-hydroxybenzylphosphonate are particularly preferable.

Another phosphorus compound constituting the polymerization catalyst of this invention is a phosphorus compound represented by the following general formula (22).

$$R^1—P(=O)(OR^2)(OR^3) \quad (22)$$

wherein $R^1$ represents a $C_{1-50}$ hydrocarbon group or a $C_{1-50}$ hydrocarbon group containing a hydroxyl group, halogen atom, alkoxyl group or amino group; $R^2$ and $R^3$ independently represent hydrogen, a $C_{1-50}$ hydrocarbon group, or a $C_{1-50}$ hydrocarbon group containing a hydroxyl group or alkoxyl group; and the hydrocarbon group may contain an alicyclic structure, a branched structure and an aromatic ring structure.

Among these, the phosphorus compounds represented by the following general formula (23) are preferably used.

$$R^1—CH_2—P(=O)(OR^2)(OR^3) \quad (23)$$

wherein $R^1$ represents a $C_{1-49}$ hydrocarbon group or a $C_{1-49}$ hydrocarbon group containing a hydroxyl group, halogen atom, alkoxyl group or amino group; $R^2$ and $R^3$ independently represent hydrogen, a $C_{1-50}$ hydrocarbon group, or a $C_{1-50}$ hydrocarbon group containing a hydroxyl group or alkoxyl group; and the hydrocarbon group may contain an alicyclic structure, a branched structure and an aromatic ring structure.

The compound of the general formula (23) is more preferably a compound wherein at least one of $R^1$, $R^2$ and $R^3$ has an aromatic ring structure.

Specifically, the phosphorus compounds represented by the general formula (23) above include phosphorus compounds represented by the formulae (24) to (29) below, whose aromatic ring may be substituted with a methyl group, chloro group or amino group.

(24)

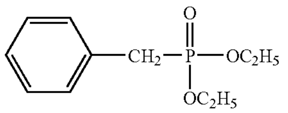

BPADE (25)

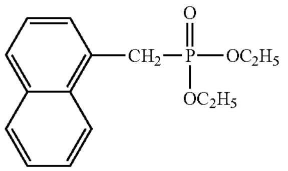

NMPA (26)

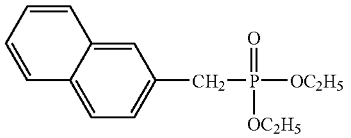

2-NMPA (27)

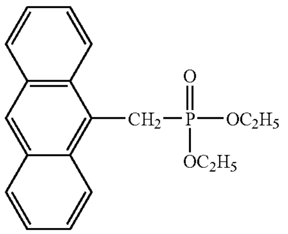

AMPA (28)

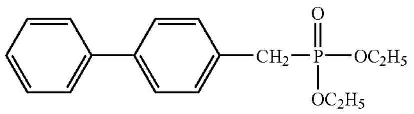

4PBPADE (29)

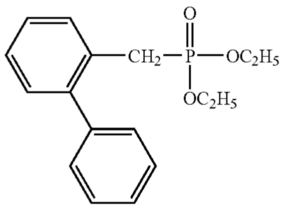

2PBPADE

The phosphorus compound used as the polycondensation catalyst in this invention is preferably the one having a higher molecular weight which is hardly distilled away during polymerization, thus exhibiting a higher effect.

Another phosphorus compound constituting the polymerization catalyst of this invention is at least one phosphorus compound selected from the compounds represented by the following general formula (30).

(30)

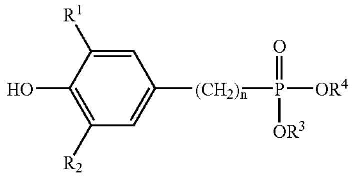

wherein $R^1$ and $R^2$ independently represent hydrogen or a $C_{1-30}$ hydrocarbon group; $R^3$ and $R^4$ independently represent hydrogen, a $C_{1-50}$ hydrocarbon group, or a $C_{1-50}$ hydrocarbon group containing a hydroxyl group or alkoxyl group; n is an integer of 1 or more; and the hydrocarbon group may contain an alicyclic or branched structure such as cyclohexyl and an aromatic ring structure such as phenyl and naphthyl.

Among those compounds of the general formula (30) above, at least one member selected from the compounds represented by the general formula (31) below is used preferably for a higher effect of improving the catalytic activity.

(31)

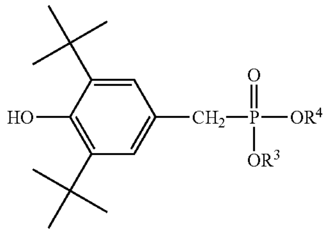

wherein $R^3$ and $R^4$ independently represent hydrogen, a $C_{1-50}$ hydrocarbon group or a $C_{1-50}$ hydrocarbon group containing a hydroxyl group or alkoxyl group, and the hydrocarbon group may contain an alicyclic or branched structure such as cyclohexyl and an aromatic ring structure such as phenyl and naphthyl.

In the general formula (31) above, $R^3$ and $R^4$ include e.g. hydrogen, a short-chain aliphatic group such as methyl group and butyl group, a long-chain aliphatic group such as octadecyl, an aromatic group such as phenyl group, naphthyl group, substituted phenyl group and naphthyl group, and the group $-CH_2CH_2OH$.

The specific phosphorus compound of this invention includes diisopropyl 3,5-di-tert-butyl-4-hydroxybenzylphosphonate, di-n-butyl 3,5-di-tert-butyl-4-hydroxybenzylphosphonate, dioctadecyl 3,5-di-tert-butyl-4-hydroxybenzylphosphonate and diphenyl 3,5-di-tert-butyl-4-hydroxybenzylphosphonate. Among these, dioctadecyl 3,5-di-tert-butyl-4-hydroxybenzylphosphonate and diphenyl 3,5-di-tert-butyl-4-hydroxybenzylphosphonate are particularly preferable.

Another phosphorous compound constituting the polymerization catalyst of this invention is at least one phosphorus compound selected from the group consisting of phosphinic acid derivative compounds, phosphine oxide derivative compounds, phosphonous acid derivative compounds, phosphinous acid derivative compounds and phosphine derivative compounds.

The phosphonic acid derivative compounds, phosphinic acid derivative compounds, phosphine oxide derivative compounds, phosphonous acid derivative compounds, phosphinous acid derivative compounds and phosphine derivative compounds in this invention refer to compounds having the structures represented by the following formulae (32) to (37) respectively.

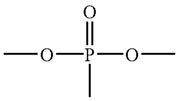

(32)

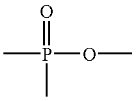

(33)

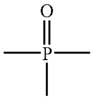

(34)

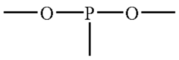

(35)

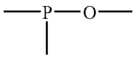

(36)

(37)

Among the phosphinic acid derivative compounds, phosphine oxide derivative compounds, phosphonous acid derivative compounds, phosphinous acid derivative compounds and phosphine derivative compounds, the compounds represented by formulae (38) to (43) below are used preferably as the phosphorus compound of this invention.

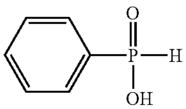

(38)

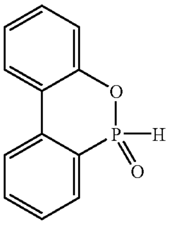

(39)

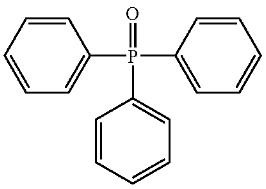

(40)

-continued

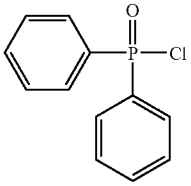

(41)

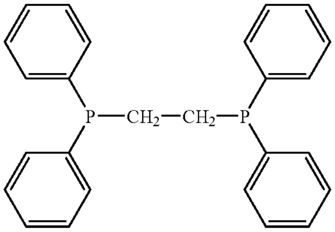

(42)

$[(CH_3)(CH_2)_7]_3P$ (43)

Among the phosphorus compounds described above, the compounds having an aromatic ring structure are used preferably for a higher effect of improving the catalytic activity.

The phosphorus compound having a specific structure as described above can be used to produce a polyester polymerization catalyst which comprises not an antimony compound or a germanium compound as a major catalytic component, but aluminum as the major metal component, is excellent in catalytic activity, and without deactivating or removing the catalyst, gives polyester not only excellent in thermal stability by effectively inhibiting thermal degradation during melt molding but also superior in thermal oxidation stability and hydrolytic stability.

By using the phosphorus compound having a specific structure in combination, the catalyst exhibiting a sufficient catalytic effect is obtained even if the amount of aluminum in the polyester polymerization catalyst is low.

The amount of the phosphorus compound of this invention used is preferably 0.0001 to 0.1 mol-%, more preferably 0.005 to 0.05 mol-% relative to the number of moles of the whole constituent units of polycarboxylic acid components in the resulting polyester. When the amount of the phosphorus compound added is less than 0.0001 mol-%, the effect of the compound added may not be exhibited, while when the compound is added in an amount of higher than 0.1 mol-%, the catalytic activity of the polyester polymerization catalyst may be lowered, and this lowering tendency is varied depending on e.g. the amount of aluminum used.

There is a technique of using an aluminum compound as a major catalytic component without using a phosphorus compound, wherein discoloration resulting from a reduction in thermal stability where the aluminum compound is used as the major catalyst is prevented by adding a cobalt compound to a reduced amount of the aluminum compound, but when the cobalt compound is added at a certain degree to achieve a sufficient catalytic activity, the thermal stability is lowered. Accordingly, this technique hardly meets both the conditions.

According to this invention, a polymerization catalyst free of problems such as a reduction in thermal stability and formation of insoluble particles and having a sufficient catalytic effect even if the amount of aluminum added as a metal-containing component is low can be obtained by using the phosphorus compound having a specific chemical structure as described above, and this polymerization catalyst can be used to improve the thermal stability of polyester films, hollow molded articles such as bottles, and fibers and engineering plastics during melt molding. Addition of phosphoric acid or a phosphate such as trimethyl phosphate in place of the phosphorus compound of this invention is not practical because there does not bring about any effect of the compound added. Further, even if the phosphorus compound of this invention in the amount defined in this invention is used in combination with a conventional metal-containing polyester polymerization catalyst such as antimony compound, titanium compound, tin compound or germanium compound, there does not bring about any effect of promoting the melt polymerization reaction.

Another embodiment of this invention is a polyester polymerization catalyst comprising at least one member selected from aluminum salts of phosphorus compounds. The aluminum salt of a phosphorus compound may be used in combination with another aluminum compound or phosphorus compound.

The aluminum salt of a phosphorus compound in this invention is not particularly limited insofar as it is a phosphorus compound having an aluminum moiety, but an aluminum salt of a phosphonic acid derivative compound is used preferably for a higher effect of improving the catalytic activity. The aluminum salt of a phosphorus compound includes mono-aluminum salts, di-aluminum salts and tri-aluminum salts.

Among the aluminum salts of phosphorus compounds described above, the compounds having an aromatic ring structure are used preferably for a higher effect of improving the catalytic activity.

The aluminum salt of a phosphorus compound constituting the polymerization catalyst of this invention is preferably at least one member selected from the compounds represented by the general formula (44) below in order to achieve a higher effect of improving the catalytic activity.

(44)

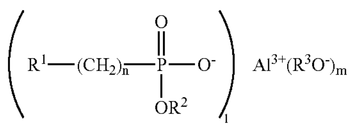

wherein $R^1$ represents hydrogen, a $C_{1-50}$ hydrocarbon group, or a $C_{1-50}$ hydrocarbon group containing a hydroxyl group, halogen group, alkoxyl group or amino group; $R^2$ represents hydrogen, a $C_{1-50}$ hydrocarbon group, or a $C_{1-50}$ hydrocarbon group containing a hydroxyl group or alkoxyl group; $R^3$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, and l+m is 3; n is an integer of 1 or more; and the hydrocarbon group may contain an alicyclic structure or branched structure such as cyclohexyl and an aromatic ring structure such as phenyl and naphthyl.

In the general formula (44) above, $R^1$ includes e.g. phenyl, 1-naphthyl, 2-naphthyl, 9-anthryl, 4-biphenyl, 2-biphenyl etc. In the general formula (44) above, $R^2$ includes e.g. hydrogen, a methyl group, ethyl group, propyl group, isopropyl group, n-butyl group, sec-butyl group, tert-butyl group, long aliphatic group, phenyl group, naphthyl group, substituted phenyl group and naphthyl group, and the group $—CH_2CH_2OH$. The above $R^3O^-$ includes e.g. a hydroxide ion, alcoholate ion, ethylene glycolate ion, acetate ion and acetyl acetone ion.

The aluminum salt of a phosphorus compound in this invention includes an aluminum salt of ethyl (1-naphthyl) methylphosphonate, an aluminum salt of (1-naphthyl) methylphosphonic acid, an aluminum salt of ethyl (2-naphthyl) methylphosphonate, an aluminum salt of ethyl benzyl benzylphosphonate, an aluminum salt of benzylphosphonic acid, an aluminum salt of ethyl (9-anthryl) methylphosphonate, an aluminum salt of ethyl 4-hydroxybenzylphosphonate, an aluminum salt of ethyl 2-methylbenzylphosphonate, an aluminum salt of phenyl 4-chlorobenzylphosphonate, an aluminum salt of methyl 4-aminobenzylphosphonate, an aluminum salt of ethyl 4-methoxybenzylphosphonate and an aluminum salt of ethyl phenylphosphonate. Among these, an aluminum salt of ethyl (1-naphthyl) methylphosphonate and an aluminum salt of ethyl benzylphosphonate are particularly preferable.

Another embodiment of this invention is a polyester polymerization catalyst comprising at least one member selected from the aluminum salts of specific phosphorus compound represented by the general formula (45) below. The aluminum salt of a phosphorus compound may be used in combination with another aluminum compound and phosphorus compound.

The aluminum salt of specific phosphorus compound constituting the polymerization catalyst of this invention refers to the one comprising at least one member selected from the compounds represented by the following general formula (45).

(45)

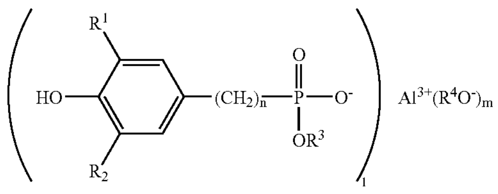

wherein $R^1$ and $R^2$ independently represent hydrogen or a $C_{1-30}$ hydrocarbon group; $R^3$ represents hydrogen, a $C_{1-50}$ hydrocarbon group, or a $C_{1-50}$ hydrocarbon group containing a hydroxyl group or alkoxyl group; $R^4$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, and l+m is 3; n is an integer of 1 or more; and the hydrocarbon group may contain an alicyclic structure or branched structure such as cyclohexyl and an aromatic ring structure such as phenyl and naphthyl.

Among these, at least one member selected from the compounds represented by the general formula (46) below is preferably used.

(46)

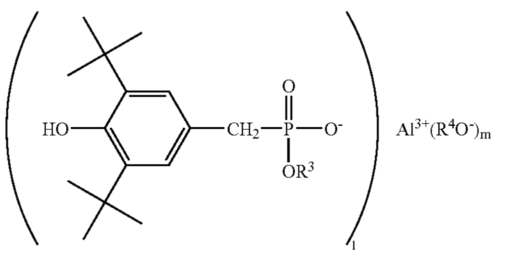

wherein $R^3$ represents hydrogen, a $C_{1-50}$ hydrocarbon group, or a $C_{1-50}$ hydrocarbon group containing a hydroxyl group or alkoxyl group; $R^4$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, and l+m is 3; and the hydrocarbon group may contain an alicyclic structure or branched structure such as cyclohexyl and an aromatic ring structure such as phenyl and naphthyl.

In the general formula (46) above, $R^3$ includes e.g. hydrogen, a methyl group, ethyl group, propyl group, isopropyl group, n-butyl group, sec-butyl group, tert-butyl group, long aliphatic group, phenyl group, naphthyl group, substituted phenyl group and naphthyl group, and the group $—CH_2CH_2OH$. The above $R^4O^-$ includes e.g. a hydroxide ion, alcoholate ion, ethylene glycolate ion, acetate ion and acetyl acetone ion.

The aluminum salt of a specific phosphorus compound in this invention includes an aluminum salt of ethyl 3,5-di-tert-butyl-4-hydroxybenzylphosphonate, an aluminum salt of methyl 3,5-di-tert-butyl-4-hydroxybenzylphosphonate, an aluminum salt of isopropyl 3,5-di-tert-butyl-4-hydroxybenzylphosphonate, an aluminum salt of phenyl 3,5-di-tert-butyl-4-hydroxybenzylphosphonate, and an aluminum salt of 3,5-di-tert-butyl-4-hydroxybenzylphosphonic acid. Among these, an aluminum salt of ethyl 3,5-di-tert-butyl-4-hydroxybenzylphosphonate and an aluminum salt of methyl 3,5-di-tert-butyl-4-hydroxybenzylphosphonate are particularly preferable.

The aluminum salt of a phosphorus compound as described above can be used to produce a polyester polymerization catalyst which is free of an antimony compound or a germanium compound as a major catalytic component, is excellent in catalytic activity, and without deactivating or removing the catalyst, gives polyester not only excellent in thermal stability by effectively inhibiting thermal degradation during melt molding but also superior in thermal oxidation stability and hydrolytic stability.

By using the aluminum salt of a phosphorus compound in this invention, the catalyst exhibiting a sufficient catalytic effect is obtained even if the amount of aluminum in the polyester polymerization catalyst is low.

The amount of the aluminum salt of a phosphorus compound used in this invention is preferably 0.0001 to 0.1 mol-%, more preferably 0.005 to 0.05 mol-%, relative to the number of moles of the whole constituent units of polycarboxylic acid components in the resultant polyester. When the amount of the aluminum salt of a phosphorus compound added is less than 0.0001 mol-%, the effect of the salt added may not be exhibited, while the amount thereof is greater than 0.1 mol-%, there may arise problems such as a reduction in the thermal stability and thermal oxidation stability of the resultant polyester, formation of insoluble particles and an increase in discoloration. A distinctive feature of the polymerization catalyst of this invention is that the catalyst exhibits a significant catalytic activity even in a small amount of the aluminum component added. As a result, the catalyst of this invention is superior in thermal stability and thermal oxidation stability with a reduction in insoluble particles and discoloration.

The aluminum salt of a phosphorus compound in this invention can be used to produce a polymerization catalyst free of problems such as a reduction in thermal stability and formation of insoluble particles and having a sufficient catalytic effect even if the amount of the aluminum component is low, and this polymerization catalyst can be used to improve the thermal stability of polyester films, hollow molded articles such as bottles and fibers and engineering plastics during melt molding.

When the polyester polymerization catalyst of this invention is used for polymerization of polyethylene terephthalate (PET), the thermal stability (TS) parameter of the polyethylene terephthalate preferably satisfies the following relationship (1):

$$TS<0.30 \quad (1)$$

TS is determined as follows: 1 g PET having an initial intrinsic viscosity ($[IV]_i$) of about 0.65 dl/g is placed in a glass test tube, vacuum-dried at 130° C. for 12 hours, and maintained in a molten state at 300° C. for 2 hours in a non-circulating nitrogen atmosphere, to determine its final intrinsic viscosity ($[IV]_f$) from which TS is calculated using the equation below.

The non-circulating nitrogen atmosphere refers to a stationary nitrogen atmosphere in which a glass test tube containing e.g. resin chips is connected to a vacuum line and the replacement of the atmosphere by nitrogen is conducted five or more times by introducing nitrogen under reduced pressure, to achieve a nitrogen atmosphere at 100 Torr.

$$TS=0.245\{[IV]f^{-1.47}-[IV]i^{-1.47}\}$$

The catalyst having such constitution can be used to produce polyester giving molded articles excellent in melt thermal stability during heat melting in production of molded articles such as films, bottles and fibers with less formation of discoloration and insoluble particles.

TS is more preferably 0.25 or less, particularly preferably 0.20 or less.

Preferably, the activity parameter (AP) of the polyester polymerization catalyst of this invention satisfies the following relationship (2):

$$AP(min)<2T\ (min) \quad (2)$$

wherein AP is the time (min) necessary for polymerizing polyethylene terephthalate having an intrinsic viscosity of 0.65 dl/g at 275° C. under reduced pressure of 0.1 Torr in the presence of a predetermined amount of a catalyst, and T is the AP determined in the presence of antimony trioxide as the catalyst in an amount of 0.05 mol-% in terms of antimony atom relative to an acid component in polyethylene terephthalate formed.

As antimony trioxide used for comparison in this invention, antimony trioxide having 99% or more purity is used. For example, Antimony (III) oxide having 99.999% purity produced by ALDRICH is used.

The method of measuring AP is specifically as follows:

(In the step of producing BHET) Terephthalic acid and ethylene glycol in the molar ratio of 1:2 are used to produce a mixture of bis(2-hydroxyethyl) terephthalate (BHET) and oligomers (referred to hereinafter as BHET mixture) having a degree of esterification of 95%.

(In the step of adding a catalyst) A predetermined amount of a catalyst is added to the BHET mixture, and the mixture is stirred in a nitrogen atmosphere at normal pressure at 245° C. for 10 minutes, and then the temperature is increased to 275° C. over 50 minutes during which the pressure of the oligomer mixture in the reaction system is gradually reduced to 0.1 Torr.

(In the step of polycondensation) Polycondensation reaction is conducted at 275° C. at 0.1 Torr, and the mixture is polymerized until the intrinsic viscosity (IV) of the polyethylene terephthalate reaches 0.65 dl/g.

The polymerization time required in the step of polycondensation is determined as AP (min).

These procedures are conducted in a reaction unit in a batch system.

Production of a BHET mixture (in the step of producing BHET) is conducted in a known method. For example, terephthalic acid and ethylene glycol in the molar ratio of 1:2 are introduced into an autoclave in a batch system equipped with a stirrer, followed by esterification reaction at 245° C. at a pressure of 0.25 MPa during while water is distilled away from the system.

By allowing the activity parameter AP to be within the range described above, the reaction rate is high thus reducing the time for producing polyester through polycondensation. AP is preferably 1.5 T or less, more preferably 1.3 T or less, and most preferably 1.0 T or less.

(In the step of adding a catalyst), "a predetermined amount of a catalyst" means the amount of a catalyst which is varied depending on the activity of the catalyst, and the amount of a catalyst is low when the catalyst has a high activity, whereas the amount of a catalyst is high when the catalyst has a low activity. The amount of the catalyst used is up to 0.1 mol-% in terms of its aluminum compound relative to the number of moles of terephthalic acid. The catalyst added in an amount greater than 0.1 mol-% is not practical because the amount in residual polyester is increased.

When the polyester polymerization catalyst of this invention is used to produce PET, the thermal oxidation stability (TOS) of the PET preferably satisfies the following relationship (3).

$$TOS<0.10 \quad (3)$$

TOS in this relationship is determined as follows: Melt-polymerized PET resin chips having an IV of about 0.65 dl/g is frozen and milled to give powders of 20 meshes or less which are then vacuum-dried at 130° C. for 12 hours, and 0.3 g of the powders are placed in a glass test tube and vacuum-dried at 70° C. for 12 hours and then heated at 230° C. for 15 minutes in dry air over silica gel, to determine their final IV from which TOS is calculated using the following equation:

$$TOS=0.245\{[IV]_{f1}^{-1.47}-[IV]_i^{-1.47}\}$$

wherein $[IV]_i$ and $[IV]_{f1}$ refer to IV (dl/g) before and after the heating test respectively.

The method of heating in dry air over silica gel can be, for example, a method wherein a glass test tube is heated in air dried by connecting a dry tube containing silica gel to an upper part of the test tube.

By using the polyester polymerization catalyst constituted as described above, polyester giving molded articles such as films and PET bottles excellent in thermal aging resistance can be obtained.

TOS is more preferably 0.09 or less, more preferably 0.08 or less.

When the polyester polymerization catalyst of this invention is used for polymerizing PET, the hydrolytic stability (HS) parameter of the PET preferably satisfies the following relationship (4).

$$HS<0.10 \quad (4)$$

HS is determined as follows: Melt-polymerized chips of PET (having an initial IV ($[IV]_i$) of about 0.65 dl/g are frozen and milled to give powders of 20 meshes or less which are then vacuum-dried at 130° C. for 12 hours, and 1 g of the powders, together with 100 ml pure water, are placed in a beaker and then heated under stirring for 6 hours in a closed system at 130° C. under pressure, to determine their intrinsic viscosity ([IV]f2) from which HS is calculated using the following equation:

$$HS=0.245\{[IV]_{f2}^{-1.47}-[IV]_i^{-1.47}\}$$

The beaker used in measurement of HS is the one from which no acid or alkali is eluted. Specifically, use of a stainless steel beaker, a quartz beaker etc. is preferable.

By using the catalyst having such constitution, a polyester polymer giving molded articles excellent in hydrolytic stability can be obtained.

HS is more preferably 0.09 or less, particularly preferably 0.085 or less.

When the polyester polymerization catalyst of this invention is used for polymerization of PET, the color delta b value parameter (Δb) of the PET preferably satisfies the following relationship (5):

$$\Delta b<4.0 \quad (5)$$

Δb in this relationship is a value obtained by subtracting the Hunter's b value determined by a color difference meter after polymerization of polyethylene terephthalate (PET) resin chips having an intrinsic viscosity of about 0.65 dl/g melt-polymerized in the presence of antimony trioxide as the catalyst, from the b value in the presence of a predetermined catalyst. This antimony trioxide is added in an amount of 0.05 mol-% in terms of antimony atom relative to an acid component in polyethylene terephthalate formed. Antimony trioxide used for comparison is antimony trioxide having 99% or more purity. For example, Antimony (III) oxide having 99.999% purity produced by ALDRICH is used.

According to such constitution, the catalyst can give polyester excellent color tone when formed into melt-molded articles. The Δb value is more preferably 3.0 or less, particularly preferably 2.5 or less.

The PET resin chips used in measurement of TS, TOS and HS in this invention are those prepared by rapid cooling thereof in a molten state after the steps 1) to 3) above. The resin chips used in this measurement are, for example, those in the form of a cylinder of about 3 mm in length and about 2 mm in diameter. The resin chips used in color measurement are substantially amorphous resin chips obtained by rapid cooling thereof in a molten state after the steps 1) to 3) above. The method of obtaining substantially amorphous resin chips includes e.g. a method wherein the polymer after melt polymerization is removed from the reaction system by discharging it through an outlet in the reaction system, immediately quenched with cold water, maintained in cold water for a sufficient time and cut into chips. The resin chips thus obtained are free of whitening resulting from crystallization and transparent in the outward appearance. The resin chips thus obtained are air-dried for about one day at room temperature on e.g. a filter paper and then measured for color. After the operation described above, the resin chips remain transparent in the outward appearance without undergoing whitening attributable to crystallization. In the resin chips for color measurement, additives (e.g. titanium dioxide) influencing the outward appearance shall not be used. The resin chips used in color measurement are, for example, those in the form of a cylinder of about 3 mm in length and about 2 mm in diameter.

Out of the relationships (1) to (5) above, at least two relationships are satisfied by the polyester polymerization catalyst of this invention in a preferable embodiment.

The polyester polymerization catalyst of this invention is preferably free of alkali metals, alkaline earth metals or compounds thereof.

However, in a preferable embodiment of this invention, at least one member selected from alkali metals, alkaline earth metals and compounds thereof is allowed to be coexistent in a small amount as a second metal containing component in addition to aluminum or a compound thereof. The secondary metal-containing component is allowed to be coexistent in the catalyst system in order to improve not only the effect of inhibiting formation of diethylene glycol but also the catalytic activity, thus providing a catalytic component increasing the reaction rate to improve productivity effectively.

The technique of adding an alkali metal compound or an alkaline earth metal compound to an aluminum compound to form a catalyst having a sufficient catalytic activity is known. When such known catalyst is used, polyester excellent in thermal stability can be obtained, but the known catalyst using an alkali metal compound or an alkaline earth metal compound in combination with an aluminum compound should be added in a larger amount in order to achieve a practical catalytic activity, and use of the alkali metal compound causes an increase in the amount of insoluble particles attributable to the alkali metal, and use of the alkali metal compound in producing fibers causes a decrease in productivity and physical properties of the fibers, while use thereof for producing films causes a deterioration in film physical properties, transparency, thermal stability, thermal oxidation stability and hydrolytic stability. Further, the coloration of melt-molded articles such as fibers and films is deteriorated. When the alkaline earth metal compound is used in combination, a practical activity cannot be achieved without deteriorating the thermal stability and thermal oxidation stability of the resultant polyester, while discoloration occurs upon heating, and the amount of insoluble particles is increased.

In this invention, when an alkali metal, an alkaline earth metal and compounds thereof are added as the polymerization catalyst, the amount M (mol-%) thereof is preferably in the range of $1\times10^{-6}$ to 0.1 mol-%, more preferably $5\times10^{-6}$ to 0.05 mol-%, further preferably $1\times10^{-5}$ to 0.03 mol-%, and most preferably $1\times10^{-5}$ to 0.01 mol-%, relative to the number of moles of the whole polycarboxylic acid units constituting polyester. The amount of the alkali metal and alkaline earth metal added is so small that the rate of reaction can be increased without causing problems such as a reduction in thermal stability, formation of insoluble particles, and discoloration. Further, the rate of reaction can be increased without causing problems such as a reduction in hydrolytic stability. When the amount M of an alkali metal, an alkaline earth metal and compounds thereof is greater than 0.1 mol-% or more, a reduction in thermal stability, formation of insoluble particles, an increase in discoloration and a reduction in hydrolytic stability may be problematic in manufacturing of products. When M is less than $1\times10^{-6}$ mol-%, the effect of the metal added is not evident.

An alkali metal or alkaline earth metal constituting the secondary metal-containing component which is used preferably in addition to aluminum or a compound thereof in this invention is preferably at least one member selected from Li, Na, K, Rb, Cs, Be, Mg, Ca, Sr and Ba, and an alkali metal or a compound thereof is preferably used. When the alkali metal or a compound thereof is used, use of Li, Na or K is particularly preferable. Compounds of the alkali metal or alkaline earth metal include salts of these metals, for example saturated aliphatic carboxylates such as formate, acetate, propionate, butyrate and oxalate, unsaturated aliphatic carboxylates such as acrylate and methacrylate, aromatic carboxylates such as benzoate, halogen-containing carboxylates such as trichloroacetate, hydroxy carboxylates such as lactate, citrate and salicylate, inorganic acid salts such as carbonate, sulfate, nitrate, phosphate, phosphonate, hydrogen carbonate, hydrogen phosphate, hydrogen sulfide, sulfite, thiosulfate, hydrochloride, hydrobromate, chlorate and bromate, organic sulfonates such as 1-propane sulfonate, 1-pentane sulfonate and naphthalene sulfonate, organic sulfates such as lauryl sulfate, alkoxides such as methoxy, ethoxy, n-propoxy, iso-propoxy, n-butoxy and tert-butoxy, chelate compounds such as acetyl acetonate, hydrides, oxides and hydroxides.

When highly alkaline ones such as hydroxides are used out of these alkali metals, alkaline earth metals or compounds thereof, they tend to be hardly dissolved in organic solvents, for example diols such as ethylene glycol or alcohols, so they should be added as an aqueous solution to the polymerization system, which may be problematic in the polymerization process. Further, when highly alkaline ones such as hydroxides are used, polyester during polymerization easily undergoes side reactions such as hydrolysis, while the polymerized polyester is easily discolored and hydrolytic stability tends to be lowered. Accordingly, preferable examples of the alkali metals or compounds thereof or alkaline earth metals or compounds thereof in this invention are alkali metal salts or alkaline earth metal salts selected from saturated aliphatic carboxylate, unsaturated aliphatic carboxylate, aromatic carboxylate, halogen-containing carboxylate, hydroxy carboxylate, sulfate, nitrate, phosphate, phosphonate, hydrogen phosphate, hydrogen sulfide, sulfite, thiosulfate, hydrochloride, hydrobromate, chlorate and bromate, organic sulfonates, organic sulfates, chelate compounds and oxides. Among these, alkaline metal or alkaline earth metal saturated aliphatic carboxylates particularly acetates are preferably used from the viewpoint of easy handling and easy availability.

In a preferable embodiment, a cobalt compound is further added in an amount of less than 10 ppm in terms of cobalt atom to the polyester polymerization catalyst of this invention. The amount thereof is more preferably less than 5 ppm, more preferably 3 ppm.

It is known that the cobalt compound itself has a polymerization activity at a certain degree, but when it is added in such an amount as to exhibit a sufficient catalytic effect, the brightness or thermal stability of the resultant polyester polymer is lowered. The polyester obtained according to this invention is excellent color tone and thermal stability, and by adding the cobalt compound in such a small amount that the catalytic effect thereof is not evident, the discoloration of the resultant polyester can be effectively diminished without causing a reduction in the brightness of the polyester. The object of the cobalt compound in this invention is to diminish discoloration, and the cobalt compound may be added at any stage of polymerization or after polymerization reaction or at any stage after polymerization reaction until molding.

The cobalt compound is not particularly limited, and specific examples thereof include cobalt acetate, cobalt nitrate, cobalt chloride, cobalt acetyl acetonate and cobalt naphthenate or hydrates thereof. Among these, cobalt acetate tetrahydrate is particularly preferable.

Production of polyester according to the present invention can be carried out in the same manner as in the conventional process except that the polyester polymerization catalyst of this invention is used as the catalyst. For example, PET is produced by a direct esterification method wherein terephthalic acid and ethylene glycol and if necessary other copolymerizable components are directly reacted to form an ester while water is distilled away, followed by polycondensation under reduced pressure or by a transesterification method wherein dimethyl terephthalate and ethylene glycol and if necessary other copolymerizable components are directly reacted for transesterification while methyl alcohol is distilled away, followed by polycondensation under reduced pressure. If necessary, solid state polymerization may also be conducted in order to increase the intrinsic viscosity and to lower the content of acetaldehyde. For promotion of crystallization before solid state polymerization, melt-polymerized polyester is allowed to absorb water vapor and then crystallized by heating, or polyester chips are sprayed directly with water vapor and then crystallized by heating.

The melt polycondensation reaction may be conducted in a reaction unit in a batch system or a reaction unit in a continuous system. In either system, the esterification reaction or transesterification may be conducted at one stage or divided stages. The melt polycondensation reaction may also be conducted at one stage or divided stages. The solid state polymerization reaction, similar to the melt polycondensation reaction, can be conducted in a reaction unit in a batch system or a reaction unit in a continuous system. The melt polycondensation and solid state polymerization can be conducted continuously or successively.

Hereinafter, the process for producing polyethylene terephthalate in a continuous system is described in detail by reference to a preferable embodiment.

First, production of a oligomer by esterification reaction is described. Slurry containing 1.02 to 1.5 moles, preferably 1.03 to 1.4 moles of ethylene glycol per mole of terephthalic acid or an ester derivative thereof is prepared and fed continuously to the esterification reaction process.

The esterification reaction is conducted with ethylene glycol refluxed in a multistage unit consisting of 1 to 3 esterification reactors connected in series, during which water or alcohol formed by the reaction is discharged from the reaction system through a distillation column. The temperature in the esterification reaction at the first stage is 240 to 270° C., preferably 245 to 265° C., the pressure is 0.2 to 3 kg/cm$^2$G, preferably 0.5 to 2 kg/cm$^2$G. The temperature in the esterification reaction at the final stage is usually 250 to 290° C., preferably 255 to 275° C., and the pressure is usually 0 to 1.5 kg/cm$^2$G, preferably 0 to 1.3 kg/cm$^2$G. When the reaction is conducted at three or more stages, the reaction conditions for intermediate stages are intermediate conditions between the conditions at the first stage and final stage. The degree of the esterification reaction is preferably evenly increased at the respective stages. Desirably, the degree of esterification finally attains 90% or more, preferably 93% or more. By these esterification reactions, low-condensed products of molecular weights of about 500 to 5000 can be obtained.

When terephthalic acid is used as the starting material, the esterification reaction can be conducted in the absence of a catalyst because terephthalic acid has a catalytic activity as the acid, but the reaction may also be conducted in the coexistence of a polymerization catalyst.

Because the ratio of dioxyethylene terephthalate units in a major chain of polyethylene terephthalate can be kept at a low level (5 mol-% or less relative to the whole total diol components), the reaction is carried out preferably in the presence of a small amount of tertiary amines such as triethylamine, tri-n-butylamine and benzyl dimethylamine, quaternary ammonium hydroxides such as tetraethyl ammonium hydroxide, tetra-n-butyl ammonium hydroxide and trimethyl benzyl ammonium hydroxide, and basic compounds such as lithium carbonate, sodium carbonate, potassium carbonate and sodium acetate.

When a oligomer is produced by transesterification reaction, a solution containing ethylene glycol in an amount of 1.1 to 1.6 moles, preferably 1.2 to 1.5 moles per mole of dimethyl terephthalate is prepared and fed continuously to the transesterification reaction process.

The transesterification reaction is conducted with ethylene glycol refluxed in a multistage unit consisting of 1 or 2 esterification reactors connected in series, during which methanol formed by the reaction is discharged from the reaction system through a distillation column. The temperature of the transesterification reaction at the first stage is 180 to 250° C., preferably 200 to 240° C. The temperature of the transesterification reaction at the final stage is usually 230 to 270° C., preferably 240 to 265° C., and Zn Cd, Mg, Mn, Co, Ca and Ba fatty acid salts and carboxylic acid salts, and Pb, Zn, Sb and Ge oxides are used as the transesterification catalyst. Low-condensed products with molecular weight of about 200 to 500 are obtained by these transesterification reactions.

Then, the resultant low-condensed products are fed to a multistage liquid phase polycondensation process. The polycondensation reaction conditions are selected such that the temperature for the polycondensation reaction at the first reaction stage is 250 to 290° C., preferably 260 to 280° C., the pressure is 500 to 20 Torr, preferably 200 to 30 Torr, and the temperature for the polycondensation reaction at the final stage is 265 to 300° C., preferably 275 to 295° C., and the pressure is 10 to 0.1 Torr, preferably 5 to 0.5 Torr. When the reaction is carried out at three or more stages, the reaction conditions for the polycondensation reaction at intermediate stages are intermediate conditions between the reaction conditions at the first stage and final stage. The increase in the intrinsic viscosity is achieved evenly at the respective polycondensation reaction stages.

When a low content of acetaldehyde or a low content of cyclic trimers in e.g. low-flavor drinks or heat-resistant hollow molded articles for mineral water is required, the melt-polycondensed polyester thus obtained is subjected to solid state polymerization. The polyester is subjected to solid state polymerization in a method known in the art. First, the polyester to be subjected to solid state polymerization is preliminarily crystallized by heating at a temperature of 100 to 210° C. for 1 to 5 hours in an inert gas or under reduced pressure or in an atmosphere of inert gas containing or not containing water vapor. Then, solid state polymerization is carried out at a temperature of 190 to 230° C. for 1 to 30 hours in an inert gas atmosphere or under reduced pressure.

The catalyst of this invention has a catalytic activity not only in polymerization reaction but also in esterification reaction and transesterification reaction. For example, polymerization by transesterification reaction between an alkyl dicarboxylate such as dimethyl terephthalate and a glycol such as ethylene glycol is conducted usually in the presence of an transesterification catalyst such as a titanium compound or a zinc compound, but the catalyst of this invention can also be used in place of such catalyst or in the coexistence of such catalyst. Further, the catalyst of this invention also has a catalytic activity not only in melt polymerization but also in solid state polymerization and solution polymerization, and in any methods, polyester can be produced.

The polymerization catalyst of this invention can be added to the reaction system at an arbitrary stage of the polymerization reaction. For example, the catalyst can be added to the reaction system before esterification reaction or transesterification reaction or at an arbitrary stage of the reaction or just before polycondensation reaction or at an arbitrary stage of the polycondensation reaction. In particular, aluminum or a compound thereof is added preferably just before polycondensation reaction.

The method of the addition of the polymerization catalyst of this invention is not particularly limited, and the catalyst may be added in a powdery or neat state or in the form of a solution or slurry in a solvent such as ethylene glycol. Further, the constituent components of the polymerization catalyst of this invention may be added as a mixture, or these may be added separately. Further, the constituent components of the polymerization catalyst of this invention may be added to the polymerization system at the same stage, or these may be added at different stages.

To improve the productivity of polyester by shortening the polymerization time, the polymerization catalyst of this invention may be used preferably in the coexistence of another polymerization catalyst such as an antimony compound, a titanium compound, a germanium compound or a tin compound in such an amount as not to cause the above-described problems in the properties and productivity of polyester, coloration of its product, etc.

In this case, the antimony compound can be added in an amount of 50 ppm in terms of antimony atom relative to polyester obtained by polymerization. The antimony compound is added more preferably in an amount of 30 ppm or less. An amount of antimony greater than 50 ppm is not preferable because an antimony metal is precipitated to cause gray discoloration or to generate insoluble particles in polyester.

The titanium compound can be added in the range of 10 ppm or less relative to the polymer obtained by polymerization. The titanium compound is added in an amount of preferably 5 ppm or less, more preferably 2 ppm or less. When the amount of titanium added is greater than 10 ppm, the thermal stability of the resultant resin is significantly degraded.

The germanium compound can be added in an amount of 20 ppm or less in terms of germanium atom in the polyester obtained by polymerization. The germanium compound is added more preferably in an amount of 10 ppm or less. An amount of germanium greater than 20 ppm is economically disadvantageous and thus not preferable.

When polyester is polymerized by using the polymerization catalyst of this invention, an antimony compound, titanium compound, germanium compound and tin compound can be used alone or in combination thereof.

The antimony compound, titanium compound, germanium compound and tin compound used in this invention are not particularly limited.

Specifically, the antimony compound includes antimony trioxide, antimony pentaoxide, antimony acetate, antimony glucoxide etc., among which antimony trioxide is preferable.

The titanium compound includes tetra-n-propyl titanate, tetra-isopropyl titanate, tetra-n-butyl titanate, tetra-isobutyl titanate, tetra-tert-butyl titanate, tetra-cyclohexyl titanate, tetra-phenyl titanate, titanium oxalate etc, among which tetra-n-butoxy titanate is preferable.

The germanium compound includes germanium dioxide, germanium tetrachloride etc., among which germanium dioxide is preferable.

The tin compound includes dibutyltin oxide, methylphenyltin oxide, tetraethyl tin, hexaethylditin oxide, triethyltin hydroxide, monobutyl hydroxytin oxide, triisobutyltin acetate, diphenyltin dilaurate, monobutyltin trichloride, dibutyltin sulfide, dibutyl hydroxytin oxide, methylstannic acid, ethyl stannate etc., among which monobutyl hydroxytin oxide is preferably used.

The polyester in this invention refers to polyester comprising one or more members selected from polyvalent carboxylic acids including dicarboxylic acids and ester-forming derivatives thereof and one or more members selected from polyvalent alcohols including glycols, to polyester comprising one or more members selected form hydroxycarboxylic acids and ester-forming derivatives thereof, or to polyester comprising cyclic esters.

The dicarboxylic acids include saturated aliphatic dicarboxylic acids such as oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 1,3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid and dimer acid or ester-forming derivatives thereof, unsaturated aliphatic dicarboxylic acid such as fumaric acid, maleic acid and itaconic acid or ester-forming derivatives thereof, and aromatic dicarboxylic acids such as orthophthalic acid, isophthalic acid, terephthalic acid, 5-(alkali metal) sulfoisophthalic acid, diphenine acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, 4,4'-biphenyl dicarboxylic acid, 4,4'-biphenyl sulfone dicarboxylic acid, 4,4'-biphenyl ether dicarboxylic acid, 1,2'-bis(phenoxy) ethane-p,p'-dicarboxylic acid, pamoic [phonetic trans.] acid and anthracene dicarboxylic acid or ester-forming derivatives thereof.

Among these dicarboxylic acids, terephthalic acid and naphthalene dicarboxylic acid, particularly 2,6-naphthalene dicarboxylic, are preferable for e.g. the physical properties of the resultant polyester, and if necessary other dicarboxylic acids are used as constituent components.

The polyvalent carboxylic acids other than these dicarboxylic acids include ethane tricarboxylic acid, propane tricarboxylic acid, butane tetracarboxylic acid, pyromellitic acid, trimellitic acid, trimesic acid, 3,4,3', 4'-biphenyl tetracarboxylic acid and ester-forming derivatives thereof.

The glycols include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentane diol, neopentyl glycol, 1,6-hexane diol, 1,2-cylohexane diol, 1,3-cylohexane diol, 1,4-cyclohexane diol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecane diol, polyethylene glycol, polytrimethylene glycol and polytetramethylene glycol, and aromatic glycols such as hydroquinone, 4,4- dihydroxybisphenol, 1,4-bis(β-hydroxyethoxy) benzene, 1,4-bis(β-hydroxyphenyl) sulfone, bis(p-hydroxyphenyl) ether, bis(p-hydroxyphenyl) sulfone, bis(p-hydroxyphenyl) methane, 1,2-bis(p-hydroxyphenyl) ethane, bisphenol A, bisphenol C, 2,5-naphthalene diol, and glycols having ethylene oxide added to these glycols.

Among these glycols, ethylene glycol, 1,3-propylene glycol, 1,4-butylene glycol and 1,4-cyclohexane dimethanol are preferable.

The polyvalent alcohols other than these glycols include trimethylol methane, trimethylol ethane, trimethylol propane, pentaerythritol, glycerol, and hexane triol.

The hydroxycarboxylic acids include lactic acid, citric acid, malic acid, tartaric acid, hydroxyacetic acid, 3-hydroxybutyric acid, p-hydroxybenzoic acid, p-(2-hydroxyethoxy) benzoic acid, 4-hydroxycyclohexane carboxylic acid or ester-forming derivatives thereof.

The cyclic esters include ε-caprolactone, β-propiolactone, β-methyl-β-propiolactone, δ-valerolactone, glycolide and lactide.

The ester-forming derivatives of polyvalent carboxylic acids or hydroxycarboxylic acids include alkyl esters, acid chlorides and acid anhydrides thereof.

The polyester used in this invention is polyester whose major acid component is terephthalic acid or an ester-forming derivative thereof or naphthalene dicarboxylic acid or an ester-forming derivative thereof, preferably polyester whose major glycol component is an alkylene glycol.

The polyester whose major acid component is terephthalic acid or an ester-forming derivative thereof or naphthalene dicarboxylic acid or an ester-forming derivative thereof is polyester wherein the total content of terephthalic acid or an ester-forming derivative and naphthalene dicarboxylic acid or an ester-forming derivative is preferably 70 mol-% or more, more preferably 80 mol-% or more and most preferably 90 mol-% or more, relative to the whole acid components.

The polyester whose major glycol component is an alkylene glycol is polyester wherein the total content of the alkylene glycol is preferably 70 mol-% ore more, more preferably 80 mol-% or more and most preferably 90 mol-% or more, relative to the whole glycol components. As used herein, the alkylene glycol may contain a substituent group or an alicyclic structure in the molecule chain thereof.

The naphthalene dicarboxylic acid or ester-forming derivatives thereof used in this invention are preferably 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid or ester-forming derivatives thereof.

The alkylene glycol used in this invention includes ethylene glycol, 1,2-propylene glycol, 1,3-propylene glycol, 1,2-butylene glycol, 1,3-butylene glycol, 2,3-butylene glycol, 1,4-butylene glycol, 1,5-pentane diol, neopentyl glycol, 1,6-hexane diol, 1,2-cyclohexane diol, 1,3-cyclohexane diol, 1,4-cyclohexane diol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecane diol etc. These may be used in combination thereof.

The polyester in this invention is preferably polyethylene terephthalate, polybutylene terephthalate, polypropylene terephthalate, poly(1,4-cyclohexane dimethylene terephthalate), polyethylene naphthalate, polybutylene naphthalate, polypropylene naphthalate and copolymers thereof, among which polyethylene terephthalate and copolymers thereof are particularly preferable.

One preferable example of the polyester used in this invention is polyester whose major repeating unit is composed of ethylene terephthalate, preferably linear polyester wherein the content of ethylene terephthalate units is 70 mol-% or more, more preferably linear polyester wherein the content of ethylene terephthalate units is 80 mol-% or more, particularly preferably linear polyester wherein the content of ethylene terephthalate units is 90 mol-% or more.

Another preferable example of the polyester used in this invention is polyester whose major repeating unit is composed of ethylene-2,6-naphthalate, preferably linear polyester wherein the content of ethylene-2,6-naphthalate units is 70 mol-% or more, more preferably linear polyester wherein the content of ethylene-2,6-naphthalate units is 80 mol-% or more, particularly preferably linear polyester wherein the content of ethylene-2,6-naphthalate units is 90 mol-% or more.

Another preferable example of the polyester used in this invention is linear polyester wherein the content of propylene terephthalate units is 70 mol-% or more, linear polyester wherein the content of propylene naphthalate units is 70 mol-% or more, linear polyester wherein the content of 1,4-cyclohexane dimethylene terephthalate units is 70 mol-% or more, linear polyester wherein the content of butylene terephthalate units is 70 mol-% or more, or linear polyester wherein the content of butylene naphthalate units is 70 mol-% or more.

The polyester of this invention can also contain a known phosphorus compound as a copolymerizable component. The phosphorus derivative compound is preferably a bifunctional phosphorus derivative compound such as, for example, (2-carboxyethyl) methylphosphinic acid, (2-carboxyethyl) phenylphosphinic acid, and 9,10-dihydro-10-oxa-(2,3-carboxypropyl)-10-phosphaphenanthrene-10-oxide. These phosphorus derivative compounds can be contained as copolymerizable components to improve e.g. the flame retardancy of the resultant polyester.

In a preferable embodiment, polycarboxylic acids having an alkali metal sulfonate base are used as the constituent components of polyester in this invention in order to improve dyeing properties when the polyester is used as fibers.

The metal sulfonate group-containing compound used as a copolymerizable monomer is not particularly limited, and includes 5-sodium sulfoisophthalic acid, 2-sodium sulfoterephthalic acid, 5-lithium sulfoisophthalic acid, 2-lithium sulfoterephthalic acid, 5-potassium sulfoisophthalic acid and 2-potassium sulfoterephthalic acid or lower alkyl ester derivatives thereof. In this invention, 5-sodium sulfoisophthalic acid or ester-forming derivatives are preferably used.

The amount of the metal sulfonate-group containing compound copolymerized is preferably 0.3 to 10.0 mol-%, more preferably 0.80 to 5.0 mol-%, relative to the acid component constituting the polyester. When the amount of the compound copolymerized is too low, the resultant polyester is inferior in dyeability with cationic dyes, and when the amount of the compound copolymerized is too high, fibers produced from the resultant polyester may be inferior in fiber productivity and may fail to achieve sufficient strength due to the phenomenon of thickening. Further, when the metal sulfonate-containing compound is copolymerized in an amount of 2.0 mol-% or more, the resultant modified polyester fibers can also be endowed with dyeability at normal pressure. By selecting suitable easy dyeable monomers, the amount of the metal sulfonate group-containing compound can be suitably reduced. The easy dyeable monomers are not particularly limited, and include long-chain glycol compounds such as polyethylene glycol, polytetraethylene glycol and aliphatic dicarboxylic acids such as adipic acid, sebacic acid and azelaic acid.

After polyester is polymerized according to the method of this invention, the thermal stability of the polyester can be further improved by removing the catalyst from the polyester or by adding a phosphorus derivative compound to deactivate the catalyst.

The polyester in this invention can contain organic, inorganic and organometallic toners and a optical brightener, and by incorporation of one or more of these additives, discoloration such as yellow discoloration of polyester can be inhibited to a lower level. The polyester may contain other arbitrary polymers, antistatic agents, antifoaming agents, dyeing improvers, dyes, pigments, delusterants, optical brighteners, stabilizers, antioxidants and other additives. As the antioxidant, antioxidants such as aromatic amine derivative compounds or phenol derivative compounds can be used, and as the additives, stabilizers of phosphorus derivative compounds such as phosphoric acid and phosphate or stabilizers of sulfur or amine derivative compounds can be used.

These additives can be added at an arbitrary stage during or after polymerization of polyester or during molding of polyester, and the suitable stage at which the additives are added is varied depending on the characteristics of the compound and the performance requirement of molded articles of polyester.

The polyester polymerized by using the polyester polymerization catalyst of this invention can be used to produce fibers in a usual manner by melt spinning wherein spinning and drawing of the polyester may be conducted in 1 or 2 steps. Further, any processes for producing staple fibers by crimping, heat setting and cutting and any known processes producing fibers such as monofilaments can also be used.

The resultant fibers can be various fibers with an odd-shaped section, hollow fibers, composite fibers and originally adhering fibers, and for manufacturing of yarn, for example known techniques such as strand mixing and mixed spinning can also be used.

Further, the polyester fibers can be used as fiber structures such as woven fabrics or nonwoven fabrics.

The polyester fibers can be used as fibers for clothing, interior and bedding fibers in curtains, carpets, futon cotton and fiber, fibers for industrial materials such as high tensile strings for tire cords and ropes, civil engineering and building materials, and automobile materials such as air bags, and various kinds of fibers for various fabrics, knitting, nets, and nonwoven fabrics of staple or filament fibers.

The polyester resin of this invention is used preferably as hollow molded articles.

The hollow molded articles include drink containers for mineral water, juice, wine or whiskey, baby's bottles, containers for canned foods, containers for hair conditioners and cosmetics, containers for detergents for houses and tableware.

Among these containers, the hollow molded articles of this invention are particularly preferable as pressure-resistant containers, heat-resistant and pressure-resistant containers and alcohol-resistant containers utilizing the sanitary conditions, strength and solvent resistance of the polyester.

For production of the hollow molded articles, preliminary closed-end molded articles are obtained by a method wherein polyester chips obtained by melt polymerization or solid state polymerization are dried by e.g. vacuum drying and then molded by an extrusion molding machine or an injection molding machine, or by a direct molding method wherein after melt polymerization, the melt is introduced in a molten state into a molding machine and molded. The preliminary molded articles are subjected to blow molding such as drawing blow molding, direct blow molding, extrusion blow molding, to give final hollow molded articles. As a matter of course, the molded articles obtained by the molding machine such as an extrusion molding machine or an injection molding machine can be used as final hollow containers.

In production of such hollow molded articles, the starting polyester can be mixed with scrap resin generated in a production process or polyester resin recovered from a market. Even if mixed with such recycled resin, the polyester resin of this invention is hardly degraded, thus giving high-quality hollow molded articles.

Further, such containers can have a multi-layer structure provided as an intermediate layer with a gas barrier resin layer such as polyvinyl alcohol or polymethaxylylene diamine adipate or a light-shielding resin layer or a recycled polyester layer. Further, techniques such as vapor deposition and CVD (chemical vapor deposition) can be used to coat the container with a metal such as aluminum or diamond-shaped carbon.

To improve the crystallizability of openings etc. of the molded articles, other resins such as polyethylene and inorganic nucleating materials such as talc can also be added.

Further, the polyester resin of this invention can also be extruded through an extruding machine into a sheet-shaped material to provide a sheet. The sheet is processed by vacuum molding, pressure forming, pattern embossing etc. and used as trays or containers for foods and sundries, cups, blister packs, carrier tapes for electronic parts, and trays for delivery of electronic parts. Further, the sheet can also be used as various kinds of cards.

These sheets can also have a multi-layer structure provided as an intermediate layer with a gas barrier resin layer, a light-shielding resin layer or a recycled polyester layer as described above.

The polyester resin of this invention can also be mixed with recycled resin. For the purpose of producing crystalline heat-resistant containers, other resins such as polyethylene and inorganic nucleating agents such as talc can be added to improve crystallizability.

The polyester polymerized by using the polyester polymerization catalyst of this invention can be used in film. The method therefor involves melt-extrusion of the polyester and molding it through T-dies into a sheet on a cooled rotating roll, to prepare a non-oriented sheet. In this process, techniques described in e.g. JP-B 6-39521 and JP-B 6-45175 can be used for high-rate manufacture of the film. Using a plurality of extruders, the polyester can be formed by co-extrusion into a multi-layer film having a core layer and skin layer each having functions.

The polyester polymerized by using the polyester polymerization catalyst of this invention can be used as an oriented polyester film. The oriented polyester film can be obtained by drawing the polyester 1.1- to 6-fold in at least one axial direction at a temperature ranging from the glass transition temperature to crystallization temperature of the polyester.

For example, when a biaxially oriented polyester film is produced, it is possible to employ a successive biaxial drawing method wherein the polyester is subjected to monoaxial drawing in the lengthwise or width direction and then drawn in the perpendicular direction, a method of simultaneous biaxial drawing in the lengthwise and width directions, a method of using a linear motor for driving simultaneous biaxial drawing, and a multistage drawing method of subjecting polyester to drawing plural times in the same direction by width and lengthwise drawing, or lengthwise, width and lengthwise drawing, or lengthwise, lengthwise and width drawing.

After drawing is finished, heat setting is preferably conducted at a temperature ranging from (the melting point minus 50° C.) to the melting point for 30 seconds or less, preferably 10 seconds or less, followed by lengthwise or width relaxation by 0.5 to 10% in order to reduce the thermal shrinkage of the film.

The thickness of the resultant oriented polyester film is preferably 1 to 1000 μm, more preferably 5 to 500 μm and most preferably 10 to 200 μm. When the thickness is 1 μl or less, the film is limp and difficult to handle. On the other hand, when the thickness exceeds 1000 μm, the film is too hard to handle.

For conferring various functions such as adhesion, mold releasability, antistatic properties, infrared absorption, antimicrobial properties and scuff resistance, a high-molecular resin may be applied by coating onto the surface of the oriented polyester film. Further, inorganic and/or organic particles may be contained in only the coating layer, to form a smooth and highly transparent polyester film. Further, the film may be provided with an inorganic deposited layer to confer various barrier functions against oxygen, water and oligomers or may be provided with an electroconductive layer by sputtering to confer electrical conductivity.

For improving handling properties such as smoothness, covering properties, abrasion resistance and winding properties, the surface of the film may be made uneven by adding inorganic and/or heat-resistant polymeric resin particles in the process of polymerizing the polyester.

The oriented polyester film of this invention is used preferably as antistatic film, easily adhering film, cards, dummy cans, for agriculture, for building materials, for decorative materials, for wall papers, for OHP film, for printing, for ink jet recording, for sublimation transfer recording, for laser beam printer recording, for electrophotographic recording, for thermal transfer recording, for heat-sensitive transfer recording, for print substrate printing, for membrane switching, for plasma displays, for tough panels, for masking film, for photoengraving, for X-ray film, for photographic negative working film, for phase-difference film, for polarizing film, for polarizing film protection (TAC), for protect film, for photosensitive resin film, for visual-field enlargement film, for diffuser sheet, for reflective film, for anti-glare film, for electroconductive film, for separator, for UV shielding, and for back-grind tapes.

For antistatic film, techniques described in Japanese Patent No. 2952677 and JP-A 6-184337 can be used. For easily adhering film, techniques described in e.g. JP-B 7-108563, JP-A 10-235820 and JP-A 11-323271 can be applied to the film of this invention, and for cards, techniques described in e.g. JP-A 10-171956 and JP-A 11-010815 can be applied to the film of this invention. As a dummy can in place of a sheet-shaped cylinder described in e.g. JP-A 10-101103, the film of this invention can be used by printing a design thereon and then forming it in a cylindrical or semi-cylindrical form. For building materials, decorative sheets for building materials, and decorative floor materials, the film of this invention can be used as the base material sheet described in e.g. JP-A 5-200927 or as the transparent sheet described in JP-A 7-314630. For OHP (over head projector), the film of this invention can be used as the transparent resin sheet described in JP-A 6-297831 or as the transparent polymeric synthetic resin film described in JP-A 8-305065. For ink jetting recording, the film of this invention can be used as the transparent base material described in e.g. JP-A 5-032037. For sublimation transfer recording, the film of this invention can be used as the transparent film described in e.g. JP-A 2000-025349. For laser beam printers or electrophotographic recording, the film of this invention can be used as the plastic film described in e.g. JP-A 5-088400. For thermal transfer recording, the film of this invention can be used in a method described in e.g. JP-A 7-032754, and for heat-sensitive recording, the film of this invention can be used in a method described in e.g. JP-A 11-034503. For print substrate, the film of this invention can be used as the polyester film described in e.g. JP-A 6-326453. For membrane switching, the film of this invention can be used in a method described in e.g. JP-A 5-234459. For optical filters (hot-wire filters, plasma displays), the film of this invention can be used in a method described in e.g. JP-A 11-231126. For transparent electroconductive film and attach panel, the film of this invention can be used in a method described in e.g. JP-A 11-224539. For masking film, the film of this invention can be used in a method described in e.g. JP-A 5-273737. For photoengraving, the film of this invention can be used in a method described in e.g. JP-A 5-057844. For photographic negative working film, the film of this invention can be used as the polyethylene terephthalate film described in e.g. column No. (0123) in JP-A 6-167768. For phase-difference film, the film of this invention can be used as the film described in e.g. JP-A 2000-162419. For separator, the film of this invention can be used as the film described in e.g. column No. (0012) in JP-A 11-209711. For UV shielding, the film of this invention can be used as the polyester film described in e.g. JP-A 10-329291. An agricultural film can be obtained by applying the film of this invention to the polyethylene terephthalate film described in e.g. JP-A 10-166534. An adhesive-backed sheet can be obtained by applying the oriented polyester film of this invention to the polyethylene terephthalate film described in e.g. JP-A 6-122856.

EXAMPLES

Hereinafter, this invention is described in more detail by reference to the Examples, which are not intended to limit the present invention. The evaluation methods used in the Examples and Comparative Examples are described below.

Evaluation methods

Intrinsic viscosity (IV)

Polyester was dissolved in a mixed solvent of phenol/1,1,2,2-tetrachloroethane in a ratio of 6/4 (by weight) and measured at a temperature of 30° C.

Acid value g polyester was heated and dissolved in 10 ml benzyl alcohol, and measured by titration with 0.1 N NaOH in methanol/benzyl alcohol (1/9).

Content of diethylene glycol (DEG)

g polyester was decomposed by heating at 250° C. in 2 ml methanol and quantified by gas chromatography.

Differential scanning calorimetry (DSC)

DSC2920 manufactured by TA Instruments was used for measurement. 10.0 mg polyester was placed in an aluminum pan and heated to 280° C. at an increasing temperature of 50° C./min., and when 280° C. was reached, the sample was kept for 1 minute and immediately quenched in liquid nitrogen. Thereafter, the sample was heated to 300° C. at an increasing temperature of 20° C./min., during which the crystallization temperature Tc1 and melting point Tm were determined. When 300° C. was reached, the sample was kept at that temperature for 2 minutes and then cooled at a decreasing temperature of 10° C./min., during which the crystallization temperature Tc2 was determined. Tc1, Tm and Tc2 were maximum peak temperatures respectively.

Color Tone

When predetermined torque was reached in melt polymerization, nitrogen was introduced into the autoclave and returned to normal pressure, and the polycondensation reaction was terminated. Thereafter, the polymer was quenched under slight pressure by discharging it in a strand form into cold water and thereafter maintained for about 20 seconds in cold water, and cut into cylindrical resin chips of about 3 mm in length and about 2 mm in diameter. The resin chips thus obtained were air-dried for about one day on a filter paper at room temperature and used in color measurement. In color measurement, the PET resin chips having an IV of about 0.65 dl/g obtained by melt polymerization were measured for Hunter's L value, a value and b value by a color difference meter (MODEL TC-1500MC-88, manufactured by Tokyo Denshoku Co., Ltd.).

Thermal stability parameter (TS)

TS was determined as follows: 1 g of melt-polymerized PET resin chips having an IV of about 0.65 dl/g ($[IV]_i$ before the melting test) were placed in a glass test tube having an internal diameter of about 14 mm, then vacuum-dried at 130° C. for 12 hours and set in a vacuum line, and the replacement of the atmosphere by nitrogen was conducted five or more times by introducing nitrogen under reduced pressure, to achieve a nitrogen atmosphere at 100 mmHg in the glass test tube, and the tube was sealed, immersed in a salt bath at 300° C. and maintained for 2 hours in a molten state, and the sample was removed, frozen and milled, and vacuum-dried to determine the IV ($[IV]_{f2}$ after the melting test) from which TS was calculated using the equation below. The equation was cited from a previous report (Kamiyama et al.: Journal of Society of Rubber Industry, Japan, vol. 63, no. 8, p. 497, 1990).

$$TS=0.245\{[IV]_{f2}^{-1.47}-[IV]_i^{-1.47}\}$$

Thermal oxidation stability parameter (TOS)

TOS was determined as follows: Melt-polymerized PET resin chips having an IV of about 0.65 dl/g were frozen and milled to give powders of 20 meshes or less which were then vacuum-dried at 130° C. for 12 hours, and 300 mg of the powders were placed in a glass test tube having an internal diameter of about 8 mm and a length of about 140 mm, vacuum-dried at 70° C. for 12 hours, and after the air in the test tube was dried by connecting a dry tube containing silica gel to an upper part of the test tube, were heated by immersion in a salt bath at 230° C. for 15 minutes, to determine the IV from which TOS was calculated using the same equation for TS described above. $[IV]_i$ and $[IV]_{f1}$ refer to IV (dl/g) before and after the heating test respectively. Freezing and milling was conducted using a freezer mill (6750 model, US Spex Inc.). About 2 g resin chips and a special impactor were placed in a special cell, and the cell was set in the mill, and liquid nitrogen was introduced into the mill and maintained for about 10 minutes, and the sample was milled for 5 minutes by RATE 10 (with the impactor inverted about 20 times per second).

$$TOS=0.245\{[IV]_{f1}^{-1.47}-[IV]_i^{-1.47}\}$$

Hydrolytic stability parameter (HS)

Melt-polymerized chips of PET having an IV of about 0.65 dl/g ($[IV]_i$ before the test) were frozen and milled in the same manner as above in 7) to give powder of 20 meshes or less which were then vacuum-dried at 130° C. for 12 hours. A hydrolysis test was conducted using a mini-color unit (Type MC12. ELB, manufactured by Texam Giken Co., Ltd.). 1 g of the powders, together with 100 ml pure water, were placed in a special stainless steel beaker, and a special stirring blade was added to it, and in a closed system, the beaker was set in the mini-color unit and stirred under heating at 130° C. under pressure for 6 hours. After the test, the PET was collected by filtration and vacuum-dried to determine the IV ($[IV]_{f2}$) from which hydrolytic stability parameter (HS) was calculated using the following equation:

$$HS=0.245\{[IV]_{f2}^{-1.47}[IV]_i^{-1.47}\}$$

$^1$H-NMR measurement of the synthesized compound

The compound was dissolved in $CDCl_3$ or DMSO-d6 and measured by Varian GENINI-200.

Measurement of the melting point of the synthesized compound

The compound was placed on a cover glass and measured at an increasing temperature of 1° C./min. by Yanaco MICRO MELTING POINT APPARATUS.

Elemental analysis of the synthesized compound

The compound was decomposed in a wet system and analyzed for phosphorus by colorimetry with molybdenum blue. Other metals were incinerated and dissolved in acid and analyzed by high-frequency plasma emission analysis and atomic-absorption analysis.

Film manufacturing (other than Examples 30 to 32)

In the Examples and Comparative Examples, the PET resin chips before the melting test were vacuum-dried at 135° C. for 6 hours. Thereafter, the sample was fed to an extruder and melt-extruded at 280° C. in a sheet form, quenched and solidified on a metal roll kept at a surface temperature of 20° C., to give a cast film of 1400 μm in thickness.

Then, this cast film was heated at 100° C. with a series of heated rolls and an IR heater and then drawn 3.5-fold in the longer direction with a series of rolls different in circumferential velocity to give a monoaxially drawn PET film. Subsequently, the film was drawn 4.0-fold in the width direction by a tenter at 120° C., and while the width of the film was fixed, the film was heated at 260° C. for 0.5 second by an IR heater, followed by relaxation by 3% at 200° C. for 23 seconds, to give a biaxially stretched PET film of 100 μm in thickness.

Preparation of recovered pellets

The PET film obtained in the method described above was cut into strips, vacuum-dried and introduced into an extruder, and the molten resin was extruded at a temperature set at 280° C. through a nozzle of 5 mm in diameter, cooled with water and cut to give recovered pellets.

Manufacture of a film from the recovered pellets

The PET resin chips before the melting test and the recovered pellets described above were mixed in the ratio of 50:50 by weight and vacuum-dried at 135° C. for 6 hours. Thereafter, the mixture was fed to an extruder, melt-extruded at 280° C. in a sheet form and quenched on a metal roll kept at a surface temperature of 20° C., to give a cast film of 1400 μm in thickness.

Then, this cast film was heated at 100° C. with a series of heated rolls and an IR heater and then stretched 3.5-fold in the longer direction with a series of rolls different in circumferential velocity to give a monoaxially oriented PET film. Subsequently, the film was drawn 4.0-fold in the width direction by a tenter at 120° C., to give a biaxially oriented PET film of 100 μm in thickness.

Thermal stability of the film

The outward appearance of the resultant film was observed with naked eyes and evaluated.

□: not discolored.

○: slightly discolored.

Δ: discolored.

x: significantly discolored.

Thermal aging resistance of the film

The film obtained in the method (12) above was cut into test specimens of 10 cm in length and 5 cm in width, and the test specimen was treated at 200° C. for 100 hours in a gear hot-air oven, and then the film thus treated was stretched in the lengthwise direction, to evaluate its cutting.

○: Strength is sufficient to make cutting difficult.

Δ: Strength is slightly lowered to make cutting relatively easy.

x: Strength is lowered to make cutting easy.

Water resistance of the film

The film obtained in the method in (12) above was cut into test specimens of 8 cm in length and 4 cm in width, and the test specimen was boiled for 5 days in boiling water. After boiling, the film was stretched in the lengthwise direction to evaluate its cutting.

○: Strength is sufficient to make cutting difficult.

Δ: Strength is slightly lowered to make cutting relatively easy.

x: Strength is lowered to make cutting easy.

Haze (haze %)

From the molded article (wall thickness 5 mm) in (19) below and the body of the hollow molded article (wall thickness about 0.45 mm) in (20) below, specimens were cut off and measured by a haze meter model NDH2000 manufactured by Nippon Denshoku Co., Ltd.

Molding of a stepped molded plate

The dried polyester was molded by using a stepped plate mold (surface temperature, about 22° C.) cooled with water at 10° C. by an injection molding machine M-150C (DM) (manufactured by Meiki Seisakusho) with a cylinder temperature of 290° C. The resultant stepped molded plate had about 3 cmxabout 5 cm stepped plates of 2, 3, 4, 5, 6, 7, 8, 9, 10 and 11 mm in thickness, each weighing about 146 g. The plate of 5 mm in thickness was used in measurement of haze (haze %)

Molding of a hollow molded article

The polyester was dried in an oven using dry nitrogen and molded into a preform at a resin temperature of 295° C. by an injection molding machine M-150C (DM) (Meiki Seisakusho) at a mold temperature of 20° C. This preform was subjected to biaxial drawing blow molding at a blow pressure of 20 kg/cm$^2$ in a mold at 20° C. in a drawing blow molding machine LB-01E (Corpoplast Co., Ltd.), to give a 2000 cc hollow molded article (with a round body).

Heat resistance of the hollow molded article during molding

Preparation of a milled recovered product from the hollow molded article

The preform molded in (20) above was milled to give a milled recovered product from which fine powder was removed.

Molding of a hollow molded article mixed with the recovered product

The PET resin chips obtained in the polycondensation process and the milled recovered product described above were mixed in the ratio of 80:20 by weight, then dried in dry nitrogen in an oven at about 150° C., and molded into a preform at a resin temperature of 295° C. and at a mold temperature of 20° C. by an injection molding machine M-150C (DM) manufactured by Meiki Seisakusho. This preform was milled again in the step a), then mixed in the ratio of 80:20 by weight with the PET resin chips obtained in the polycondensation process, and molded into a preform in the same manner as described above. This operation was repeated 5 times in total.

Evaluation of heat resistance

The heat resistance of the preform obtained in b) was evaluated in terms of retained intrinsic viscosity (IV) and discoloration examined with naked eyes.

The retained intrinsic viscosity was determined according to the following equation:

Retained intrinsic viscosity={IV of the preform after subjected 5 times to molding in (6b) above/IV of the chips after polycondensation}×100

Heat resistance of a sheet-shaped material during molding

Preparation of a recovered product from a sheet-shaped material

The polyester chips were dried in dry nitrogen in an oven, melted at a resin temperature of 295° C. in a 40 mmϕ melt extrusion molding machine and extruded through a T die, to give a non-stretched sheet of 0.5 mm in thickness. This sheet was cut into chips to give a recovered product.

Extrusion molding of a sheet mixed with the recovered product

The PET resin chips obtained in the polycondensation process and the recovered product described above were mixed in the ratio of 70:30 by weight, then dried in dry nitrogen in an oven at about 150° C., and melted at a resin temperature of 295° C. in the above melt extrusion molding machine, to give a similar sheet to the above one. This sheet was cut again in the step a), then mixed in the ratio of 70:30 by weight with the PET resin chips obtained in the polycondensation process, and molded into a sheet in the same manner as described above. This operation was repeated 5 times in total.

Evaluation of heat resistance

The heat resistance of the sheet obtained in b) was evaluated in terms of retained intrinsic viscosity (IV) and discoloration examined with naked eyes.

The retained intrinsic viscosity was determined according to the following equation:

Retained intrinsic viscosity={IV of the sheet after subjected 5 times to extrusion molding in (7b) above/IV of the chips after polycondensation}×100

Example 1

(Synthesis of the phosphorus compound)

Synthesis of the phosphorus compound (NMPA) represented by formula (25) above

Synthesis of O-Ethyl (1-naphthyl) methylphosphonate (NMPA)

A mixture of 8.31 g (50 mmol) triethyl phosphite and 8.83 g (50 mmol) 1-chloromethyl naphthalene was heated for about 30 minutes until the evolution of gas ($C_2H_5Cl$) at 200° C. (external temperature) was finished. The reaction mixture was cooled to room temperature, to give 10.38 g NMPA (crude yield, 75%) as colorless oily liquid.

$^1$H-NMR($CDCl_3$□δ):

1.151 (6H, t), 3.641 (2H, d), 3.948(4H, m), 7.381–7.579 (4H, m), 7.749–7.867 (2H, m), 8.088–8.133 (1H, m)

(Polymerization of polyester)

A heat transfer medium-circulating 2-L stainless steel autoclave equipped with a stirrer was charged with high-purity terephthalic acid and ethylene glycol in the molar ratio of 1:2, then triethylamine was added in an amount of 0.3 mol-% relative to the acid component, 50 g/l of the above-described NMPA in ethylene glycol was added in an amount of 0.03 mol-% in terms of NMPA relative to the acid component, and the mixture was subjected to esterification reaction for 130 minutes at a pressure of 0.25 MPa at 245° C. while water was distilled away from the system, whereby a mixture of bis(2-hydroxyethyl) terephthalate (BHET) and oligomers (referred to hereinafter as BHET mixture) having an degree of esterification of 95% were obtained. To this BHET mixture was added 2.5 g/l aluminum acetyl acetonate in ethylene glycol in an amount of 0.015 mol-% in terms of aluminum atom relative to the acid component in the polyester, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 1.

The polyethylene terephthalate having an IV of 0.65 dl/g, obtained in the polycondensation described above, was formed in a usual manner into chips. The PET resin chips were measured for various physical properties and tested. The results are shown in Tables 1 and 2.

Using the PET resin chips obtained in the melt polymerization described above, a film was manufactured, recovered pellets were prepared, and a film was prepared from the recovered pellets. The thermal stability, thermal aging resistance and water resistance of the film were evaluated, and the results are shown in Table 3.

This catalyst has a relatively high catalytic activity, and the PET obtained by using this catalyst is excellent in TS, TOS and HS and gives a film superior in thermal stability, thermal aging resistance and water resistance.

Example 2

A BHET mixture was obtained in the same manner as in Example 1. To this BHET mixture were added 2.5 g/l aluminum acetyl acetonate in ethylene glycol in an amount of 0.015 mol-% in terms of aluminum atom relative to the acid component in the polyester and 50 g/l magnesium acetate.$4H_2O$ in ethylene glycol in an amount of 0.01 mol-% in terms of magnesium ion relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 1.

The polyethylene terephthalate having an IV of 0.65 dl/g, obtained in the polycondensation described above, was formed in a usual manner into chips. The PET resin chips were measured for various physical properties and tested. The results are shown in Tables 1 and 2.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 3.

This catalyst has a relatively high catalytic activity, and the PET obtained by using this catalyst is excellent in TS, TOS and HS and gives a film superior in thermal stability, heat aging resistance and water resistance.

Example 3

A BHET mixture was obtained in the same manner as in Example 1 except that the solution of NMPA in ethylene glycol was not added. To this BHET mixture were added 2.5 g/l aluminum acetyl acetonate in ethylene glycol in an amount of 0.015 mol-% in terms of aluminum atom relative to the acid component in the polyester, 50 g/l of the above-described NMPA in ethylene glycol in an amount of 0.02 mol-% in terms of NMPA relative to the acid component, and 50 g/l lithium acetate.$2H_2O$ in ethylene glycol in an amount of 0.01 mol-% in terms of lithium ion relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 1.

The polyethylene terephthalate having an IV of 0.65 dl/g, obtained in the polycondensation described above, was formed in a usual manner into chips. The PET resin chips were measured for various physical properties and tested. The results are shown in Tables 1 and 2.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 3.

This catalyst has a relatively high catalytic activity, and the PET obtained by using this catalyst is excellent in TS and TOS and gives a film superior in thermal stability and heat aging resistance. The PET obtained by using this catalyst is slightly inferior in HS and gives a film slightly inferior in water resistance, but the film can be practically used without any problem.

Example 4

A BHET mixture was obtained in the same manner as in Example 1 except that in place of the solution of NMPA in ethylene glycol, 10 g/l BPADE (with 98 or more purity, produced by Tokyo Kasei Kogyo Co., Ltd.) represented by formula (24) above in ethylene glycol was added in an amount of 0.03 mol-% in terms of BPADE relative to the acid component and 50 g/l magnesium acetate.$4H_2O$ in ethylene glycol in an amount of 0.01 mol-% in terms of magnesium atom relative to the acid component. To this BHET mixture was added 2.5 g/l aluminum acetyl acetonate in ethylene glycol in an amount of 0.015 mol-% in terms of aluminum atom relative to the acid component in the polyester, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 1.

The polyethylene terephthalate having an IV of 0.65 dl/g, obtained in the polycondensation described above, was formed in a usual manner into chips. The PET resin chips were measured for various physical properties and tested. The results are shown in Tables 1 and 2.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 3.

This catalyst is slightly inferior in catalytic activity, but the PET obtained by using this catalyst is excellent in TS and HS and gives a film excellent in thermal stability and water resistance. The PET obtained by using this catalyst is slightly inferior in TOS and gives a film inferior slightly in heat aging resistance, but the film can be practically used without any problem.

Comparative Example 1

A BHET mixture was obtained in the same manner as in Example 1 except that the solution of NMPA in ethylene glycol was not added. To this BHET mixture was added 2.5g/l aluminum acetyl acetonate in ethylene glycol in an amount of 0.015 mol-% in terms of aluminum atom relative to the acid component in the polyester, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization was conducted for 180 minutes or more, but the IV did not reach 0.65 dl/g.

Comparative Example 2

A BHET mixture was obtained in the same manner as in Example 1 except that the solution of NMPA in ethylene glycol was not added. To this BHET mixture were added 2.5 g/l aluminum acetyl acetonate in ethylene glycol in an amount of 0.015 mol-% in terms of aluminum atom relative to the acid component in the polyester and 20 g/l cobalt acetate (II).$4H_2O$ in ethylene glycol in an amount of 0.005 mol-% in terms of cobalt atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 1.

The polyethylene terephthalate having an IV of 0.65 dl/g, obtained by the polycondensation described above, was formed in a usual manner into chips. The PET resin chips were measured for various physical properties and tested. The results are shown in Tables 1 and 2.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 3.

This catalyst is slightly inferior in catalytic activity, and the PET obtained by using this catalyst has high TS and HS and gives a film poor in thermal stability and inferior in water resistance.

As is evident from the Examples and Comparative Examples described above, the polyester polymerization catalyst of this invention is excellent in catalytic activity, and the film made of polyester produced by using said catalyst is excellent in film thermal stability, heat aging resistance and water resistance, indicating that the film is superior in quality level, while a product produced by reutilizing its scrap film is also excellent in quality level, with less reduction in strength even upon treatment with hot air for a long time or upon contacting with water for a long time. On the other hand, the catalyst not using the phosphorus compound of this invention in combination is inferior in catalytic activity, and even if polymerization is conducted for a long time, the catalyst fails to give polyester having a sufficient degree of polymerization.

Reference Example 1

A BHET mixture was obtained in the same manner as in Example 1 except that the solution of NMPA in ethylene glycol was not added. To this BHET mixture was added a solution of antimony trioxide in ethylene glycol in an amount of 0.05 mol-% in terms of antimony atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 1. As antimony trioxide, commercial antimony (III) oxide (with 99.999% purity, from Aldrich Chemical) was used. A solution prepared by dissolving antimony trioxide under stirring at 150° C. for about 1 hour at a concentration of about 10 g/l in ethylene glycol was used.

The polyethylene terephthalate having an IV of 0.65 dl/g, obtained in the polycondensation described above, was formed in a usual manner into chips. The PET resin chips were measured for various physical properties and tested. The results are shown in Tables 1 and 2.

Example 5

(Synthesis of the phosphorus compound)

Synthesis of the phosphorus compound (phosphorus compound A) represented by formula (47)

(47)

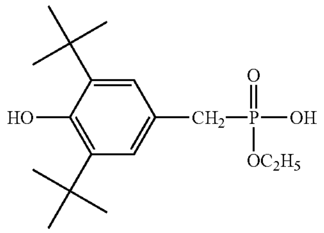

Synthesis of sodium (o-ethyl 3,5-di-tert-4-hydroxybenzylphosphonate) (phosphorus compound C)

A solution of 5 g (14 mmol) diethyl (3,5-di-tert-butyl-4-hydroxybenzyl) phosphonate (Irganox 1222 (Ciba Specialty Chemicals)) in 6.1 ml methanol was added to a mixed solution of 6.5 g (84 mmol) of 50% aqueous sodium hydroxide and 6.1 ml methanol, and the mixture was heated under reflux for 24 hours in a nitrogen atmosphere. After the reaction, the reaction mixture was cooled while 7.33 g (70 mmol) conc. hydrochloric acid was added thereto, and the precipitates were separated by filtration and washed with isopropanol, and the filtrate was distilled away under reduced pressure. The resultant residues were dissolved in hot isopropanol, insolubles were separated by filtration, the isopropanol was distilled away under reduced pressure, and the residues were washed with hot heptane and dried to give sodium (o-ethyl 3,5-di-tert-butyl-4-hydroxybenzylphosphonate), 3.4 g (69

State: white powder

Melting point: 294–302° C. (decomposed)

$^1$H-NMR(DMSO-d6□δ)

1.078 (3H, t, J=7 Hz), 1.354 (18H, s), 2.711 (2H, d), 3.724 (2H, m, J=7 Hz), 6.626 (1H, s), 6.9665 (2H, s)

Elemental analysis (theoretical): Na 6.36% (6.56%), P 9.18% (8.14%)

Synthesis of o-ethyl 3,5-di-tert-butyl-4-hydroxybenzylphosphonic acid (phosphorus compound A)

g conc. hydrochloric acid was added to 20 ml aqueous solution of 1 g (2.8 mmol) phosphorus compound C at room temperature under stirring, and the mixture was stirred for 1 hour. 150 ml water was added to the reaction mixture, and the precipitated crystals were separated by filtration, washed with water and dried to give o-ethyl 3,5-di-tert-butyl-4-hydroxybenzylphosphonic acid, 826 mg (88%).

State: plate-shaped crystals

Melting point: 126–127° C.

$^1$H-NMR($CDCl_3$□δ):

1.207 (3H, t, J=7 Hz), 1.436 (18H, s), 3.013 (2H, d), 3.888 (2H, m, J=7 Hz), 7.088 (2H, s), 7.679–8.275 (1H, br)

(Polymerization of polyester)

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction for 120 minutes at a pressure of 0.25 MPa at 245° C. while water was distilled away from the system, whereby a mixture of bis(2-hydroxyethyl) terephthalate (BHET) and oligomers (referred to hereinafter as BHET mixture) having a degree of esterification of 95% was obtained. To this BHET mixture were added 2.5 g/l aluminum trisacetyl acetonate in ethylene glycol in an amount of 0.015 mol-% in terms of aluminum atom relative to the acid component in the polyester and 10 g/l of the above-described phosphorus compound A in ethylene glycol in an amount of 0.04 mol-% in terms of phosphorus compound A relative to the acid component in the polyester, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 4.

The polyethylene terephthalate having an IV of 0.65 dl/g, obtained in the polycondensation described above, was formed in a usual manner into chips. The PET resin chips were measured for various physical properties. The results are shown in Tables 4 and 5.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 6.

Example 6

To a BHET mixture prepared in the same manner as in Example 5 were added 2.5 g/l aluminum trisacetyl acetonate in ethylene glycol in an amount of 0.015 mol-% in terms of aluminum atom relative to the acid component in the polyester, 10 g/l of the above-described phosphorus compound A in ethylene glycol in an amount of 0.03 mol-% in terms of phosphorus compound A relative to the acid component in the polyester and 50 g/l magnesium acetate.$4H_2O$ in ethylene glycol in an amount of 0.01 mol-% in terms of magnesium ion relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 4.

The polyethylene terephthalate having an IV of 0.65 dl/g, obtained by the polycondensation described above, was formed in a usual manner into chips. The PET resin chips were measured for various physical properties. The results are shown in Tables 4 and 5.

Using the PET resin chips obtained in the melt polymerization described above, a film was manufactured, recovered pellets were prepared, and a film was prepared from the recovered pellets. The thermal stability, thermal aging resistance and water resistance of the film were evaluated, and the results are shown in Table 6.

Comparative Example 3

Polymerization of PET was attempted by the same operation as in Example 5 except that phosphorus compound A was not added. Polymerization was conducted for 200 minutes or more, but the IV did not reach 0.65 dl/g.

Reference Example 2

To a BHET mixture prepared in the same manner as in Example 5 was added a solution of antimony trioxide as the catalyst in ethylene glycol in an amount of 0.05 mol-% in terms of antimony atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 1. As antimony trioxide, commercial antimony (III) oxide (with 99.999% purity, from Aldrich Chemical) was used. A solution prepared by dissolving antimony trioxide under stirring at 150° C. for about 1 hour at a concentration of about 10 g/l in ethylene glycol was used. Further, the polyethylene terephthalate having an IV of 0.65 dl/g, obtained in the polycondensation described above, was formed in a usual manner into chips. The PET resin chips were measured for various physical properties. The results are shown in Tables 4 and 5.

Evaluation Results

As can be seen from the results in Tables 4 to 6, the catalysts of this invention have a high polymerization activity, that is, the polycondensation time required for the intrinsic viscosity of polyester to reach the practical value of 0.65 dl/g is short, and the resultant polyester is excellent color tone, has low TS, is excellent in thermal stability and superior in thermal oxidation stability and hydrolytic stability and gives a film excellent in thermal stability, heat aging resistance and water resistance, indicating that the film is superior in quality level, while a product produced by reutilizing its scrap film is also excellent in quality level, with less reduction in strength even upon treatment with hot air for a long time or upon contacting with water for a long time.

On the other hand, the catalyst not using the phosphorus compound of this invention is poor in polymerization activity, while the catalyst using antimony trioxide has a high polymerization activity, but problems such as formation of insoluble particles are inevitable as described above.

Example 7

(Synthesis of the phosphorus compound)

Synthesis of the magnesium salt (phosphorus compound B) of a phosphorus compound represented by formula (48)

(48)

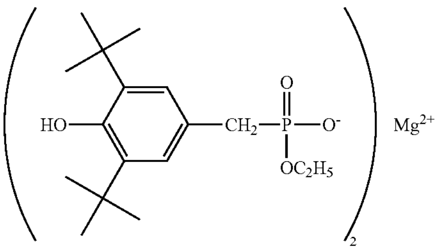

Synthesis of magnesium bis(o-ethyl 3,5-di-tert-butyl-4-hydroxybenzylphosphonate) (phosphorus compound B)

ml aqueous solution of 192 mg (0.75 mmol) magnesium nitrate.6$H_2O$ was added dropwise to 4 ml aqueous solution of 500 mg (1.4 mmol) sodium (o-ethyl 3,5-di-tert-butyl-4-hydroxybenzylphosphonate) (phosphorus compound C described above) at room temperature under stirring. After the mixture was stirred for 1 hour, the precipitates were collected by filtration, washed with water and dried to give magnesium bis(o-ethyl 3,5-di-tert-butyl-4-hydroxybenzylphosphonate), 359 mg (74%).

State: white powder

Melting point: >300° C.

$^1$H-NMR(DMSO-d6□δ):

1.0820 (6H, t, J=7 Hz), 1.3558 (36H, s), 2.8338 (4H, d), 3.8102 (4H, m, J=7 Hz), 6.6328 (2H, s), 6.9917 (4H, s)

(Polymerization of polyester)

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction for 120 minutes at a pressure of 0.25 MPa at 245° C. while water was distilled away from the system, whereby a mixture of bis(2-hydroxyethyl) terephthalate (BHET) and oligomers (referred to hereinafter as BHET mixture) having a degree of esterification of 95% was obtained. To this BHET mixture were added 2.5 g/l aluminum acetyl acetonate in ethylene glycol in an amount of 0.015 mol-% in terms of aluminum atom relative to the acid component in the polyester and the above-described phosphorus compound B in an amount of 0.02 mol-% relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 7.

The polyethylene terephthalate having an IV of 0.65 dl/g, obtained in the polycondensation described above, was formed in a usual manner into chips. The PET resin chips were measured for various physical properties. The results are shown in Tables 7 and 8.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 9.

Comparative Example 4

Polymerization of PET was attempted by the same operation as in Example 7 except that phosphorus compound B was not added. Polymerization was conducted for 120 minutes or more, but the IV did not reach 0.65 dl/g.

Reference Example 3

To a BHET mixture prepared in the same manner as in Example 7 was added a solution of antimony trioxide as the catalyst in ethylene glycol in an amount of 0.05 mol-% in terms of antimony atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 7. As antimony trioxide, commercial antimony (III) oxide (with 99.999% purity, from Aldrich Chemical) was used. A solution prepared by dissolving antimony trioxide under stirring at 150° C. for about 1 hour at a concentration of about 10 g/l in ethylene glycol was used. Further, the polyethylene terephthalate having an IV of 0.65 dl/g, obtained in the polycondensation described above, was formed in a usual manner into chips. The PET resin chips were measured for various physical properties. The results are shown in Tables 7 and 8.

Evaluation Results

As can be seen from the results in Tables 7 to 9, the catalysts of this invention have a high polymerization activity, that is, the polycondensation time required for the intrinsic viscosity of polyester to reach the practical value of 0.65 dl/$_9$ is short, and the resultant polyester is excellent color tone, has low TS, is excellent in thermal stability and superior in thermal oxidation stability and hydrolytic stability and gives a film excellent in thermal stability, heat aging resistance and water resistance, indicating that the film is superior in quality level, while a product produced by reutilizing its scrap film is also excellent in quality level, with less reduction in strength even upon treatment with hot air for a long time or upon contacting with water for a long time.

On the other hand, the catalyst not using the phosphorus compound of this invention is poor in polymerization activity, while the catalyst using antimony trioxide has a high polymerization activity, but problems such as formation of insoluble particles are inevitable as described above.

Example 8

To a mixture of bis(2-hydroxyethyl) terephthalate and oligomers prepared in a usual manner from high-purity terephthalic acid and ethylene glycol were added 2.5 g/l aluminum acetyl acetonate as the catalyst in ethylene glycol in an amount of 0.014 mol-% in terms of aluminum atom relative to the acid component in the polyester and then the above-described phosphorus compound C in an amount of 0.01 mol-% relative to the acid component in the polyester, and the mixture was stirred at 245° C. for 10 minutes at normal pressure. Then, the temperature was increased to 275° C. over 50 minutes while the pressure in the reaction system was gradually reduced to 0.1 mmHg, and the polycondensation reaction was further conducted for 3 hours at the same temperature and pressure. The IV of the resultant polymer was 0.53 dl/g.

Example 9

(Synthesis of the phosphorus compound)

Synthesis of strontium bis(o-ethyl 3,5-di-tert-butyl-4-hydroxybenzylphosphonate) (phosphorus compound D)

ml aqueous solution of 317 mg (1.5 mmol) strontium nitrate was added dropwise to 7.5 ml aqueous solution of 1 g (2.85 mmol) sodium (o-ethyl 3,5-di-tert-butyl-4-hydroxybenzylphosphonate) (phosphorus compound C described above) at room temperature under stirring. After the mixture was stirred for 1 hour, the precipitates were separated by filtration, washed with water and dried to give strontium bis(o-ethyl 3,5-di-tert-butyl-4-hydroxybenzylphosphonate), 513 mg (48 %).

State: white powder $^1$H-NMR(DMSO-d6□δ):

1.72 (6H, t, J=7 Hz), 1.36 (36H, s), 2.81 (4H, d), 3.78 (4H, m, J=7 Hz), 6.63 (2H, s), 6.94 (4H, s)

Synthesis of polyester

The same operation as in Example 8 was conducted except that in place of phosphorus compound C, the above-described phosphorus compound D was added in an amount of 0.02 mol-% relative to the acid component in the polyester. The IV of the resultant polymer was 0.57 dl/g.

Example 10

(Synthesis of the phosphorus compound)

Synthesis of barium bis(o-ethyl 3,5-di-tert-butyl-4-hydroxybenzylphosphonate) (phosphorus compound E)

5 ml aqueous solution of 392 mg (1.5 mmol) barium nitrate was added dropwise to 7.5 ml aqueous solution of 1 g (2.85 mmol) sodium (o-ethyl 3,5-di-tert-butyl-4-hydroxybenzylphosphonate) (phosphorus compound C described above) at room temperature under stirring. After the mixture was stirred for 1 hour, the precipitates were separated by filtration, washed with water and dried to give barium bis(o-ethyl 3,5-di-tert-butyl-4-hydroxybenzylphosphonate), 508 mg (45%).

State: white powder $^1$H-NMR(DMSO-d6□δ):

1.078 (3H, t, J=7 Hz), 1.354 (18H, s), 2.711 (2H, d), 3.724 (2H, m, J=7 Hz), 6.626 (1H, s), 6.9665 (2H, s)

(Synthesis of polyester)

The same operation as in Example 8 was conducted except that in place of phosphorus compound C, the above-described phosphorus compound E was added in an amount of 0.02 mol-% relative to the acid component in the polyester. The IV of the resultant polymer was 0.55 dl/g.

Comparative Example 5

Polyester was polymerized in the same manner as in Example 8 except that the phosphorus compound C was not used. The IV of the resultant polymer was 0.33 dl/g.

As can be seen from the Examples and Comparative Examples described above, the catalyst using the aluminum compound alone is inferior in polymerization activity, but when the phosphorus compound of this invention is used in combination therewith, the polymerization activity can be significantly improved.

Example 11

(Synthesis of the phosphorus compound)

Synthesis of the phosphorus compound (phosphorus compound F) represented by formula (49)

(49)

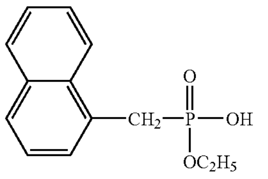

Synthesis of sodium [o-ethyl (1-naphthyl)methylphosphonate] (phosphorus compound G)

A solution of 5 g (18 mmol) o-ethyl (1-naphthyl)methylphosphonate (NMPA described above) in 6.1 ml methanol was added to a mixed solution of 6.5 g (84 mmol) 50% aqueous sodium hydroxide and 6.1 ml methanol, and the mixture was heated under reflux for 24 hours in a nitrogen atmosphere. After the reaction, the reaction mixture was cooled while 6.59 g (63 mmol) conc. hydrochloric acid was added thereto, the precipitates were separated by filtration and washed with isopropanol, and the filtrate was distilled away under reduced pressure. The resultant residues were dissolved in hot isopropanol, and insolubles were separated by filtration, and the isopropanol was distilled away under reduced pressure. The residues were washed with hot n-heptane, recrystallized from isopropanol and dried to give sodium [o-ethyl (1-naphthyl)methylphosphonate), 3.8 g (78%).

State: needle crystals

Melting point: 277–281° C. (decomposed)

$^1$H-NMR(DMSO-d6□δ):

0.961 (3H, t, J=7 Hz), 3.223 (2H, d), 3.589 (2H, m), 7.365–7.468 (4H, m, J=7 Hz), 7.651–8.314 (3H, m)

Synthesis of o-ethyl (1-naphthyl)methylphosphonic acid (phosphorus compound F)

g conc. hydrochloric acid was added to 10 ml aqueous solution of 1 g (3.7 mmol) sodium [o-ethyl (1-naphthyl) methylphosphonate) (phosphorus compound G described above) at room temperature under stirring, and the mixture was stirred for 1 hour. The reaction mixture was extracted with toluene, the toluene phase was washed with water, and the toluene was distilled away under reduced pressure, whereby o-ethyl (1-naphthyl)methylphosphonic acid, 497 mg (54%), was obtained.

State: colorless oily liquid $^1$H-NMR($CDCl_3$□δ):

1.085 (3H, t, J=7 Hz), 3.450 (2H, d), 3.719 (2H, m, J=7 Hz), 7.369–7.532 (4H, m), 7.727–8.043 (3H, m), 10.939 (1H, s)

(Polymerization of polyester)

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction for 120 minutes at a pressure of 0.25 MPa at 245° C. while water was distilled away from the system, whereby a mixture of bis(2-hydroxyethyl) terephthalate (BHET) and oligomers (referred to hereinafter as BHET mixture) having an degree of esterification of 95% was obtained. To this BHET mixture were added 2.5 g/l aluminum trisacetyl acetonate in ethylene glycol in an amount of 0.015 mol-% in terms of aluminum atom relative to the acid component in the polyester and 10 g/l of the above-described phosphorus compound F in ethylene glycol in an amount of 0.03 mol-% in terms of phosphorus compound F relative to the acid component in the polyester, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 10.

The polyethylene terephthalate having an IV of 0.65 dl/g was formed in a usual manner into chips. The PET resin chips were measured for various physical properties. The results are shown in Tables 10 and 11.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 12.

Example 12

To a BHET mixture prepared in the same manner as in Example 11 were added 2.5 g/l aluminum trisacetyl acetonate in ethylene glycol in an amount of 0.015 mol-% in terms of aluminum atom relative to the acid component in the polyester, 10 g/l of the above-described phosphorus compound F in ethylene glycol in an amount of 0.03 mol-% in terms of phosphorus compound F relative to the acid component in the polyester and 50 g/l magnesium acetate.$4H_2O$ in ethylene glycol in an amount of 0.01 mol-% in terms of magnesium ion relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 10.

The polyethylene terephthalate having an IV of 0.65 dl/g was formed in a usual manner into chips. The PET resin chips were measured for various physical properties. The results are shown in Tables 10 and 11.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 12.

Comparative Example 6

Polymerization of PET was attempted by the same operation as in Example 11 except that phosphorus compound F was not added. Polymerization was conducted for 200 minutes or more, but the IV did not reach 0.65 dl/g.

Reference Example 4

To a BHET mixture prepared in the same manner as in Example 11 was added a solution of antimony trioxide as the catalyst in ethylene glycol in an amount of 0.05 mol-% in terms of antimony atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 10. As antimony trioxide, commercial antimony (III) oxide (with 99.999% purity, from Aldrich Chemical) was used. A solution prepared by dissolving antimony trioxide under stirring at 150° C. for about 1 hour at a concentration of about 10 g/l in ethylene glycol was used. The polyethylene terephthalate having an IV of 0.65 dl/g, obtained in the polycondensation described above, was formed in a usual manner into chips. The PET resin chips were measured for various physical properties. The results are shown in Tables 10 and 11.

Evaluation Results

As can be seen from the results in Tables 10 to 12, the catalysts of this invention have a high polymerization activity, that is, the polycondensation time required for the intrinsic viscosity of polyester to reach the practical value of 0.65 dl/g is short, and the resultant polyester is excellent in color tone, has low TS, is excellent in thermal stability and superior in thermal oxidation stability and hydrolytic stability and gives a film excellent in thermal stability, heat aging resistance and water resistance, indicating that the film is superior in quality level, while a product produced by reutilizing its scrap film is also excellent in quality level, with less reduction in strength even upon treatment with hot air for a long time or upon contacting with water for a long time.

On the other hand, the catalyst not using the phosphorus compound of this invention is poor in polymerization activity, while the catalyst using antimony trioxide has a high polymerization activity, but problems such as formation of insoluble particles are inevitable as described above.

Example 13

(Polymerization of polyester)

To a mixture of bis(2-hydroxyethyl) terephthalate and oligomers prepared in a usual manner from high-purity terephthalic acid and ethylene glycol were added 2.5 g/l aluminum acetyl acetonate as the catalyst in ethylene glycol in an amount of 0.014 mol-% in terms of aluminum atom relative to the acid component in the polyester and then the above-described phosphorus compound G in an amount of 0.01 mol-% relative to the acid component in the polyester, and the mixture was stirred at 245° C. for 10 minutes at normal pressure. Then, the temperature was increased to 275° C. over 50 minutes while the pressure in the reaction system was gradually reduced to 0.1 mmHg, and the polycondensation reaction was further conducted for 3 hours at the same temperature and pressure. The IV of the resultant polymer was 0.54 dl/g.

Comparative Example 7

Polyester was polymerized in the same manner as in Example 13 was conducted except that the phosphorus compound G described above was not used. The IV of the resultant polymer was 0.33dl/g.

As can be seen from the Examples and Comparative Examples described above, the catalyst using the aluminum compound alone is inferior in polymerization activity, but when the phosphorus compound of this invention is used in combination therewith, the polymerization activity could be significantly improved.

Example 14

(Synthesis of an aluminum salt of a phosphorus compound)

Synthesis of the aluminum salt of o-ethyl 3,5-di-tert-butyl-4-hydroxybenzylphosphonate (aluminum salt A)

5 ml aqueous solution of 364 mg (0.97 mmol) aluminum nitrate.$9H_2O$ was added dropwise to 7.5 ml aqueous solution of 1 g (2.8 mmol) sodium (o-ethyl 3,5-di-tert-butyl-4-hydroxybenzylphosphonate) (phosphorus compound C described above) at room temperature under stirring. After the mixture was stirred for 3 hours, the precipitates were separated by filtration, washed with water and dried to give 860 mg aluminum salt of o-ethyl 3,5-di-tert-butyl-4-hydroxybenzylphosphonate.

State: white powder

Melting point: 183–192° C.

(Polymerization of polyester)

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction for 120 minutes at a pressure of 0.25 MPa at 245° C. while water was distilled away from the system, whereby a mixture of bis(2-hydroxyethyl) terephthalate (BHET) and oligomers (referred to hereinafter as BHET mixture) was obtained. To this BHET mixture was added the above-described aluminum salt A in an amount of 0.02 mol-% in terms of aluminum atom relative to the acid component in the polyester, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 13.

The polyethylene terephthalate having an IV of 0.65 dl/g, obtained in the polycondensation described above, was formed in a usual manner into chips. The PET resin chips were measured for various physical properties. The results are shown in Tables 13 and 14.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 15.

Comparative Example 8

To a BHET mixture prepared in the same manner as in Example 14 was added 2.5 g/l aluminum trisacetyl acetonate as the catalyst in ethylene glycol in an amount of 0.02 mol-% in terms of aluminum atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization was conducted for 200 minutes or more, but the IV did not reach 0.65 dl/g.

Reference Example 5

To a BHET mixture prepared in the same manner as in Example 14 was added a solution of antimony trioxide as the catalyst in ethylene glycol in an amount of 0.05 mol-% in terms of antimony atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 13. As antimony trioxide, commercial antimony (III) oxide (with 99.999% purity, from Aldrich Chemical) was used. A solution prepared by dissolving antimony trioxide under stirring at 150° C. for about 1 hour at a concentration of about 10 g/l in ethylene glycol was used. The polyethylene terephthalate having an IV of 0.65 dl/g, obtained in the polycondensation described above, was formed in a usual manner into chips. The PET resin chips were measured for various physical properties. The results are shown in Tables 14 and 15.

Evaluation Results

As can be seen from the results in Tables 13 to 15, the catalysts of this invention have a high polymerization activity, that is, the polycondensation time required for the intrinsic viscosity of polyester to reach the practical value of 0.65 dl/g is short, and the resultant polyester is excellent in color tone, has low TS, is excellent in thermal stability and superior in thermal oxidation stability and hydrolytic stability and gives a film excellent in thermal stability, heat aging resistance and water resistance, indicating that the film is superior in quality level, while a product produced by reutilizing its scrap film is also excellent in quality level with less reduction in strength even upon treatment, with hot air for a long time or upon contacting with water for a long time.

On the other hand, the known catalyst of an aluminum compound is poor in polymerization activity, while the catalyst using antimony trioxide has a high polymerization activity, but problems such as formation of insoluble particles are inevitable as described above.

Example 15

(Synthesis of the aluminum salt of a phosphorus compound)

Synthesis of the aluminum salt of o-ethyl (1-naphthyl) methylphosphonate (aluminum salt B)

5 ml aqueous solution of 236 mg (0.63 mmol) aluminum nitrate.9$H_2O$ was added dropwise to 10 ml aqueous solution of 500 mg (1.8 mmol) sodium [o-ethyl (1-naphthyl)methylphosphonate] (phosphorus compound G described above) at room temperature under stirring. After the mixture was stirred for 1 hour, the precipitates were separated by filtration, washed with water and dried to give 420 mg aluminum salt of sodium [o-ethyl (1-naphthyl) methylphosphonate].

State: white powder

Melting point: >300° C.

(Polymerization of polyester)

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction for 120 minutes at a pressure of 0.25 MPa at 245° C. while water was distilled away from the system, whereby a mixture of bis(2-hydroxyethyl) terephthalate (BHET) and oligomers (referred to hereinafter as BHET mixture) was obtained. To this BHET mixture were added the above-described aluminum salt B in an amount of 0.015 mol-% in terms of aluminum atom relative to the acid component in the polyester, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 16.

The polyethylene terephthalate having an IV of 0.65 dl/g, obtained in the polycondensation described above, was formed in a usual manner into chips. The PET resin chips were measured for various physical properties. The results are shown in Tables 16 and 17.

Using the PET resin chips obtained in the melt polymerization described above, a film was manufactured, recovered pellets were prepared, and a film was prepared from the recovered pellets. The thermal stability, heat aging resistance and water resistance of the film were evaluated, and the results are shown in Table 18.

Comparative Example 9

To a BHET mixture prepared in the same manner as in Example 15 was added 2.5 g/l aluminum trisacetyl acetonate as the catalyst in ethylene glycol in an amount of 0.015 mol-% in terms of aluminum atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization was conducted for 200 minutes or more, but the IV did not reach 0.65 dl/g.

Reference Example 6

To a BHET mixture prepared in the same manner as in Example 15 was added a solution of antimony trioxide as the catalyst in ethylene glycol in an amount of 0.05 mol-% in terms of antimony atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time (AP) necessary for the IV of the polyethylene terephthalate to reach 0.65 dl/g is shown in Table 16. As antimony trioxide, commercial antimony (III) oxide (with 99.999% purity, from Aldrich Chemical) was used. A solution prepared by dissolving antimony trioxide under stirring at 150° C. for about 1 hour at a concentration of about 10 g/l in ethylene glycol was used. The polyethylene terephthalate having an IV of 0.65 dl/g, obtained in the polycondensation described above, was formed in a usual manner into chips. The PET resin chips were measured for various physical properties. The results are shown in Tables 16 and 17.

Evaluation Results

As can be seen from the results in Tables 16 to 18, the aluminum compound catalysts of this invention have a high polymerization activity, that is, the polycondensation time required for the intrinsic viscosity of polyester to reach the practical value of 0.65 dl/g is short, and the resultant polyester is excellent in color tone, has low TS, is excellent in thermal stability and superior in thermal oxidation stability and hydrolytic stability and gives a film excellent in thermal stability, heat aging resistance and water resistance, indicating that the film is superior in quality level, while a product produced by reutilizing its scrap film is also excellent in quality level, with less reduction in strength even upon treatment with hot air for a long time or upon contacting with water for a long time.

On the other hand, the known catalyst of an aluminum compound is poor in polymerization activity, while the catalyst using antimony trioxide has a high polymerization activity, but problems such as formation of insoluble particles are inevitable as described above.

Example 16

To a mixture of bis(2-hydroxyethyl) terephthalate and oligomers prepared in a usual manner from high-purity terephthalic acid and ethylene glycol were added 10 g/l aluminum acetyl acetonate as the catalyst in ethylene glycol in an amount of 0.03 mol-% in terms of aluminum atom relative to the acid component in the polyester and then the compound represented by formula (50) below in an amount of 0.05 mol-% relative to the acid component in the polyester, and the mixture was stirred at 245° C. for 10 minutes at normal pressure. Then, the temperature was increased to 275° C. over 50 minutes while the pressure in the reaction system was gradually reduced to 0.1 mmHg, and the polycondensation reaction was further conducted for 3 hours at the same temperature and pressure. The IV of the resultant polymer was 0.55dl/g.

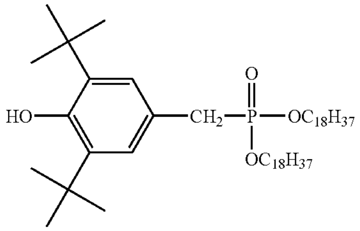

(50)

Comparative Example 10

Polyester was polymerized in the same manner as in Example 16 except that the compound represented by formula (50) was not used. The IV of the resultant polymer was 0.37dl/g.

As can be seen from the Examples and Comparative Examples described above, the catalyst using the aluminum compound alone is inferior in polymerization activity, but when the phosphorus compound of this invention is used in combination therewith, the polymerization activity could be significantly improved.

Example 17

A 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction for 120 minutes at a pressure of 0.25 MPa while water at 245° C. was distilled away from the system, whereby a mixture of bis(2-hydroxyethyl) terephthalate (BHET) and oligomers (referred to hereinafter as BHET mixture) having an degree of esterification of 95% was obtained. To this BHET mixture were added 2.5 g/l aluminum acetyl acetonate as the polymerization catalyst in ethylene glycol in an amount of 0.015 mol-% in terms of aluminum atom relative to the acid component in the polyester, the phosphorus compound represented by formula (38) above in an amount of 0.02 mol-% relative to the acid component and 50 g/l lithium acetate.$2H_20$ in ethylene glycol in an amount of 001 mol-% in terms of lithium atom, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polymerization reaction was further conducted at 275° C. at 0.1 Torr. The polymerization time necessary for the IV of the polyethylene terephthalate to reach 0.65 dl/g was 61 minutes.

Example 18

The same operation as in Example 17 was conducted except that in place of the phosphorus compound represented by formula (38), the phosphorus compound represented by formula (39) above was added in an amount of 0.02 mol-% relative to the acid component. The polymerization time necessary for the IV of the polyethylene terephthalate to reach 0.65 dl/g was 59 minutes.

Example 19

The same operation as in Example 17 was conducted except that in place of the phosphorus compound represented by formula (38), the phosphorus compound represented by formula (40) above was added in an amount of 0.02 mol-% relative to the acid component. The polymerization time necessary for the IV of the polyethylene terephthalate to reach 0.65 dl/g was 62 minutes.

Example 20

The same operation as in Example 17 was conducted except that in place of the phosphorus compound represented by formula (38), the phosphorus compound represented by formula (41) above was added in an amount of 0.02 mol-% relative to the acid component. The polymerization time necessary for the IV of the polyethylene terephthalate to reach 0.65 dl/g was 81 minutes.

Example 21

The same operation as in Example 17 was conducted except that in place of the phosphorus compound represented by formula (38), the phosphorus compound represented by formula (42) above was added in an amount of 0.02 mol-% relative to the acid component. The polymerization time necessary for the IV of the polyethylene terephthalate to reach 0.65 dl/g was 75 minutes.

Example 22

The same operation as in Example 17 was conducted except that in place of the phosphorus compound represented by formula (38), the phosphorus compound represented by formula (43) above was added in an amount of 0.02 mol-% relative to the acid component. The polymerization time necessary for the IV of the polyethylene terephthalate to reach 0.65 dl/g was 78 minutes.

Comparative Example 11

The same operation as in Example 17 was conducted except that 2.5 g/l aluminum acetyl acetonate in ethylene glycol was added solely as the polymerization catalyst. Aluminum acetyl acetonate was added in an amount of 0.015 mol-% in terms of aluminum atom relative to the acid component in the polyester. Polymerization was conducted for 180 minutes or more, but the IV of the polyethylene terephthalate did not reach 0.65 dl/g.

Reference Example 7

The same operation as in Example 17 was conducted except that a solution of antimony trioxide in ethylene glycol was added solely as the polymerization catalyst. Antimony trioxide was added in an amount of 0.05 mol-% in terms of antimony atom relative to the acid component. As antimony trioxide, commercial antimony (III) oxide (with 99.999% purity, from Aldrich Chemical) was used. A solution prepared by dissolving antimony trioxide under stirring at 150° C. for about 1 hour at a concentration of about 10 g/l in ethylene glycol was used. The polymerization time necessary for the IV of the polyethylene terephthalate to reach 0.65 dl/g was 55 minutes.

As can be seen from the Examples and Comparative Examples described above, the catalyst using the aluminum compound alone is inferior in polymerization activity, but when the phosphorus compound of this invention is used in combination therewith, the resultant catalyst can have an improved polymerization activity comparative to that of an antimony catalyst.

Example 23

(Spinning of the polyester)

The same polyester polymerization as in Example 5 above was repeatedly conducted until the resin was obtained in an amount necessary for spinning evaluation, and the resultant PET resin chips were dried, fed to a melt extruder, discharged at 290° C. through a spinneret having 108 orifices with a bore diameter of 0.14 mmϕ, cooled in a usual manner, subjected to oiling and drawn at a rate of 1720 m/min. Subsequently, the specimen was drawn 2.127-fold on a preheating roller at 80° C. and at a temperature set at 150° C. to give an oriented polyester yarn of 47 deci-tex with 108 filaments. The productivity in spinning and drawing was very good, and the physical properties of the resultant yarn were not problematic for use in clothing.

Example 24

(Spinning of the polyester)

The same polyester polymerization as in Example 7 above was repeatedly conducted until the resin was obtained in an amount necessary for spinning evaluation, and the resultant PET resin chips were dried, fed to a melt extruder, discharged at 290° C. through a spinneret having 108 orifices with a bore diameter of 0.14 mmϕ, cooled in a usual manner, subjected to oiling and drawn at a rate of 1720 m/min. Subsequently, the specimen was drawn 2.127-fold on a preheating roller at 80° C. and at a temperature set at 150° C. to give an oriented polyester yarn of 47 deci-tex with 108 filaments. The productivity in spinning and drawing was very good, and the physical properties of the resultant yarn were not problematic for use in clothing.

Example 25

(Spinning of the polyester)

The same polyester polymerization as in Example 14 above was repeatedly conducted until the resin was obtained in an amount necessary for spinning evaluation, and the resultant PET resin chips were dried, fed to a melt extruder, discharged at 290° C. through a spinneret having 108 orifices with a bore diameter of 0.14 mmϕ, cooled in a usual manner, subjected to oiling and drawn at a rate of 1720 m/min. Subsequently, the specimen was drawn 2.127-fold on a preheating roller at 80° C. and at a temperature set at 150° C. to give an oriented polyester yarn of 47 deci-tex with 108 filaments. The productivity in spinning and drawing was very good, and the physical properties of the resultant yarn were not problematic for use in clothing.

Comparative Example 12

The same polyester polymerization as in Reference Example 2 was repeatedly conducted until the resin was obtained in an amount necessary for spinning evaluation. The spinning breaks upon melt-spinning of the resultant polyester in the same manner as in Example 23, and the breaks thereof upon drawing, were increased compared to those in the Examples.

Example 26

(Molding of a hollow molded article)

The surfaces of the PET resin chips obtained in the polymerization described in Example 5 were crystallized at 160° C., dried at about 160 to 170° C. in a nitrogen stream in a stationary solid state polymerization tower and subjected to solid state polymerization at 205° C., to give PET having an IV of 0.82 dl/g.

Then, a stepped molded plate and oriented hollow molded article were obtained respectively according to the methods described in (19) and (20) above. The molded plate and oriented hollow molded article produced by molding the PET obtained by using the polycondensation catalyst of this invention were measured for their haze, and there was no problem.

The hollow molded article produced by molding the PET obtained by using the polycondensation catalyst of this invention was excellent in transparency.

Example 27

(Molding of a hollow molded article)

The surfaces of the PET resin chips obtained in the polymerization described in Example 7 were crystallized at 160° C., dried at about 160 to 170° C. in a nitrogen stream in a stationary solid state polymerization tower and subjected to solid state polymerization at 205° C., to give PET having an IV of 0.82 dl/g.

Then, a stepped molded plate and oriented hollow molded article were obtained respectively according to the methods described in (19) and (20) above. The molded plate and oriented hollow molded article produced by molding the PET obtained by using the polycondensation catalyst of this invention were measured for their haze, and there was no problem.

The hollow molded article produced by molding the PET obtained by using the polycondensation catalyst of this invention was excellent in transparency.

Example 28

(Molding of a hollow molded article)

The surfaces of the PET resin chips obtained in the polymerization described in Example 14 were crystallized at 160° C., dried at about 160 to 170° C. in a nitrogen stream in a stationary solid state polymerization tower and subjected to solid state polymerization at 205° C., to give PET having an IV of 0.82 dl/g.

Then, a stepped molded plate and oriented hollow molded article were obtained respectively according to the methods described in (19) and (20) above. The molded plate and oriented hollow molded article produced by molding the PET obtained by using the polycondensation catalyst of this invention were measured for their haze, and there was no problem.

The hollow molded article produced by molding the PET obtained by using the polycondensation catalyst of this invention was excellent in transparency.

Example 29

(Molding of a sheet)

The solid state polymerized polyester obtained in Example 26 was subjected to the evaluation in (22), and the degree of discoloration thereof evaluated by naked eyes was the same as the degree of discoloration of a non-oriented sheet made of virgin resin, and there was no problem.

Comparative Example 13

PET resin chips polymerized according to the method described in Reference Example 2 were processed in the same manner as in Example 26 to give PET having an IV of 0.82 dl/g. Then, a stepped molded plate and a stretched hollow molded article were obtained according to the methods described in (19) and (20) above. The resultant molded plate and stretched hollow molded article were poor in transparency.

Comparative Example 14

PET resin chips were obtained by the same polymerization as in Reference Example 2 except that as the catalyst, tetrabutyl titanate was used in an amount of 0.0015 mol-% in terms of titanium atom relative to the acid component in the polymer, and PET having an IV of 0.82 dl/g was obtained in the same manner as in Example 26.

Then, a stepped molded plate and a stretched hollow molded article were obtained according to the methods described in (19) and (20) above. The discoloration of these molded articles evaluated with naked eyes was very yellow, indicating that these were not of commercial value.

Example 30

(Manufacture of film)

The PET resin chips obtained in Example 5 were vacuum-dried at 135° C. for 10 hours. The PET resin chips, and silica particles having an average particle diameter of 1.0 μm, a particle diameter scattering of 20% and an area yield of 80% in an amount of 0.2% by weight based on the PET, were quantitatively fed to a twin-screw extruder and melt-extruded at 280° C. in a sheet form, quenched and solidified on a metal roll kept at a surface temperature of 20° C., to give a cast film of 1400 μm in thickness.

Then, this cast film was heated to 100° C. with a series of heated rollers and an infrared heater and then drawn 3.5-fold in the longer direction with a series of rollers different in circumferential velocity to give a monoaxial oriented PET film. Subsequently, the film was drawn 4.0-fold in the width direction by a tender at 120° C., and while the width length of the film was fixed, the film was heated at 260° C. for 0.5 second by an infrared heater, followed by relaxation by 3% at 200° C. for 23 seconds, to give a biaxial oriented PET film of 100 μm in thickness. The resultant film was excellent in haze, thermal stability, covering properties, and wear resistance.

Example 31

Using the PET resin chips obtained in Example 7, a biaxially oriented PET film was obtained in the same manner as in Example 30. The resultant film was excellent in haze, thermal stability, covering properties, and wear resistance.

Example 32

Using the PET resin chips obtained in Example 14, a biaxial oriented PET film was obtained in the same manner as in Example 30. The resultant film was excellent in haze, thermal stability, covering properties, and wear resistance.

INDUSTRIAL APPLICABILITY

According to this invention, there are provided a novel polycondensation catalyst other than antimony compounds, polyester produced by using the same and a process for producing polyester. The polyester of this invention can be applied for example to fibers for clothing, interior and bedding fibers such as curtains, carpets and futon cotton, fibers for industrial materials such as tire cords and ropes, various fabrics, knitting, nonwoven fabrics of staples or filaments, films such as packaging films, industrial films, optical films, films for magnetic tapes, photographic films, films for can laminates, films for capacitors, thermally shrinkable films, gas barrier films, white films and easily cut films, hollow molded articles such as non-heat resistant stretched bottles, heat resistant stretched bottles, direct blown bottles, gas barrier bottles, pressure-resistant bottles and heat- and pressure-resistant bottles, sheets such as A-PET and C-PET, and various molded articles like engineering plastics such as glass fiber-reinforced polyester and elastomer, and coatings and adhesives.

TABLE 1

| | Catalyst | | | | DSC | | |
|---|---|---|---|---|---|---|---|
| | Component | Amount (mol %) | Polymerization time (min) | Acid value (eq/ton) | Tm | Tc1 | Tc2 |
| Example 1 | aluminum acetyl acetonate | 0.015 | 113 | | | | |
| | NMPA | 0.03 | | 2 | 256.5 | 168.5 | 181.7 |
| Example 2 | aluminum acetyl acetonate | 0.015 | | | | | |
| | NMPA | 0.03 | 85 | | | | |
| | magnesium acetate · $4H_2O$ | 0.01 | | 2.3 | 256.2 | 166.9 | 187.6 |
| Example 3 | aluminum acetyl acetonate | 0.015 | | | | | |
| | NMPA | 0.02 | 114 | | | | |
| | lithium acetate · $2H_2O$ | 0.01 | | 2.5 | 256.3 | 142.1 | 182.7 |
| Example 4 | aluminum acetyl acetonate | 0.015 | | | | | |
| | BPADE | 0.03 | 135 | | | | |
| | magnesium acetate · $4H_2O$ | 0.01 | | 5.8 | 256.2 | 157.3 | 183.9 |

TABLE 1-continued

| | Catalyst | | | | DSC | | |
|---|---|---|---|---|---|---|---|
| | Component | Amount (mol %) | Polymerization time (min) | Acid value (eq/ton) | Tm | Tc1 | Tc2 |
| Comparative Example 1 | aluminum acetyl acetonate | 0.015 | More than 180 | — | — | — | — |
| Comparative Example 2 | aluminum acetyl acetonate | 0.015 | 147 | | | | |
| | cobalt acetate (II) · $4H_2O$ | 0.005 | | 23 | 255.7 | 157.1 | 179.1 |
| Reference Example 1 | Antimony trioxide | 0.05 | 86 | 6.8 | 256.7 | 127 | 212.5 |

TABLE 2

| | Catalyst | | Color Tone | | | | | |
|---|---|---|---|---|---|---|---|---|
| | Component | Amount (mol %) | L value | a value | b value | TS | TOS | HS |
| Example 1 | aluminum acetyl acetonate | 0.015 | | | | | | |
| | NMPA | 0.03 | 65.8 | −1.98 | 3.65 | 0.18 | 0.02 | 0.04 |
| Example 2 | aluminum acetyl acetonate | 0.015 | | | | | | |
| | NMPA | 0.03 | | | | | | |
| | magnesium acetate · $4H_2O$ | 0.01 | 65.4 | −1.53 | 2.69 | 0.19 | 0.05 | 0.05 |
| Example 3 | aluminum acetyl acetonate | 0.015 | | | | | | |
| | NMPA | 0.02 | | | | | | |
| | lithium acetate · $2H_2O$ | 0.01 | 65.3 | −2.46 | 5.99 | 0.22 | 0.05 | 0.07 |
| Example 4 | aluminum acetyl acetonate | 0.015 | | | | | | |
| | BPADE | 0.03 | | | | | | |
| | magnesium acetate · $4H_2O$ | 0.01 | 64.3 | −1.68 | 3.17 | 0.22 | 0.12 | 0.06 |
| Comparative Example 1 | aluminum acetyl acetonate | 0.015 | — | — | — | — | — | — |
| Comparative Example 2 | aluminum acetyl acetonate | 0.015 | | | | | | |
| | cobalt acetate (II) · $4H_2O$ | 0.005 | 60.5 | 1.74 | −0.93 | 0.48 | 0.02 | 0.11 |
| Reference Example 1 | antimony trioxide | 0.05 | 56 | −1.31 | 2.71 | 0.21 | 0.01 | 0.04 |

TABLE 3

| | Catalyst | | Film evaluation results | | |
|---|---|---|---|---|---|
| | Component | Amount (mol %) | Film thermal stability | Heat aging resistance | Film water resistance |
| Example 1 | aluminum acetyl acetonate | 0.015 | | | |
| | NMPA | 0.03 | □ | ○ | ○ |
| Example 2 | aluminum acetyl acetonate | 0.015 | | | |
| | NMPA | 0.03 | | | |
| | magnesium acetate · $4H_2O$ | 0.01 | □ | ○ | ○ |
| Example 3 | aluminum acetyl acetonate | 0.015 | | | |
| | NMPA | 0.02 | | | |
| | lithium acetate · $2H_2O$ | 0.01 | □ | ○ | □ |
| Example 4 | aluminum acetyl acetonate | 0.015 | | | |
| | BPADE | 0.03 | | | |
| | magnesium acetate · $4H_2O$ | 0.01 | □ | □ | ○ |
| Comparative Example 1 | aluminum acetyl acetonate | 0.015 | — | — | — |

TABLE 3-continued

| | Catalyst | | Film evaluation results | | |
|---|---|---|---|---|---|
| | Component | Amount (mol %) | Film thermal stability | Heat aging resistance | Film water resistance |
| Comparative Example 2 | aluminum acetyl acetonate | 0.015 | | | |
| | cobalt acetate (II) · $4H_2O$ | 0.005 | x | ○ | x |
| Reference Example 1 | antimony trioxide | 0.05 | — | — | — |

TABLE 4

| | Catalyst | | Polymerization time | IV before the test | Acid value | | DSC | | |
|---|---|---|---|---|---|---|---|---|---|
| | Component | Amount (mol %) | (min) | (dl/g) | (eq/ton) | DEG (mol %) | Tm | Tc1 | Tc2 |
| Example 5 | aluminum trisacetyl acetonate | 0.015 | | | | | | | |
| | phosphorus compound A | 0.04 | 103 | 0.65 | 2 | 2 | 257.5 | 164.1 | 185.4 |
| Example 6 | aluminum trisacetyl acetonate | 0.015 | | | | | | | |
| | phosphorus compound A | 0.03 | | | | | | | |
| | magnesium acetate · $4H_2O$ | 0.01 | 111 | 0.65 | 2 | 2.2 | 256.4 | 165.2 | 182.7 |
| Comparative Example 2 | aluminum trisacetyl acetonate | 0.015 | more than 200 | — | — | — | — | — | — |
| Reference Example 1 | antimony trioxide | 0.05 | 94 | 0.65 | 2 | 2 | 257.1 | 132.7 | 208.1 |

TABLE 5

| | Catalyst | | Color tone | | | Test results | | |
|---|---|---|---|---|---|---|---|---|
| | Component | Amount (mol %) | L value | a value | B value | TS | TOS | HS |
| Example 5 | aluminum trisacetyl acetonate | 0.015 | | | | | | |
| | phosphorus compound A | 0.04 | 68.3 | −1.1 | 1.9 | 0.16 | 0.01 or less | 0.04 |
| Example 6 | aluminum trisacetyl acetonate | 0.015 | | | | | | |
| | phosphorus compound A | 0.03 | | | | | | |
| | magnesium acetate · $4H_2O$ | 0.01 | 66.3 | −1.7 | 2 | 0.18 | 0.02 | 0.05 |
| Comparative Example 3 | aluminum trisacetyl acetonate | 0.015 | — | — | — | — | — | — |
| Reference Example 2 | antimony trioxide | 0.05 | 58.4 | −1.3 | 2.6 | 0.23 | 0.01 or less | 0.04 |

TABLE 6

| | Catalyst | | Film evaluation results | | |
|---|---|---|---|---|---|
| | Component | Amount (mol %) | Film thermal stability | Heat aging resistance | Film water resistance |
| Example 5 | aluminum trisacetyl acetonate | 0.015 | | | |
| | phosphorus compound A | 0.04 | □ | ○ | ○ |
| Example 6 | aluminum trisacetyl acetonate | 0.015 | | | |
| | phosphorus compound A | 0.03 | | | |
| | magnesium acetate · $4H_2O$ | 0.01 | □ | ○ | ○ |
| Comparative Example 3 | aluminum trisacetyl acetonate | 0.015 | — | — | — |
| Reference Example 2 | antimony trioxide | 0.05 | — | — | — |

TABLE 7

| | Catalyst | | Polymerization time | IV before the test | Acid value (eq/ | DSC | | |
|---|---|---|---|---|---|---|---|---|
| | Component | Amount (mol %) | (min) | dl/g) | ton) | Tm | Tc1 | Tc2 |
| Example 7 | aluminum trisacetyl acetonate | 0.015 | | | | | | |
| | phosphorus compound B | 0.02 | 39 | 0.65 | 2 | 256.5 | 165.6 | 185.1 |
| Comparative Example 4 | aluminum trisacetyl acetonate | 0.015 | more than 120 | — | — | — | — | — |
| Reference Example3 | antimony trioxide | 0.05 | 49 | 0.65 | 2 | 257 | 130 | 208.4 |

TABLE 8

| | Catalyst | | Color tone | | | Test results | | |
|---|---|---|---|---|---|---|---|---|
| | Component | Amount (mol %) | L value | A value | B value | TS | TOS | HS |
| Example 7 | aluminum trisacetyl acetonate | 0.015 | | | | | | |
| | phosphorus compound B | 0.02 | 66.6 | −2.1 | 4.5 | 0.19 | 0.01 or less | 0.06 |
| Comparative Example 4 | aluminum trisacetyl acetonate | 0.015 | — | — | — | — | — | — |
| Reference Example 3 | antimony trioxide | 0.05 | 56.8 | −1.5 | 2.9 | 0.21 | 0.01 or less | 0.05 |

TABLE 9

| | Catalyst | | Film evaluation results | | |
|---|---|---|---|---|---|
| | Component | Amount (mol %) | Film thermal stability | Heat aging resistance | Film water resistance |
| Example 7 | aluminum trisacetyl acetonate | 0.015 | | | |
| | phosphorus compound B | 0.02 | □ | ○ | ○ |
| Comparative Example 4 | aluminum trisacetyl acetonate | 0.015 | — | — | — |
| Reference Example 3 | antimony trioxide | 0.05 | — | — | — |

TABLE 10

| | Catalyst | | Polymerization time | IV before the test | Acid value | DSC | | |
|---|---|---|---|---|---|---|---|---|
| | Component | Amount (mol %) | (min) | (dl/g) | (eq/ton) | Tm | Tc1 | Tc2 |
| Example 11 | Aluminum trisacetyl acetonate | 0.015 | | | | | | |
| | phosphorus compound F | 0.03 | 127 | 0.65 | 2 | 257.6 | 166.3 | 180.7 |
| Example 12 | Aluminum trisacetyl acetonate | 0.015 | | | | | | |
| | phosphorus compound F | 0.03 | | | | | | |
| | Magnesium acetate · $4H_2O$ | 0.01 | 111 | 0.65 | 2 | 256.9 | 165.5 | 181.4 |
| Comparative Example 6 | Aluminum trisacetyl acetonate | 0.015 | more than 200 | — | — | — | — | — |
| Reference Example 4 | Antimony trioxide | 0.05 | 94 | 0.65 | 2 | 257.1 | 132.7 | 208.1 |

TABLE 11

| | Catalyst | | Color tone | | | Test results | | |
|---|---|---|---|---|---|---|---|---|
| | Component | Amount (mol %) | L value | a value | b value | TS | TOS | HS |
| Example 11 | Aluminum trisacetyl acetonate | 0.015 | | | | | | |
| | Phosphorus compound F | 0.04 | 65.8 | −1.9 | 2.9 | 0.14 | 0.04 | 0.03 |
| Example 12 | Aluminum trisacetyl acetonate | 0.015 | | | | | | |
| | Phosphorus compound F | 0.03 | | | | | | |
| | Magnesium acetate · $4H_2O$ | 0.01 | 65.9 | −1.5 | 2.2 | 0.19 | 0.05 | 0.04 |
| Comparative Example 6 | Aluminum trisacetyl acetonate | 0.015 | — | — | — | — | — | — |
| Reference Example 4 | Antimony trioxide | 0.05 | 58.4 | −1.3 | 2.6 | 0.23 | 0.01 or less | 0.04 |

TABLE 12

| | Catalyst | | Film evaluation results | | |
|---|---|---|---|---|---|
| | Component | Amount (mol %) | Film thermal stability | Heat aging resistance | Film water resistance |
| Example 11 | aluminum trisacetyl acetonate | 0.015 | | | |
| | phosphorus compound F | 0.04 | □ | ○ | ○ |
| Example 12 | aluminum trisacetyl acetonate | 0.015 | | | |
| | phosphorus compound F | 0.03 | | | |
| | magnesium acetate · $4H_2O$ | 0.01 | □ | ○ | ○ |
| Comparative Example 6 | aluminum trisacetyl acetonate | 0.015 | — | — | — |
| Reference Example 4 | antimony trioxide | 0.05 | — | — | — |

TABLE 13

| | Catalyst | | | | | DSC | | |
|---|---|---|---|---|---|---|---|---|
| | Component | Amount | Polymerization time (min) | IV before the test (dl/g) | Acid value (eq/ton) | Tm | Tc1 | Tc2 |
| Example 14 | aluminum salt A | 0.02 | 98 | 0.65 | 1 or less | 257.1 | 160.7 | 185.1 |
| Comparative Example 8 | aluminum trisacetyl acetone | 0.02 | more than 200 | — | — | — | — | — |
| Reference Example 5 | antimony trioxide | 0.05 | 94 | 0.65 | 2 | 257.1 | 132.7 | 208.1 |

TABLE 14

| | Catalyst | | Color tone | | | Test results | | |
|---|---|---|---|---|---|---|---|---|
| | Component | Amount (mol %) | L value | A value | b value | TS | TOS | HS |
| Example 14 | aluminum salt A | 0.02 | 64.3 | −1.4 | 2.3 | 0.14 | 0.01 | 0.03 |
| Reference Example 5 | antimony trioxide | 0.05 | 58.4 | −1.3 | 2.6 | 0.23 | 0.01 or less | 0.04 |

TABLE 15

| | Catalyst | | Film evaluation results | | |
|---|---|---|---|---|---|
| | Component | Amount (mol %) | Film thermal stability | Heat aging resistance | Film water resistance |
| Example 14 | aluminum salt A | 0.02 | □ | ○ | ○ |

TABLE 16

| | Catalyst | | Polymerization | IV before the test | Acid value | DSC | | |
|---|---|---|---|---|---|---|---|---|
| | Component | Amount (mol %) | time (min) | (dl/g) | (eq/ton) | Tm | Tcl | Tc2 |
| Example 15 | aluminum salt B | 0.015 | 137 | 0.65 | 1 or less | 256.9 | 163.6 | 186.2 |
| Comparative Example 9 | aluminum trisacetyl acetonate | 0.015 | more than 200 | — | — | — | — | — |
| Reference Example 6 | antimony trioxide | 0.05 | 94 | 0.65 | 2 | 257.1 | 132.7 | 208.1 |

TABLE 17

| | Catalyst | | Color tone | | | Test results | | |
|---|---|---|---|---|---|---|---|---|
| | Component | Amount (mol %) | L value | A value | b value | TS | TOS | HS |
| Example 15 | aluminum salt B | 0.015 | 66.4 | −1.5 | 2.1 | 0.13 | 0.03 | 0.03 |
| Reference Example 6 | antimony trioxide | 0.05 | 58.4 | −1.3 | 2.6 | 0.23 | 0.01 or less | 0.04 |

TABLE 18

| | Catalyst | | Film evaluation results | | |
|---|---|---|---|---|---|
| | Component | Amount (mol %) | Film thermal stability | Heat aging resistance | Film water resistance |
| Example 15 | Aluminum salt B | 0.015 | □ | ○ | ○ |

What is claimed is:

1. A polyester polymerization catalyst comprising at least one member selected from aluminum and compounds thereof as a metal-containing component and at least one of phosphorus metal salt compounds, the catalyst producing a polyester comprising (a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters.

2. The polyester polymerization catalyst according to claim 1, wherein the phosphorus metal salt compound is at least one member selected from the compounds represented by the general formula (1):

[formula 1]

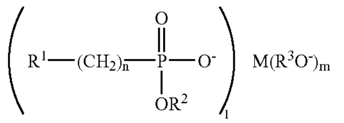

wherein $R^1$ represents hydrogen, a $C_{1-50}$ hydrocarbon group, or a $C_{1-50}$ hydrocarbon group containing a hydroxyl group, halogen group, alkoxyl group or amino group; $R^2$ represents hydrogen, a $C_{1-50}$ hydrocarbon group, or a $C_{1-50}$ hydrocarbon group containing a hydroxyl group or alkoxyl group; $R^3$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, and l+m is 4 or less; M represents a (l+m)-valent metal cation; n is an integer of 1 or more; and the hydrocarbon group may contain an alicyclic structure, a branched structure and an aromatic ring structure.

3. The polyester polymerization catalyst according to claim 2, wherein the phosphorus compound represented by the general formula (1) is at least one member selected from the compounds represented by the general formula (2):

[formula 2]

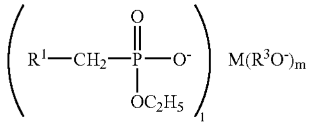

wherein $R^1$ represents hydrogen, a $C_{1-50}$ hydrocarbon group, or a $C_{1-50}$ hydrocarbon group containing a hydroxyl group, halogen group, alkoxyl group or amino group; $R^3$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, l+m is 4 or less; M represents a (l+m)-valent metal cation; and the hydrocarbon group may contain an alicyclic structure, a branched structure and an aromatic ring structure.

4. A polyester polymerization catalyst comprising at least one member selected from the group consisting of aluminum and compounds thereof as a metal-containing component and at least one member selected from compounds represented by the general formula (3):

[formula 3]

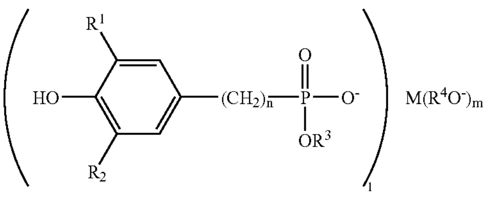

wherein $R^1$ and $R^2$ independently represent hydrogen or a $C_{1-30}$ hydrocarbon group; $R^3$ represents hydrogen, a $C_{1-50}$ hydrocarbon group, or a $C_{1-50}$ hydrocarbon group containing a hydroxyl group or alkoxyl group; $R^4$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, l+m is 4 or less, M represents a (l+m)-valent metal cation; n is an integer of 1 or more; and the hydrocarbon group may contain an alicyclic structure, a branched structure and an aromatic ring structure.

5. The polyester polymerization catalyst according to claim 4, wherein the phosphorus compound represented by the general formula (3) is at least one member selected from the compounds represented by the general formula (4):

[formula 4]

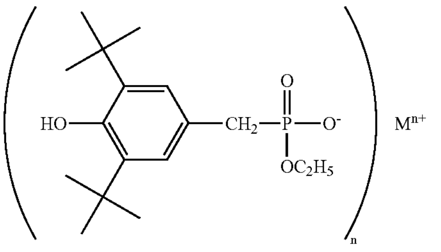

wherein $M^{n+}$ represents an n-valent metal cation, and n is 1, 2, 3 or 4.

6. The polyester polymerization catalyst according to claim 1, wherein the metal moiety of the phosphorus metal salt compound is selected from Li, Na, K, Be, Mg, Sr, Ba, Mn, Ni, Cu and Zn.

7. The polyester polymerization catalyst according to claim 2, wherein the metal moiety of the phosphorus metal salt compound is selected from Li, Na, K, Be, Mg, Sr, Ba, Mn, Ni, Cu and Zn.

8. The polyester polymerization catalyst according to claim 3, wherein the metal moiety of the phosphorus metal salt compound is selected from Li, Na, K, Be, Mg, Sr, Ba, Mn, Ni, Cu and Zn.

9. The polyester polymerization catalyst according to claim 4, wherein the metal moiety of the phosphorus metal salt compound is selected from Li, Na, K, Be, Mg, Sr, Ba, Mn, Ni, Cu and Zn.

10. The polyester polymerization catalyst according to claim 5, wherein the metal moiety of the phosphorus metal salt compound is selected from Li, Na, K, Be, Mg, Sr, Ba, Mn, Ni, Cu and Zn.

11. A polyester polymerization catalyst comprising at least one member selected from aluminum salts of a phosphorus compound.

12. The polyester polymerization catalyst according to claim 11, wherein the aluminum salt of a phosphorus compound is at least one member selected from the compounds represented by the general formula (5):

[formula 5]

(5)

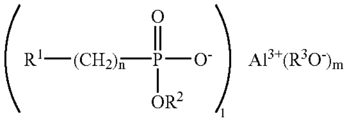

wherein $R^1$ represents hydrogen, a $C_{1-50}$ hydrocarbon group, or a $C_{1-50}$ hydrocarbon group containing a hydroxyl group, halogen atom, alkoxyl group or amino group; $R^2$ represents hydrogen, a $C_{1-50}$ hydrocarbon group, or a $C_{1-50}$ hydrocarbon group containing a hydroxyl group or alkoxyl group; $R^3$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, l+m is 3; n is an integer of 1 or more; and the hydrocarbon group may contain an alicyclic structure, a branched structure and an aromatic ring structure.

13. A polyester polymerization catalyst comprising at least one member selected from the compounds represented by the general formula (6):

[formula 6]

(6)

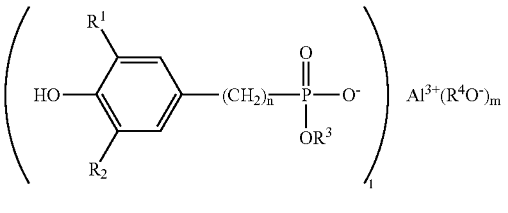

wherein $R^1$ and $R^2$ independently represent hydrogen or a $C_{1-30}$ hydrocarbon group; $R^3$ represents hydrogen, a $C_{1-50}$ hydrocarbon group, or a $C_{1-50}$ hydrocarbon group containing a hydroxyl group or alkoxyl group; $R^4$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, l+m is 3; n is an integer of 1 or more; and the hydrocarbon group may contain an alicyclic structure, a branched structure and an aromatic ring structure.

14. The polyester polymerization catalyst according to claim 13, wherein the phosphorus compound represented by the general formula (6) is at least one member selected from the compounds represented by the general formula (7):

[formula 7]

(7)

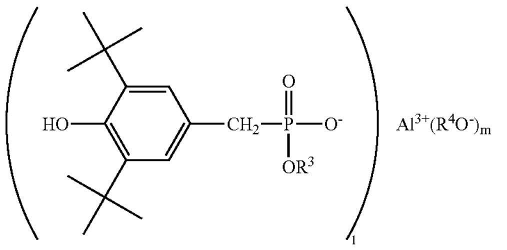

wherein $R^3$ represents hydrogen, a $C_{1-50}$ hydrocarbon group, or a $C_{1-50}$ hydrocarbon group containing a hydroxyl group or alkoxyl group; $R^4$ represents hydrogen, a $C_{1-50}$ hydrocarbon group, or a $C_{1-50}$ hydrocarbon group containing a hydroxyl group, alkoxyl group or carbonyl; l is an integer of 1 or more, m is 0 or an integer of 1 or more, and l+m is 3; and the hydrocarbon group may contain an alicyclic structure, a branched structure and an aromatic ring structure.

15. A polyester polymerization catalyst comprising at least one member selected from the group consisting of aluminum and compounds thereof as a metal-containing component and at least one member selected from phosphorus compounds having at least one P—OH bond, the catalyst producing a polyester comprising (a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters.

16. The polyester polymerization catalyst according to claim 15, wherein the phosphorus compound is at least one member selected from the compounds represented by the general formula (8):

[formula 8]

(8)

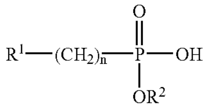

wherein $R^1$ represents hydrogen, a $C_{1-50}$ hydrocarbon group, or a $C_{1-50}$ hydrocarbon group containing a hydroxyl group, halogen group, alkoxyl group or amino group; $R^2$ represents hydrogen, a $C_{1-50}$ hydrocarbon group, or a $C_{1-50}$ hydrocarbon group containing a hydroxyl group or alkoxyl group; n is an integer of 1 or more; and the hydrocarbon group may contain an alicyclic structure, a branched structure and an aromatic ring structure.

17. A polyester polymerization catalyst comprising at least one member selected from the group consisting of aluminum and compounds thereof as a metal-containing component and at least one member selected from the phosphorus compounds represented by the general formula (9):

[formula 9]

(9)

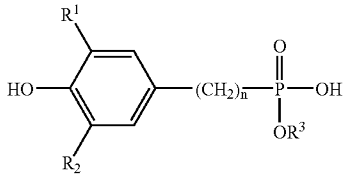

wherein $R^1$ and $R^2$ independently represent hydrogen or a $C_{1-30}$ hydrocarbon group; $R^3$ represents hydrogen, a $C_{1-50}$ hydrocarbon group, or a $C_{1-50}$ hydrocarbon group containing a hydroxyl group or alkoxyl group; n is an integer of 1 or more; and the hydrocarbon group may contain an alicyclic structure, a branched structure and an aromatic ring structure.

18. The polyester polymerization catalyst according to claim 17, wherein the phosphorus compound represented by the general formula (9) is at least one member selected from the compounds represented by the general formula (10):

[formula 10]

(10)

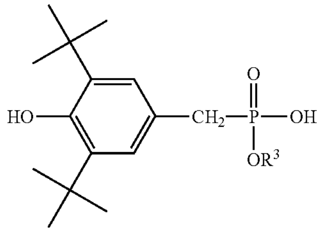

wherein $R^3$ represents hydrogen, a $C_{1-50}$ hydrocarbon group, or a $C_{1-50}$ hydrocarbon group containing a hydroxyl group or alkoxyl group, and the hydrocarbon group may contain an alicyclic structure, a branched structure and an aromatic ring structure.

19. The polyester polymerization catalyst according to claim 1, wherein the phosphorus compound has the structure of a phosphonic acid compound.

20. The polyester polymerization catalyst according to claim 6, wherein the phosphorus compound has the structure of a phosphonic acid derivative compound.

21. The polyester polymerization catalyst according to claim 11, wherein the phosphorus compound has the structure of a phosphonic acid derivative compound.

22. The polyester polymerization catalyst according to claim 15, wherein the phosphorus compound has the structure of a phosphonic acid derivative compound.

23. The polyester polymerization catalyst according to claim 1, wherein the phosphorus compound has an aromatic ring structure.

24. The polyester polymerization catalyst according to claim 2, wherein the phosphorus compound has an aromatic ring structure.

25. The polyester polymerization catalyst according to claim 3, wherein the phosphorus compound has an aromatic ring structure.

26. The polyester polymerization catalyst according to claim 6, wherein the phosphorus compound has an aromatic ring structure.

27. The polyester polymerization catalyst according to claim 7, wherein the phosphorus compound has an aromatic ring structure.

28. The polyester polymerization catalyst according to claim 8, wherein the phosphorus compound has an aromatic ring structure.

29. The polyester polymerization catalyst according to claim 11, wherein the phosphorus compound has an aromatic ring structure.

30. The polyester polymerization catalyst according to claim 12, wherein the phosphorus compound has an aromatic ring structure.

31. The polyester polymerization catalyst according to claim 15, wherein the phosphorus compound has an aromatic ring structure.

32. The polyester polymerization catalyst according to claim 16, wherein the phosphorus compound has an aromatic ring structure.

33. The polyester polymerization catalyst according to claims 19, wherein the phosphorus compound has an aromatic ring structure.

34. The polyester polymerization catalyst according to claim 20, wherein the phosphorus compound has an aromatic ring structure.

35. The polyester polymerization catalyst according to claim 21, wherein the phosphorus compound has an aromatic ring structure.

36. The polyester polymerization catalyst according to claims 22, wherein the phosphorus compound has an aromatic ring structure.

37. A polyester polymerization catalyst comprising at least one member selected from the group consisting of aluminum and compounds thereof as a metal-containing component and at least one member selected from the phosphorus compounds represented by the general formula (11):

$$R^1—P(=O)(OR^2)(OR^3) \quad (11)$$

wherein $R^1$ represents a $C_{1-50}$ hydrocarbon group or a $C_{1-50}$ hydrocarbon group containing a hydroxyl group, halogen group, alkoxyl group or amino group; $R^2$ and $R^3$ independently represent hydrogen, a $C_{1-50}$ hydrocarbon group, or a $C_{1-50}$ hydrocarbon group containing a hydroxyl group or alkoxyl group; and the hydrocarbon group may contain an alicyclic structure, a branched structure and an aromatic ring structure.

38. The polyester polymerization catalyst according to claim 37, wherein the phosphorus compound represented by the general formula (11) is at least one member selected from the phosphorus compounds represented by the general formula (12):

$$R^1—CH_2—P(=O)(OR^2)(OR^3) \quad (12)$$

wherein $R^1$ represents a $C_{1-49}$ hydrocarbon group or a $C_{1-49}$ hydrocarbon group containing a hydroxyl group, halogen group, alkoxyl group or amino group; $R^2$ and $R^3$ independently represent hydrogen, a $C_{1-50}$ hydrocarbon group, or a $C_{1-50}$ hydrocarbon group containing a hydroxyl group or alkoxyl group; and the hydrocarbon group may contain an alicyclic structure, a branched structure and an aromatic ring structure.

39. The polyester polymerization catalyst according to claim 37 or 38, wherein at least one of $R^1$, $R^2$ and $R^3$ contains an aromatic ring structure.

40. A polyester polymerization catalyst comprising at least one member selected from the group consisting of aluminum and compounds thereof as a metal-containing component and at least one member selected from the phosphorus compounds represented by the general formula (13):

[formula 13]

(13)

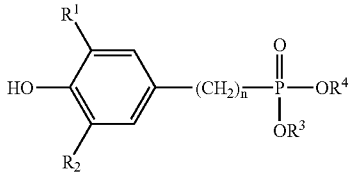

wherein $R^1$ and $R^2$ independently represent hydrogen or a $C_{1-30}$ hydrocarbon group; $R^3$ and $R^4$ independently represent hydrogen, a $C_{1-50}$ hydrocarbon group, or a $C_{1-50}$ hydrocarbon group containing a hydroxyl group or alkoxyl group; n is an integer of 1 or more; and the hydrocarbon group may contain an alicyclic structure, a branched structure and an aromatic ring structure.

41. The polyester polymerization catalyst according to claim 40, wherein the phosphorus compound represented by the general formula (13) is at least one member selected from the compounds represented by the general formula (14):

[formula 14]

(14)

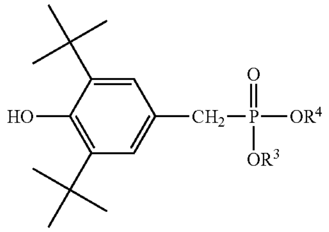

wherein $R^3$ and $R^4$ independently represent hydrogen, a $C_{1-50}$ hydrocarbon group, or a $C_{1-50}$ hydrocarbon group containing a hydroxyl group or alkoxyl group, and the hydrocarbon group may contain an alicyclic structure, a branched structure and an aromatic ring structure.

42. A polyester polymerization catalyst comprising at least one member selected from the group consisting of aluminum and compounds thereof as a metal-containing component and at least one member selected from the group consisting of phosphinic acid derivative compounds, phosphine oxide derivative compounds, phosphonous acid derivative compounds, phosphinous acid derivative compounds and phosphine derivative compounds, the catalyst producing a polyester comprising (a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters.

43. The polyester polymerization catalyst according to claim 1, characterized in that one or more metals and/or metal compounds selected from the group consisting of alkali metals and compounds thereof and alkaline earth metals and compounds thereof are co-exist therewith.

44. The polyester polymerization catalyst according to claim 11, characterized in that one or more metals and/or metal compounds selected from the group consisting of alkali metals and compounds thereof and alkaline earth metals and compounds thereof are co-exist therewith.

45. The polyester polymerization catalyst according to claim 15, characterized in that one or more metals and/or metal compounds selected from the group consisting of alkali metals and compounds thereof and alkaline earth metals and compounds thereof are co-exist therewith.

46. A polyester produced by using a polymerization catalyst comprising at least one member selected from aluminum and compounds thereof as a metal-containing component and at least one of phosphorus metal salt compounds.

47. The polyester according to claim 46, wherein the phosphorus metal salt compound is at least one member selected from the compounds represented by the general formula (1).

48. The polyester according to claim 46, wherein the phosphorus compound represented by the general formula (1) is at least one member selected from the compounds represented by the general formula (2).

49. A polyester produced by using a polymerization catalyst comprising at least one member selected from the group consisting of aluminum and compounds thereof as a metal-containing component and at least one member selected from compounds represented by the general formula (3).

50. The polyester according to claim 49, wherein the phosphorus compound represented by the general formula (3) is at least one member selected from the compounds represented by the general formula (4).

51. The polyester according to claim 46, wherein the metal moiety of the phosphorus metal salt compound is selected from Li, Na, K, Be, Mg, Sr, Ba, Mn, Ni, Cu and Zn.

52. The polyester according to claim 47, wherein the metal moiety of the phosphorus metal salt compound is selected from Li, Na, K, Be, Mg, Sr, Ba, Mn, Ni, Cu and Zn.

53. The polyester according to claim 48, wherein the metal moiety of the phosphorus metal salt compound is selected from Li, Na, K, Be, Mg, Sr, Ba, Mn, Ni, Cu and Zn.

54. The polyester according to claim 49, wherein the metal moiety of the phosphorus metal salt compound is selected from Li, Na, K, Be, Mg, Sr, Ba, Mn, Ni, Cu and Zn.

55. The polyester according to claim 50, wherein the metal moiety of the phosphorus metal salt compound is selected from Li, Na, K, Be, Mg, Sr, Ba, Mn, Ni, Cu and Zn.

56. A polyester produced by using a polymerization catalyst comprising at least one member selected from aluminum salts of a phosphorus compound.

57. The polyester according to claim 56, wherein the aluminum salt of a phosphorus compound is at least one member selected from the compounds represented by the general formula (5).

58. A polyester produced by using a polymerization catalyst comprising at least one member selected from the compounds represented by the general formula (6).

59. The polyester according to claim 58, wherein the phosphorus compound represented by the general formula (6) is at least one member selected from the compounds represented by the general formula (7).

60. A polyester comprising:

(a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters, the polyester produced by using a polymerization catalyst comprising at least one member selected from the group consisting of aluminum and compounds thereof as a metal-containing component and at least one member selected from phosphorus compounds having at least one P—OH bond.

61. The polyester according to claim 60, wherein the phosphorus compound is at least one member selected from the compounds represented by the general formula (8).

62. A polyester produced by using a polymerization catalyst comprising at least one member selected from the group consisting of aluminum and compounds thereof as a metal-containing component and at least one member selected from the phosphorus compounds represented by the general formula (9).

63. The polyester according to claim 62, wherein the phosphorus compound represented by the general formula (9) is at least one member selected from the compounds represented by the general formula (10).

64. A polyester produced by using a polymerization catalyst comprising at least one member selected from the group consisting of aluminum and compounds thereof as a metal-containing component and at least one member selected from the phosphorus compounds represented by the general formula (11).

65. The polyester according to claim 64, wherein the phosphorus compound represented by the general formula (11) is at least one member selected from the phosphorus compounds represented by the general formula (12).

66. The polyester according to claim 64, wherein at least one of $R^1$, $R^2$ and $R^3$ contains an aromatic ring structure.

67. A polyester produced by using a polymerization catalyst comprising at least one member selected from the group consisting of aluminum and compounds thereof as a metal-containing component and at least one member selected from the phosphorus compounds represented by the general formula (13).

68. The polyester according to claim 67, wherein the phosphorus compound represented by the general formula (13) is at least one member selected from the compounds represented by the general formula (14).

69. A polyester comprising:

(a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters, the polyester produced by using a polymerization catalyst comprising at least one member selected from the group consisting of aluminum and compounds thereof as a metal-containing component and at least one member selected from the group consisting of phosphinic acid derivative compounds, phosphine oxide derivative compounds, phosphonous acid derivative compounds, phosphinous acid derivative compounds and phosphine derivative compounds.

70. The polyester according to claim 46, wherein the catalyst is characterized in that one or more metals and/or metal compounds selected from the group consisting of alkali metals and compounds thereof and alkaline earth metals and compounds thereof are co-exist therewith.

71. The polyester according to claim 56, wherein the catalyst is characterized in that one or more metals and/or metal compounds selected from the group consisting of alkali metals and compounds thereof and alkaline earth metals and compounds thereof are co-exist therewith.

72. The polyester according to claim 60, wherein the catalyst is characterized in that one or more metals and/or metal compounds selected from the group consisting of alkali metals and compounds thereof and alkaline earth metals and compounds thereof are co-exist therewith.

73. A process for producing polyester which comprises using a polymerization catalyst comprising at least one member selected from aluminum and compounds thereof as a metal-containing component and at least one of phosphorus metal salt compounds.

74. The process for producing polyester according to claim 73, wherein the phosphorus metal salt compound is at least one member selected from the compounds represented by the general formula (1).

75. The process for producing polyester according to claim 73, wherein the phosphorus compound represented by the general formula (1) is at least one member selected from the compounds represented by the general formula (2).

76. A process for producing polyester produced by using a polymerization catalyst comprising at least one member selected from the group consisting of aluminum and compounds thereof as a metal-containing component and at least one member selected from compounds represented by the general formula (3).

77. The process for producing polyester according to claim 76, wherein the phosphorus compound represented by the general formula (3) is at least one member selected from the compounds represented by the general formula (4).

78. The process for producing polyester according to claim 73, wherein the metal moiety of the phosphorus metal salt compound is selected from Li, Na, K, Be, Mg, Sr, Ba, Mn, Ni, Cu and Zn.

79. The process for producing polyester according to claim 74, wherein the metal moiety of the phosphorus metal salt compound is selected from Li, Na, K, Be, Mg, Sr, Ba, Mn, Ni, Cu and Zn.

80. The process for producing polyester according to claim 75, wherein the metal moiety of the phosphorus metal salt compound is selected from Li, Na, K, Be, Mg, Sr, Ba, Mn, Ni, Cu and Zn.

81. The process for producing polyester according to claim 76, wherein the metal moiety of the phosphonis metal salt compound is selected from Li, Na, K, Be, Mg, Sr, Ba, Mn, Ni, Cu and Zn.

82. The process for producing polyester according to claim 77, wherein the metal moiety of the phosphorus metal salt compound is selected from Li, Na, K, Be, Mg, Sr, Ba, Mn, Ni, Cu and Zn.

83. A process for producing polyester produced by using a polymerization catalyst comprising at least one member selected from aluminum salts of a phosphorus compound.

84. The process for producing polyester according to claim 83, wherein the aluminum salt of a phosphorus compound is at least one member selected from the compounds represented by the general formula (5).

85. A process for producing polyester by using a polymerization catalyst comprising at least one member selected from the compounds represented by the general formula (6).

86. The process for producing polyester according to claim 85, wherein the phosphorus compound represented by the general formula (6) is at least one member selected from the compounds represented by the general formula (7).

87. A process for producing a polyester which comprises (a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters by using a polymerization catalyst comprising at least one member selected from the group consisting of aluminum and compounds thereof as an a metal-containing component and at least one member selected from phosphorus compounds having at least one P—OH bond.

88. The process for producing polyester according to claim 87, wherein the phosphorus compound is at least one member selected from the compounds represented by the general formula (8).

89. A process for producing polyester by using a polymerization catalyst comprising at least one member selected from the group consisting of aluminum and compounds thereof as a metal-containing component and at least one member selected from the phosphorus compounds represented by the general formula (9).

90. The process for producing polyester according to claim 89, wherein the phosphorus compound represented by the general formula (9) is at least one member selected from the compounds represented by the general formula (10).

91. A process for producing polyester by using a polymerization catalyst comprising at least one member selected from the group consisting of aluminum and compounds thereof as a metal-containing component and at least one member selected from the phosphorus compounds represented by the general formula (11).

92. The process for producing polyester according to claim 91, wherein the phosphorus compound represented by the general formula (11) is at least one member selected from the phosphorus compounds represented by the general formula (12).

93. The process for producing polyester according to claim 91, wherein at least one of $R^1$, $R^2$ and $R^3$ contains an aromatic ring structure.

94. A process for producing polyester by using a polymerization catalyst comprising at least one member selected from the group consisting of aluminum and compounds thereof as a metal-containing component and at least one member selected from the phosphorus compounds represented by the general formula (13).

95. The process for producing polyester according to claim 94, wherein the phosphorus compound represented by the general formula (13) is at least one member selected from the compounds represented by the general formula (14).

96. A process for producing a polyester which comprises (a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters by using a polymerization catalyst comprising at least one member selected from the group consisting of aluminum and compounds thereof as a metal-containing component and at least one member selected from the group consisting of phosphinic acid derivative compounds, phosphine oxide derivative compounds, phosphonous acid derivative compounds, phosphinous acid derivative compounds and phosphine derivative compounds.

97. The process for producing polyester according to claim 73, wherein the catalyst is characterized in that one or more metals and/or metal compounds selected from the group consisting of alkali metals and compounds thereof and alkaline earth metals and compounds thereof are co-exist therewith.

98. The process for producing polyester according to claim 83, wherein the catalyst is characterized in that one or more metals and/or metal compounds selected from the group consisting of alkali metals and compounds thereof and alkaline earth metals and compounds thereof are co-exist therewith.

99. The process for producing polyester according to claim 87, wherein the catalyst is characterized in that one or more metals and/or metal compounds selected from the group consisting of alkali metals and compounds thereof and alkaline earth metals and compounds thereof are co-exist therewith.

100. A fiber comprised by polyester produced by using a polymerization catalyst comprising at least one member selected from aluminum and compounds thereof as a metal-containing component and at least one of phosphorus metal salt compounds.

101. A fiber comprised by polyester produced by using a polymerization catalyst comprising at least one member selected from the group consisting of aluminum and compounds thereof as a metal-containing component and at least one member selected from compounds represented by the general formula (4).

102. A fiber comprised by polyester produced by using a polymerization catalyst comprising at least one member selected from aluminum salts of a phosphorus compound.

103. A fiber comprised by polyester produced by using a polymerization catalyst comprising at least one member selected from the compounds represented by the general formula (7).

104. A fiber comprised by polyester produced by using a polymerization catalyst comprising at least one member selected from the group consisting of aluminum and compounds thereof as a metal-containing component and at least one member selected from phosphorus compounds having at least one P—OH bond, the polyester comprising (a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters.

105. A fiber comprised by polyester produced by using a polymerization catalyst comprising at least one member selected from the group consisting of aluminum and compounds thereof as a metal-containing component and at least one member selected from the phosphorus compounds represented by the general formula (10).

106. A film comprised by polyester produced by using a polymerization catalyst comprising at least one member selected from aluminum and compounds thereof as a metal-containing component and at least one of phosphorus metal salt compounds, the polyester comprising (a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters.

107. A film comprised by polyester produced by using a polymerization catalyst comprising at least one member selected from the group consisting of aluminum and compounds thereof as a metal-containing component and at least one member selected from compounds represented by the general formula (4).

108. A film comprised by polyester produced by using a polymerization catalyst comprising at least one member selected from aluminum salts of a phosphorus compound.

109. A film comprised by polyester produced by using a polymerization catalyst comprising at least one member selected from the compounds represented by the general formula (7).

110. A film comprised by polyester produced by using a polymerization catalyst comprising at least one member selected from the group consisting of aluminum and compounds thereof as a metal-containing component and at least one member selected from phosphorus compounds having at least one P—OH bond, the polyester comprising (a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters.

111. A film comprised by polyester produced by using a polymerization catalyst comprising at least one member selected from the group consisting of aluminum and compounds thereof as a metal-containing component and at least one member selected from the phosphorus compounds represented by the general formula (10).

112. A hollow molded article comprised by polyester produced by using a polymerization catalyst comprising at least one member selected from aluminum and compounds thereof as a metal-containing component and at least one of phosphorus metal salt compounds.

113. A hollow molded article comprising polyester produced by using a polymerization catalyst comprising at least one member selected from the group consisting of aluminum and compounds thereof as a metal-containing component and at least one member selected from compounds represented by the general formula (4).

114. A hollow molded article comprised by polyester produced by using a polymerization catalyst comprising at least one member selected from aluminum salts of a phosphorus compound.

115. A hollow molded article comprising polyester produced by using a polymerization catalyst comprising at least one member selected from the compounds represented by the general formula (7).

116. A hollow molded article comprised by polyester produced by using a polymerization catalyst comprising at least one member selected from the group consisting of aluminum and compounds thereof as an a metal-containing component and at least one member selected from phosphorus compounds having at least one P—OH bond, the polyester comprising (a) one or more members selected from polyvalent carboxylic acids and ester-forming derivatives thereof and one or more members selected from polyvalent alcohols, (b) one or more members selected from hydroxycarboxylic acids and ester-forming derivatives thereof, or (c) cyclic esters.

117. A hollow molded article comprising polyester produced by using a polymerization catalyst comprising at least one member selected from the group consisting of aluminum and compounds thereof as a metal-containing component and at least one member selected from the phosphorus compounds represented by the general formula (10).

118. The polyester according to claim 65, wherein at least one of $R^1$, $R^2$ and $R^3$ contains an aromatic ring structure.

119. The process for producing polyester according to claim 92, wherein at least one of $R^1$, $R^2$ and $R^3$ contains an aromatic ring structure.

120. The polyester polymerization catalyst according to claim 1, wherein the at least one member selected from aluminum and compounds thereof is at least one member selected from the group consisting of an aluminum carboxylate, an aluminum inorganic acid salt, an aluminum alkoxide, an aluminum chelate compound, an organoaluminum compound, partial hydrolyzate of an organoaluminum compound and aluminum oxide.

* * * * *

UNITED STATES PATENT AND TRADEMARK OFFICE

CERTIFICATE OF CORRECTION

PATENT NO. : 7,144,614 B2 Page 1 of 1
APPLICATION NO. : 10/186634
DATED : December 5, 2006
INVENTOR(S) : Nakajima et al.

It is certified that error appears in the above-identified patent and that said Letters Patent is hereby corrected as shown below:

| Column | Line | |
|---|---|---|
| 47 | 11 | Change "(69" to --(69%).--. |
| 47 | 14 | Change "δ)" to --δ):--. |

Signed and Sealed this

Twenty-seventh Day of March, 2007

JON W. DUDAS
*Director of the United States Patent and Trademark Office*

UNITED STATES PATENT AND TRADEMARK OFFICE

CERTIFICATE OF CORRECTION

PATENT NO. : 7,144,614 B2

APPLICATION NO. : 10/186634

DATED : December 5, 2006

INVENTOR(S) : Takahiro Nakajima et al.

It is certified that error appears in the above-identified patent and that said Letters Patent is hereby corrected as shown below:

| Column | Line | |
|---|---|---|
| 40 | 12 | Change "HS=0.245 $\{[IV]_{f2}^{-1.47}[IV]_{i}^{-1.47}\}$" to --HS = 0.245 $\{[IV]_{f2}^{-1.47} - [IV]_{i}^{-1.47}\}$--. |
| 42 | 62 | Change "$^1$H-NMR($CDC1_3$□δ):" to --$^1$H-NMR($CDC1_3$,δ):--. |
| 43 | 47 | Change "acetate.$4H_2O$" to --acetate·$4H_2O$--. |
| 44 | 16 | Change "acetate.$2H_2O$" to --acetate·$2H_2O$--. |
| 44 | 54 | Change "acetate.$4H_2O$" to --acetate·$4H_2O$--. |
| 45 | 43 | Change "(II).$4H_2O$" to --(II)·$4H_2O$--. |
| 47 | 11 | Change "(69" to --(69%).--. |
| 47 | 14 | Change "$^1$H-NMR(DMSO-d6□δ)" to --$^1$H-NMR(DMSO-d6,δ):--. |
| 47 | 30 | Change "$^1$H-NMR($CDC1_3$□δ):" to --$^1$H-NMR($CDC1_3$,δ):--. |
| 48 | 14 | Change "acetate.$4H_2O$" to --acetate·$4H_2O$--. |
| 49 | 43 | Change "nitrate.$6H_2O$" to --nitrate·$6H_2O$--. |
| 49 | 53 | Change "$^1$H-NMR(DMSO-d6□δ)" to --$^1$H-NMR(DMSO-d6,δ):--. |
| 51 | 44 | Change "$^1$H-NMR(DSMO-d6□δ):" to --$^1$H-NMR(DSMO-d6,δ):--. |
| 52 | 2 | Change "$^1$H-NMR(DSMO-d6□δ)" to --$^1$H-NMR(DSMO-d6,δ):--. |

UNITED STATES PATENT AND TRADEMARK OFFICE

CERTIFICATE OF CORRECTION

PATENT NO. : 7,144,614 B2

APPLICATION NO. : 10/186634

DATED : December 5, 2006

INVENTOR(S) : Takahiro Nakajima et al.

It is certified that error appears in the above-identified patent and that said Letters Patent is hereby corrected as shown below:

| | | |
|---|---|---|
| 52 | 60 | Change "$^{1}$H-NMR(DSMO-d6□δ)" to --$^{1}$H-NMR(DSMO-d6,δ):--. |
| 53 | 8 | Change "$^{1}$H-NMR($CDC1_3$□δ):" to --$^{1}$H-NMR($CDC1_3$,δ):--. |
| 53 | 60 | Change "acetate.$4H_2O$" to --acetate·$4H_2O$--. |
| 55 | 40 | Change "nitrate.$9H_2O$" to --nitrate·$9H_2O$--. |
| 57 | 14 | Change "nitrate.$9H_2O$" to --nitrate·$9H_2O$--. |
| 59 | 48 | Change "acetate.$2H_2O$" to --acetate·$2H_2O$--. |
| 71-72 | | Delete line numbers "5, 10, 15, 20, 25, 30, 35, 40, 45, 50, 55, 60, 65". |
| 73-74 | | Delete line numbers "5, 10, 15, 20". |
| 85 | 45 | Change "phosphonis metal" to --phosphorus--. |
| 86 | 7 | Before "a metal-containing" delete "an". |

Signed and Sealed this

Twenty-ninth Day of May, 2007

JON W. DUDAS

*Director of the United States Patent and Trademark Office*